US006931185B2

(12) United States Patent
Sudo et al.

(10) Patent No.: US 6,931,185 B2
(45) Date of Patent: Aug. 16, 2005

(54) OPTICAL FIBER, SLANTED OPTICAL FIBER GRATING, BAND REJECTION OPTICAL FILTER, GAIN EQUALIZING OPTICAL FILTER FOR OPTICAL AMPLIFIER, AND OPTICAL AMPLIFIER MODULE

(75) Inventors: Masaaki Sudo, Sakura (JP); Atuhiko Niwa, Sakura (JP); Satoshi Okude, Sakura (JP)

(73) Assignee: Fujikura Ltd., Tokyo (JP)

( * ) Notice: Subject to any disclaimer, the term of this patent is extended or adjusted under 35 U.S.C. 154(b) by 190 days.

(21) Appl. No.: 10/341,135

(22) Filed: Jan. 13, 2003

(65) Prior Publication Data

US 2003/0156808 A1 Aug. 21, 2003

(30) Foreign Application Priority Data

Feb. 5, 2002 (JP) ........................................ 2002-028226

(51) Int. Cl.[7] .............................. G02B 6/02; G02B 6/22
(52) U.S. Cl. ..................... 385/123; 385/126; 385/127
(58) Field of Search .................................. 385/123–128

(56) References Cited

U.S. PATENT DOCUMENTS

| | | | |
|---|---|---|---|
| 6,005,999 A | | 12/1999 | Singh et al. |
| 6,104,852 A | * | 8/2000 | Kashyap ..................... 385/123 |
| 6,314,221 B1 | * | 11/2001 | Riant et al. ................... 385/37 |
| 6,636,675 B2 | * | 10/2003 | Soufiane ..................... 385/123 |
| 6,728,458 B2 | * | 4/2004 | Taru et al. .................. 385/127 |
| 2002/0034368 A1 | * | 3/2002 | Sheu et al. ................. 385/127 |

FOREIGN PATENT DOCUMENTS

| EP | 1 116 968 | 7/2001 |
|---|---|---|
| EP | 1 160 596 | 12/2001 |

OTHER PUBLICATIONS

M.J. Holmes, et al., "Novel Fibre Design for Narrow–Band Symmetric Response Sidetap Filters with Suppressed Leaky Mode Resonance", ECOC '99, vol. I, pp. 216–217 (Sep. 26, 1999).

Hewlett, et al. "Coupling Characteristics of Photo–Induced Bragg Gratings in Depressed–and Matched–Cladding Fibre", *Optical and Quantum Electronics*, 28, 1641–1654 (1996).

Riant, et al., "Gain Equalization with Optimized Slanted Bragg Grating on Adapted Fibre for Multichannel LongHaul Submarine Transmission", *Optical Fibre Communication Conference*, 147–149 (1999).

* cited by examiner

*Primary Examiner*—John D. Lee
*Assistant Examiner*—Tina M. Lin
(74) *Attorney, Agent, or Firm*—Hoffmann & Baron, LLP

(57) ABSTRACT

Photosensitivity of an inner core which is disposed in a central portion of a core is low. Photosensitivity of an outer core which is disposed close to a cladding is high. In the cladding, photosensitivity of the inner cladding which is close to the core is high and photosensitivity of an outer cladding which is outside of the inner cladding is low. A plurality of slant optical fiber grating having different optical characteristics by using the optical fiber having such photosensitivity so as to form a gain equalizing optical filter. By doing this, it is possible to provide an optical filter having a slant optical fiber grating which can maintain a filtering characteristics in a narrow bandwidth and enlarge loss area.

22 Claims, 41 Drawing Sheets

Δ=0.5%   INNER CORE DIAMETER :80%

Δ=0.5% INNER CORE DIAMETER :70%

$\Delta = 0.4\%$  INNER CORE DIAMETER : 80%

Δ=0.4%   INNER CORE DIAMETER :70%

FIG. 23A   Δ = 0.5%   V = 1.9
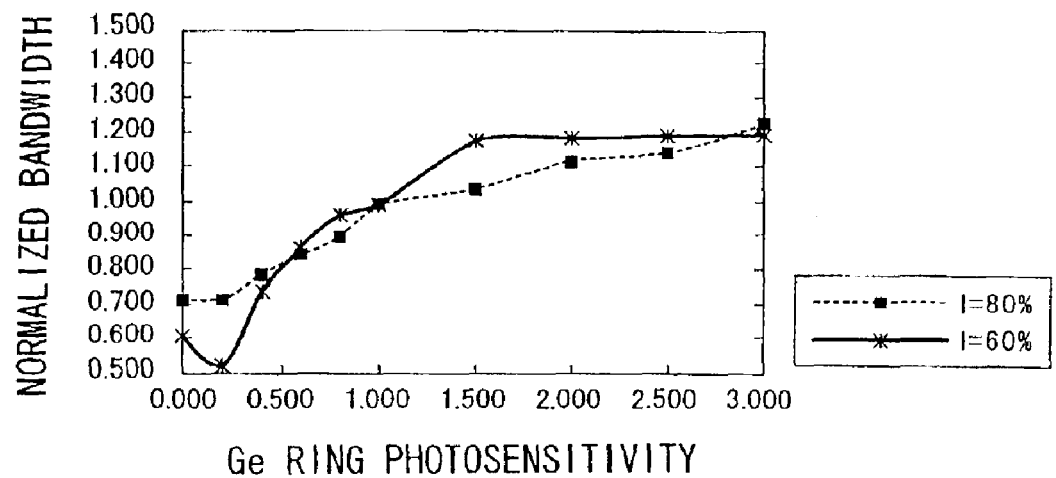
FIG. 23B
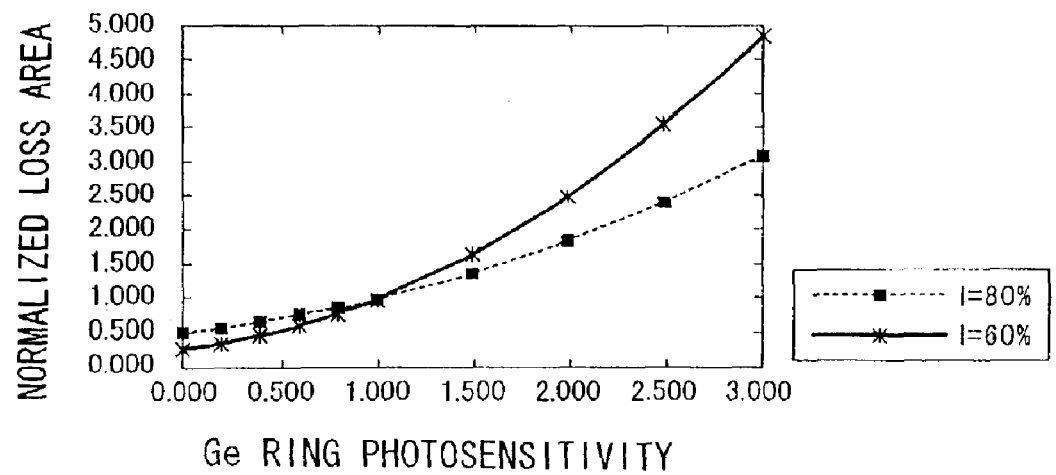

FIG. 24A $\Delta = 0.4\%$ V =1.7
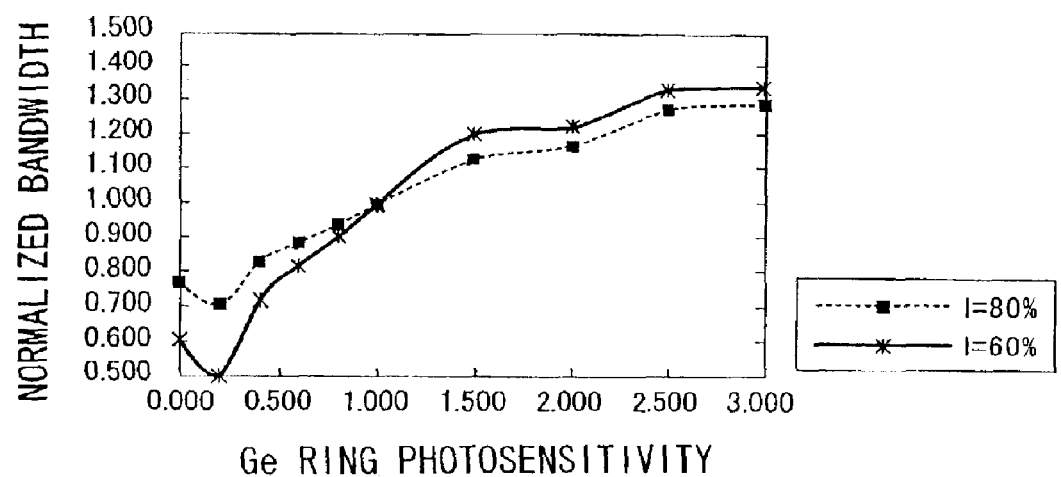
FIG. 24B
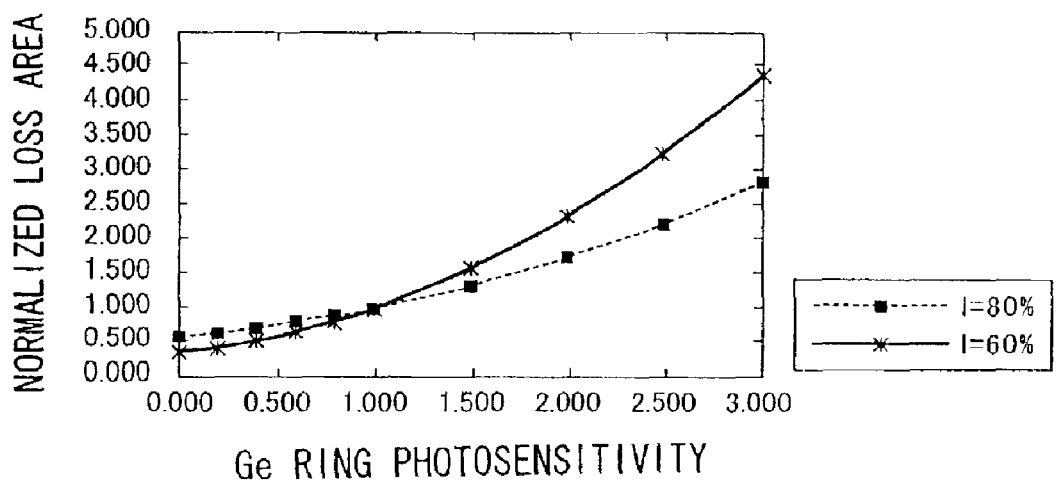

Δ = 0.4%  *l* = 80%

Δ = 0.4%  *l* = 70%

$\Delta = 0.5\%$  $l = 80\%$ $\Delta = 0.5\%$  $l = 70\%$

Δ=0.55%   λc=1.22 FOR LONG WAVELENGTH

Δ=0.55%   λc=1.22 FOR SHORT WAVELENGTH

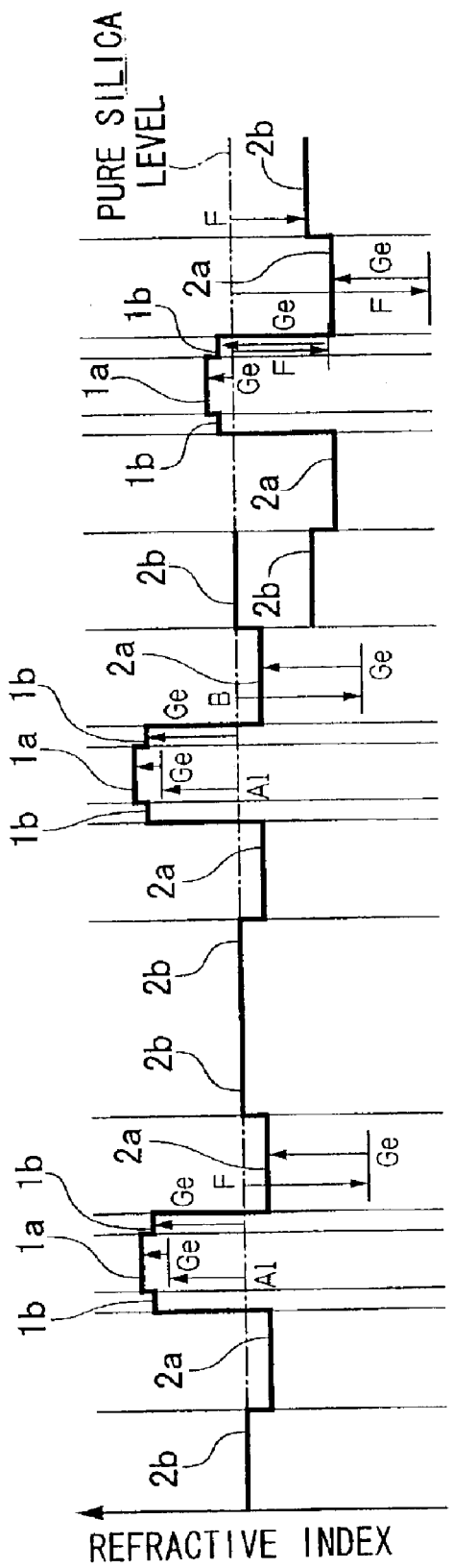

OPTICAL FIBER, SLANTED OPTICAL FIBER GRATING, BAND REJECTION OPTICAL FILTER, GAIN EQUALIZING OPTICAL FILTER FOR OPTICAL AMPLIFIER, AND OPTICAL AMPLIFIER MODULE

BACKGROUND OF THE INVENTION

1. Field of the Invention

The present invention relates to an optical fiber component which is used for optical communication and optical information processing. In particular, the present invention relates to an optical filter for improving wavelength dependence of the gain of an optical amplifier containing an Erbium-doped optical fiber (hereinafter called EDFA) so as to perform gain flattening operation and gain equalizing operation. Also the present invention relates to an optical fiber which is used for the optical filter.

2. Description of Related Art

An optical fiber grating which has a periodic refractive index modulation in a longitudinal direction of the optical fiber by utilizing an increase of the refractive index of a Ge-doped section in a silica optical fiber by irradiating with ultraviolet light has advantages such as low inserttion loss, low manufacturing cost, and high reliability. Because of these advantages, the optical fiber grating has been widely used in optical communication.

In general, such optical fiber gratings can be categorized into two types. One is a reflection Bragg grating (hereinafter called reflection FBG) having half a period of light in the medium such as 530 nm of period in a 1550 nm of operational wavelength so as to obtain filtering performance by coupling to a backward direction guided mode light (hereinafter called reflection mode light). A structure of the reflection Bragg grating is shown in FIG. 47.

In FIG. 47, a reference numeral 1 indicates a core. A reference numeral 2 indicates a cladding which is disposed around the core 1. A reference numeral 3 indicates a refractive index increased section which is formed by irradiation with ultraviolet light. A grating section 4 is formed by forming the refractive index increased section 3 in a longitudinal direction of the optical fiber periodically. In the reflection Bragg grating, a guided mode light 5 is coupled to a reflection mode light 6. A transmitted light having rejection loss in the wavelength band is obtained.

Another type of optical fiber grating is a long period grating (hereinafter called LPG) having a period of a several 100s microns and having a transmitting characteristics by coupling a guided mode light to a forward cladding modes. A structure of the LPG is shown in FIG. 48. In FIG. 48, reference numerals 1 to 4 indicate the same features as shown in FIG. 47. The difference between FIGS. 47 and 48 is that a period of the refractive index increased section 3 in FIG. 48 is longer than that in FIG. 47. By doing this, the guided mode light 5 is coupled to the forward cladding mode light 7; thus, a transmitted light having a rejection loss in this wavelength band is obtained.

In a reflection FBG, there are advantages in that it is possible to design loss wavelength characteristics by changing modulation magnitude and period of refractive index in a longitudinal direction of an optical fiber and to realize a large rejection loss such as several -10s dB. In contrast, there are disadvantages in that a spectral smoothness cannot be obtained because ripples of 0.1 to 5 dB exists in the rejection band at about 0.1 nm period and there is a large reflection. For these reasons, the reflection FBG has not been used for a gain equalizer (hereinafter called GEQF) for an optical amplifier using an erbium-doped optical fiber.

On the other hand, in contrast to the reflection Bragg grating, the long-period grating has advantages in that there is no ripple in the rejection band and spectral smoothness is obtained. Also, there is little reflection light. Because of these advantages, the long-period grating has been mainly used for the GEQF. However, in the long-period grating, it is difficult to obtain required loss spectrum. Also, there is a disadvantage in that the obtainable rejection loss is merely 5 dB at best even if an optical fiber for specific use is used. Therefore, the long-period grating is not suitable for gain flattening operation in a broad wavelength bandwidth.

In the near future, it is forecast that an operational wavelength bandwidth may be broadened so as to increase the number of wavelength multiplicity in a wavelength division multiplexing system. Therefore, a GEQF which enables more flexible designing ability for loss wavelength characteristics than that of the long-period grating has been required. According to the above-explained conditions, a GEQF such as a slant optical fiber grating (hereinafter called SFBG) has been developed which has the same advantages as that of the reflection Bragg grating without disadvantages of the reflection Bragg grating. Such GEQF is disclosed in a document of "Gain equalization with optimized slanted Bragg grating on adapted fiber for multichannel long-haul submarine transmission (I. Riant et al, OFC' 99, ThJ6-1, 1999)" (hereinafter called reference document 1).

In FIG. 49, a structure of the slant optical fiber grating is shown. In FIG. 49, reference numerals 1 to 4 indicates the same parts as those indicated in FIG. 47. In FIG. 49, a higher refractive index section 3 is formed such that a surface having equal phase on the grating is slanted to an optical fiber axis A. A grating section 4 is formed by forming the slanted higher refractive index section with the same period periodically as in the case of the reflection Bragg grating.

A direction which is orthogonal to the higher refractive index section 3 is called a grating vector direction of the grating. An angle θ made by the grating vector direction B and the optical fiber axis A is called a slant angle. The slanting degree of the higher refractive index section 3 is indicated by the slant angle. In the slant short period optical fiber grating, a portion of the guided mode light 5 which is reflected by the grating section 4 is coupled to a backward propagating cladding mode 8. In this way, by slanting the grating section 4, the coupling to the backward propagating cladding mode 8, particularly to the LP1x system, is enhanced. Also, by selecting the slant angle θ appropriately, it is nearly possible to surpress the coupling to the reflected mode. At this time, the reflection decreases and multiple reflections of the guided mode do not occur in the light waveguide path. Therefore, unnecessary ripples do not occur. Also, as similar to the short period reflecting optical fiber grating, because it is possible to change filtering characteristics by changing modulation magnitude and period of the refractive index, designing allowability is broadened.

However, because there are a plurality of backward propagating cladding modes 8, it was a general problem in that a loss occurrence wavelength band is broadended. In an optical fiber which is used in a conventional reflection Bragg optical fiber graging and a long period Bragg optical fiber grating, the loss occurrence wavelength band by the mode coupling becomes 20 nm at narrowest. Therefore, it was already found that, in order to manufacture an optical filter having steep loss spectrum or an optical filter having several nm of narrow loss bandwidth, a special optical fiber which can be coupled to a specific cladding mode selectively must be used. This point is described in the reference document 1.

An example of an optical fiber which has been proposed for such an object is shown in FIG. 50. In FIG. 50, a reference numeral 1 is a core and a reference numeral 2 is a cladding. Among the claddings 2, a reference numeral 2a indicates an inner cladding which has photosensitivity and a reference numeral 2b indicates an outer cladding which does not have photosensitivity. In the optical fiber, the refractive index photosensitivity of the core 1 to ultraviolet light is low and the photosensitivity of the inner cladding 2a which contacts the core 1 is high. Also, a non-photosensitive higher refractive index medium is added to the core 1 and a lower refractive index medium is added to the cladding 2 together with Ge.

When a slant optical fiber grating is manufactured by the optical fiber having the above-mentioned structure, the coupling with the reflection mode decreases. Therefore, it is possible to surpress the coupling to the reflection mode by relatively small slant angle. By doing this, it is possible to be coupled to relatively low orders of cladding modes selectively.

By using the optical fiber having the above-explained, simulation for transmission characteristics of the SFBG having 1.1 μm of theoretical cut-off wavelength was performed. Simulation conditions are shown in TABLE 1. The transmission spectrum is shown in FIG. 51. In TABLE 1, the reflection surpressing angle is a slant angle which can surpress the coupling to the reflection mode

TABLE 1

| | |
|---|---|
| Program which is used | Apollo Photonics Inc. FOGS-BG ver 2.2a |
| Grating Length | 1 mm |
| Grating Period | 530 to 530.35 nm |
| Grating Chirp Ratio | 0.35 nm/mm |
| Slant Angle | Reflection Surpressing Angle |

As shown in FIG. 51, it is understood that the total width of main loss occurrence bandwidth is 10 nm or narrower.

By the optical fiber having the above-explained structure, it is possible to narrow the loss occurrence area. However, in such a structure, a grating is not formed in the core section in which the optical intensity density is large. Therefore, there are only a few overlapping sections of the light field distribution and the refractive index change; thus, coupling coefficient decreases. Also, a low refractive index medium must be added to the cladding section in addition to Ge. Therefore, usually, less Ge can be added than a case in which only Ge is added. Maximum amount of Ge which can be added is nearly 6 wt %, and it seems that the amount of Ge which can be added should be nearly 5 wt % in order to manufacture an optical fiber in stable mass production. Therefore, there is a limit to increasing the photosensitivity by adding Ge.

For the above-explained two reasons, the rejection loss value which is obtained is not very large. An SFBG was manufactured by using the optical fiber having a structure shown in FIG. 50 and the result thereof is explained as follows.

In FIG. 52, an example of transmission spectrum (fundamental spectrum) of the SFBG which used the above-explained optical fiber is shown. Grating length was nearly 1 mm. According to FIG. 52, it can be understood that the loss occurrence bandwidth is nearly 10 nm. As characteristics of the optical fiber, mode field diameter (hereinafter called MFD) is 10 μm, cut-off wavelength is 1.2 μm, and the Ge-doped amount to the cladding 2 is 4.5 wt %.

The rejection loss area was defined as an area of a main loss occurrence bandwidth as a shaded portion shown in FIG. 51, and an SFBG was manufactured by exposing the optical fiber. Relationship of the exposure time and the occurring loss area is shown in FIG. 53. Here, the loss area is calculated by taking a deteriorating ratio due to an aging process for a purpose of stabilization to a thermal deterioration into account. Here, a saturation loss area is defined as a loss area at the time the increase of the refractive index begins to become saturated, such as a limit in which fitting function can be expressed as $S = a \cdot t^b$. Here, t indicates the exposure time, and s indicates a loss area. In this case, it is understood that the saturation loss area in this case is nearly 3 dB·nm.

For example, a band rejection filter having the transmission rejection bandwidth of 30 nm and rejection loss of 5 dB is manufactured. Such characteristics are an ordinary requirement for the GEQF; thus such a transmission rejection bandwidth is not a wide bandwidth. If it is assumed that 5 dB of loss is formed over 30 nm of bandwidth in a flat manner, a total loss area which is necessary is 150 dB nm. If the maximum grating length is 40 mm, it is understood that nearly 3.8 dB nm of loss area as a fundamental spectrum is necessary.

Actual characteristics of GEQF are not flat; therefore, partially, the loss area having nearly 5.0 dB nm which is 1.3 times as much as the above-mentioned 3.8 dB nm at maximum is necessary to obtain 5 dB of loss. Therefore, in the optical fiber shown in FIG. 50, it is understood that manufacturing the GEQF having 5 dB of peak loss is difficult.

For other methods for increasing the loss, two ideas such as increasing the photosensitivity of the core and decreasing the cut-off wavelength so as to enlarge the optical power in the cladding can be proposed.

If a method such as increasing the photosensitivity of the core is employed, the loss occurrence bandwidth increases; therefore, the photosensitivity should preferably be 20% or less. Thus, this method is not so effective for a purpose of increasing the loss. Also, if a method such as decreasing the cut-off wavelength is employed, there occurs a trade-off in which the loss increases but bending loss occurs too. Therefore, there is a limit in this method. Although it is possible to decrease the limit of cut-off by increasing the relative refractive index difference Δ, in this case, the core diameter decreases. Thus, the loss bandwidth is enlarged. According to the Inventors' analysis, it is believed that the limit of the obtainable saturation loss area which can maintain the loss bandwidth by using the structure shown in FIG. 50 is 4 dB·nm.

SUMMARY OF THE INVENTION

The present invention was made in consideration of the above-explained problems. An object of the present invention is to provide an optical fiber using a slant optical fiber grating which can maintain the filtering characteristics within a narrow bandwidth and enlarge the loss area more than a conventional optical fiber.

In order to solve the above-explained problems, a first aspect of an optical fiber according to the present invention comprises a core, and a cladding which is disposed around the core, wherein the core contains at least two or more layers having different refractive indexes or different photosensitivity, the innermost layer is a lower photosensitivity layer of which photosensitivity to a change of refractive index by a light radiation is lower than a photosensitivity of the other layer, the cladding contains at least two or more layers having different refractive indexes, the layer which contacts the core is a higher photosensitivity layer of which photosensitivity to a change of refractive index by a light radiation is higher than a photosensitivity of the other layer.

By the band rejection optical filter using the slant optical fiber grating which is made from the above-explained optical fiber, it is possible to maintain the filtering characteristics within a narrow bandwidth so as to obtain desirable characteristics for the loss area.

A second aspect of the optical fiber according to the present invention has an outer diameter of the higher photosensitivity layer of the cladding is twice as large or more as a diameter of a mode field.

By doing this, it is possible to realize an optical fiber of which loss bandwidth is narrow so as to form a band rejection optical filter having a large loss area.

A third aspect of the optical fiber according to the present invention has a product of a ratio l between the core diameter and the diameter of the lower photosensitivity layer of the core and a theoretical cut-off wavelength $\lambda_c$ of 0.98 or less.

By doing this, it is possible to realize an optical fiber which can form a band rejection optical filter of which loss area is 3.9 dB nm or larger.

A fourth aspect of the optical fiber according to the present invention has a quotient obtained by dividing a maximum value of the photosensitivity of the core by a maximum value of the photosensitivity of the cladding of 0.8 or larger.

By doing this, it is possible to realize an optical fiber which can form a band rejection optical filter having a large loss area.

A fifth aspect of the optical fiber according to the present invention has a theoretical cut-off wavelength $\lambda_c$ of 1.22 $\mu$m or shorter.

By doing this, it is possible to realize an optical fiber which can form a band rejection optical filter in which occurrence of ripples such as a ghost mode which is caused by the coupling of the low order cladding mode and the guided mode is surpressed.

A sixth aspect of the optical fiber according to the present invention is characterized in that relative refractive index difference $\Delta$ between the core and the innermost cladding layer and the theoretical cut-off wavelength $\lambda_c$ satisfy a relationship such as $\lambda_c > 2.48 - 4.53\Delta + 3.43\Delta^2$.

By doing this, it is possible to realize an optical fiber in which the bending loss is 0.1 dB or lower under conditions of 40 mm of bending diameter. By manufacturing a band rejection optical filter by using the optical fiber, it is possible to realize a band rejection optical filter in which loss increase due to the bending is small when it is organized in a narrow space.

A seventh aspect of the optical fiber according to the present invention has a loss generating bandwidth BW of 9 nm or shorter, and a product of a ratio l between the core diameter and the diameter of the lower photosensitivity layer of the core and a theoretical cut-off wavelength $\lambda_c$ is 0.98 or less.

By doing this, it is possible to manufacture a gain equalizing optical filter which can equalize a gain peak around 1530 nm band of the optical amplifier by using the optical fiber.

An eighth aspect of the optical fiber according to the present invention is characterized in that a loss generating bandwidth BW is 15 nm or shorter, and a product of a ratio l between the core diameter and the diameter of the lower photosensitivity layer of the core and a theoretical cut-off wavelength $\lambda_c$ is 0.85 or less.

By doing this, it is possible to manufacture a gain equalizing optical filter which can equalize a gain peak around the 1555 nm band of the optical amplifier by using the optical fiber.

A ninth aspect of the optical fiber according to the present invention has a relative refractive index difference $\Delta_{inclad}$ between the innermost cladding layer which contacts the core and the outermost cladding layer among the layers contained in the cladding and having different refractive indexes is in a range of $-0.1\% < \Delta_{inclad} < 0\%$.

By doing this, it is possible to prevent the transmission characteristics from being degraded due to an interference between a mode which is condined and transmitted in the innermost cladding layer and the guided mode. Also, it is possible to prevent unnecessary peaks from occurring due to the generation of a coupled mode when a band rejection optical filter is manufactured by using the optical fiber.

A tenth aspect of the optical fiber made from a silica glass according to the present invention has a main dopant to the lower photosensitivity layer of the core of Al, a main dopant to the higher photosensitivity layer of the core of Ge, a main dopant to the higher photosensitivity layer of the cladding of Ge and B, and amount of Ge which is added to the higher photosensitivity layer of the cladding is 3 wt % or more.

By doing this, it is possible to realize an optical fiber having characteristics which are described in first to ninth aspects of the present invention.

An eleventh aspect of the optical fiber made from a silica glass according to the present invention has a main dopant to the lower photosensitivity layer of the core of Al, a main dopant to the higher photosensitivity layer of the core of Ge, a main dopant to the higher photosensitivity layer of the cladding of Ge and F, and amount of Ge which is added to the higher photosensitivity layer of the cladding of 4 wt % or more.

By doing this, it is possible to realize an optical fiber having characteristics which are described in first to ninth aspects of the present invention.

A twelfth aspect of the optical fiber made from a silica glass according to the present invention has an amount of Ge which is added to the lower photosensitivity layer of the core of 1 wt % or lower, amounts of main dopants which are added to the higher photosensitivity layer of the core are Ge and F, amounts of main dopants which are added to the higher photosensitivity layer of the cladding are Ge and F, amount of Ge which is added to the higher photosensitivity layer of the cladding of 5 wt %, and a main dopant which is added to the lower photosensitivity layer of the cladding is F.

By doing this, it is possible to realize an optical fiber having characteristics which are described in first to ninth aspects of the present invention.

A thirteenth aspect of the optical fiber according to the present invention used an optical fiber according to the first aspect of the invention, and a slant angle is in a range of ±0.3° in accordance with a reflection suppression angle.

By doing this, it is possible to realize an optical fiber in which the loss bandwidth is narrow so as to form a band rejection optical filter having a large loss area.

A fourteenth aspect of the optical fiber according to the present invention has an arbitrary loss spectrum which can be obtained by changing a grating period and magnitude of the refractive index change in a longitudinal direction of the optical fiber.

A fifteenth aspect of the optical fiber according to the present invention comprises a slant optical fiber grating according to claim 13, and a single mode optical fiber. In this aspect of the present invention, the slant optical fiber grating containing the optical fiber according to the first aspect having 8.0 μm to 10.0 μm diameter of mode field and a relative refractive index difference Δ of 0.40% to 0.55%, one or a plurality of slant optical fiber gratings are connected in series, and the single mode optical fiber for 1.3 μm transmission use is connected to the both ends of the slant optical fiber grating.

By doing this, it is possible to realize a band rejection optical filter in which a connection loss to the transmission single mode optical fiber is small and the loss bandwidth is small and the loss area is large.

A sixteenth aspect of the band rejection optical filter according to the present invention comprises a slant optical fiber grating according to the thirteenth aspect, and a single mode optical fiber. In this aspect of the present invention, the slant optical fiber grating containing the optical fiber according to the first aspect of the present invention having 8.0 μm to 9.0 μm diameter of mode field and a relative refractive index difference Δ of 0.50% to 0.55%, one or a plurality of slant optical fiber gratings are connected in series, and the dispersion shifted optical fiber is connected to the both ends of the slant optical fiber grating.

By doing this, it is possible to realize a band rejection optical filter in which a connection loss to the dispersion shifted optical fiber is small and the loss bandwidth is small and the loss area is large.

A seventeenth aspect of the present invention is a gain equalizing optical filter for an optical amplifier which has a plurality of slant optical fiber gratings according to the thirteenth aspect which are connected in series and comprising a slant optical fiber grating according to the seventh aspect of the present invention for equalizing a gain peak around 1530 nm band, and a slant optical fiber grating according to the eighth aspect for equalizing a gain peak around the 1555 nm band.

By doing this, it is possible to realize a gain equalizing optical filter for an optical amplifier which can equalize the gain of the optical amplifier over a wide wavelength range.

An eighteenth aspect of the present invention is a gain equalizing optical filter which is characterized in comprising, a slant optical fiber grating according to the thirteenth aspect of the present invention, and a single mode optical fiber. In the present aspect of the present invention, the slant optical fiber grating containing the optical fiber according to the first aspect of the present invention having a mode field of 8.0 μm to 10.0 μm diameter and a relative refractive index difference Δ of 0.40% to 0.55%, a plurality of slant optical fiber gratings are connected in series, and the single mode optical fiber for 1.3 μm transmission use is connected to the both ends of the slant optical fiber grating.

By doing this, it is possible to realize a gain equalizing optical filter for an optical amplifier in which the connection loss with the transmission single mode optical fiber is small so as to equalize the gain of the optical amplifier over a wide wavelength range.

A nineteenth aspect of the present invention is a gain equalizing optical filter which comprises a slant optical fiber grating, and a single mode optical fiber. In the present aspect of the present invention, the slant optical fiber grating containing the optical fiber according to the first aspect of the present invention having a mode field of 8.0 μm to 9.0 μm diameter and a relative refractive index difference Δ of 0.50% to 0.55%, a plurality of slant optical fiber gratings are connected in series, and the dispersion shifted optical fiber is connected to the both ends of the slant optical fiber grating.

By doing this, it is possible to realize a gain equalizing optical filter for an optical amplifier in which the connection loss to the dispersion shifted optical fiber is small so as to equalize the gain of the optical amplifier over a wide wavelength range.

A twentieth aspect of the present invention is an optical amplifier module containing a gain equalizing optical filter according to the seventeenth aspect of the present invention.

By doing this, it is possible to realize an optical amplifier module which can generate an amplified light of which gain is equalized over a wide range of wavelength bandwidth. Also, because the connection loss in the gain equalizing optical filter for the optical amplifier according to the present invention is small, it is possible to realize an optical amplifier module of which insertion loss is small if it is used as an optical amplifier module.

Furthermore, because the gain equalizing optical filter for the optical amplifier according to the present invention is manufactured by using an optical fiber of which bending loss is small, it is possible to realize an optical amplifier module of which bending loss is small so as to be organized in a narrow space if it is used as an optical amplifier module.

According to an optical fiber in this example, the core 1 contains at least two or more layers having different refractive indexes, the innermost layer is a lower photosensitivity layer of which photosensitivity to a change of refractive index by a light radiation is lower than a photosensitivity of the other layer, the cladding 2 contains at least two or more layers having different refractive indexes, and the layer which contacts the core 1 is a higher photosensitivity layer of which photosensitivity to a change of refractive index by a light radiation is higher than a photosensitivity of other layers. By doing this, it is possible to obtain preferable optical characteristics for maintaining filter characteristics in a narrow bandwidth and surpressing the loss area and a sideband by forming a band rejection optical filter by manufacturing a slant optical fiber grating by using the optical fiber.

Also, by manufacturing an optical fiber such that the outer diameter of the higher photosensitivity layer of the cladding 2 is twice or larger than the mode field diameter, it is possible to realize an optical fiber which can produce a band rejection optical filter having a narrow loss bandwidth and large loss area.

Also, by manufacturing an optical fiber such that a product of a ratio 1 between the core diameter and the diameter of the lower photosensitivity layer of the core 1 and a theoretical cut-off wavelength $\lambda_c$ is 0.98 or less, it is possible to realize an optical fiber which can produce a band rejection optical filter in which the loss area is 3.9 dB nm or larger.

Also, by manufacturing an optical fiber such that a quotient obtained by dividing a maximum value of the photosensitivity of the core 1 by a maximum value of the photosensitivity of the cladding 2 is 0.8 or larger, it is possible to realize an optical fiber which can produce a band rejection optical filter having a large loss area.

Also, by manufacturing an optical fiber such that the theoretical cut-off wavelength $\lambda_c$ is 1.22 µm or shorter, it is possible to realize an optical fiber which can produce a band rejection optical filter which can surpress ripples which is called a ghost mode, which is caused by a coupling of low order cladding mode and the guided mode.

Also, by manufacturing an optical fiber such that relative refractive index difference Δ between the core 1 and the innermost cladding layer and the theoretical cut-off wavelength $\lambda_c$ satisfy a relationship such as $\lambda_c > 2.48 - 4.53\Delta + 3.43\Delta^2$, it is possible to realize an optical fiber in which the bending loss under conditions of the bending diameter 40 mm is 0.1 dB/m. Also, by manufacturing a band rejection optical filter by using the optical fiber, it is possible to realize a band rejection optical filter in which the loss increase due to the band is small when odrganized in a narrow space.

Also, by manufacturing an optical fiber such that a loss generating bandwidth BW is 9 nm or shorter, and a product of a ratio l between the core diameter and the diameter of the lower photosensitivity layer of the core 1 and a theoretical cut-off wavelength $\lambda_c$ is 0.98 or less, it is possible to manufacture a gain equalizing optical filter which can equalize a gain peak around the 1530 nm band of the optical amplifier by using the optical fiber.

Also, by manufacturing an optical fiber such that a loss generating bandwidth BW is 15 nm or shorter, and a product of a ratio l between the core diameter and the diameter of the lower photosensitivity layer of the core 1 and a theoretical cut-off wavelength $\lambda_c$ is 0.85 or less, it is possible to manufacture a gain equalizing optical filter which can equalize a gain peak around the 1555 nm band of the optical amplifier by using the optical fiber.

Also, by manufacturing an optical fiber such that a relative refractive index difference $\Delta_{inclad}$ between the innermost cladding layer which contacts the core 1 and the outermost cladding layer among the layers contained in the cladding 2 and having different refractive indexes is in a range of $-0.1\% < \Delta_{inclad} < 0\%$, it is possible to prevent the transmission characteristics from being degraded due to an interference between a mode which is confined and transmitted in the innermost cladding layer and the guided mode. Also, it is possible to prevent unnecessary peaks from occurring due to the generation of a coupled mode when a band rejection optical filter is manufactured by using the optical fiber.

Also, by manufacturing an optical fiber made from a silica glass such that a main dopant to the lower photosensitivity layer of the core 1 is Al, a main dopant to the higher photosensitivity layer of the core 1 is Ge, a main dopant to the higher photosensitivity layer of the cladding 2 is Ge and B, and the amount of Ge which is added to the higher photosensitivity layer of the cladding is 3 wt % or more, it is possible to realize an optical fiber having the above-explained characteristics.

Also, by manufacturing an optical fiber made from a silica glass such that a main dopant to the lower photosensitivity layer of the core 1 is Al, a main dopant to the higher photosensitivity layer of the core 1 is Ge, main dopants to the higher photosensitivity layer of the cladding 2 are Ge and F, and amount of Ge which is added to the higher photosensitivity layer of the cladding is 4 wt % or more, it is possible to realize an optical fiber having the above-explained characteristics.

Also, by manufacturing an optical fiber made from a silica glass such that amount of Ge which is added to the lower photosensitivity layer of the core 1 is 1 wt % or lower, main dopants which are added to the higher photosensitivity layer of the core 1 are Ge and F, main dopants which are added to the higher photosensitivity layer of the cladding 2 are Ge and F, amount of Ge which is added to the higher photosensitivity layer of the cladding 2 is 5 wt %, and a main dopant which is added to the lower photosensitivity layer of the cladding is F, it is possible to realize an optical fiber having the above-explained characteristics. Also, by manufacturing a slant optical fiber grating using an optical fiber which is explained above such that aslant angle is in a range of ±0.3° in accordance with a reflection suppression angle, it is possible to manufacture a band rejection optical filter having a narrow loss bandwidth and a large loss area.

Also, by manufacturing a slant optical fiber grating using an optical fiber which is explained above such that a grating period and magnitude of the refractive index change in a longitudinal direction of the optical fiber are changed, it is possible to obtain an arbitrary loss spectrum.

Also, by forming a band rejection optical filter comprising a slant optical fiber grating and a single mode optical fiber such that the slant optical fiber grating containing the optical fiber according to the first aspect for 8.0 µm to 10.0 µm and a relative refractive index difference Δ of 0.40% to 0.55%, one or a plurality of slant optical fiber gratings are connected in series, and the single mode optical fiber for 1.3 µm transmission use is connected to the both ends of the slant optical fiber grating, it is possible to realize a band rejection optical filter in which the connection loss to a single mode optical fiber for transmission is small, the loss bandwidth is small, and the loss area is large.

Also, by forming a band rejection optical filter comprising a slant optical fiber grating and a single mode optical fiber such that the slant optical fiber grating containing the optical fiber for 8.0 µm to 9.0 µm and a relative refractive index difference Δ of 0.50% to 55%, one or a plurality of slant optical fiber gratings are connected in series, and the dispersion shifted optical fiber is connected to the both ends of the slant optical fiber grating, it is possible to realize a band rejection optical filter in which the connection loss to a dispersion shifted optical fiber for transmission is small, the loss bandwidth is small, and the loss area is large.

Also, by manufacturing a slant optical fiber grating by using an optical fiber such that, in order to equalize a gain peak around 1530 nm band, a loss generating bandwidth BW is 9 nm or shorter, and a product of a ratio l between the core diameter and the diameter of the lower photosensitivity layer of the core and a theoretical cut-off wavelength $\lambda_c$ is 0.98 or less, and by manufacturing a slant optical fiber grating by using an optical fiber such that, in order to equalize a gain peak around the 1555 nm band, such that a loss generating bandwidth BW is 15 nm or shorter, and a product of a ratio l between the core diameter and the diameter of the lower photosensitivity layer of the core and a theoretical cut-off wavelength $\lambda_c$ is 0.85 or less, and by connecting these slant optical fiber gratings in series, it is possible to realize a gain equalizing optical filter for optical amplifier in which gain of the optical amplifier can be equalized over a wide range of wavelengths.

By forming a gain equalizing optical filter for optical amplifier such that the slant optical fiber grating containing the optical fiber according to the first aspect for 8.0 µm to 10.0 µm and a relative refractive index difference Δ of 0.40% to 0.55%, a plurality of slant optical fiber gratings are connected in series, and the single mode optical fiber for 1.3 µm transmission use is connected to the both ends of the slant optical fiber grating, it is possible to realize a gain equalizing optical filter for optical amplifier in which the connection loss to a single mode optical fiber for transmission is small, and the gain of the optical amplifier can be equalized over a wide range of wavelengths.

Also, forming a gain equalizing optical filter for an optical amplifier such that the slant optical fiber grating containing the optical fiber for 8.0 μm to 9.0 μm and a relative refractive index difference Δ of 0.50% to 0.55%, a plurality of slant optical fiber gratings are connected in series, and the dispersion shifted optical fiber is connected to the both ends of the slant optical fiber grating, it is possible to realize a gain equalizing optical filter for optical amplifier in which the connection loss with a dispersion shifted optical fiber for transmission is small, and the gain of the optical amplifier can be equalized over a wide range of wavelengths.

Also, by forming an optical amplifier module by using a gain equalizing optical filter for optical amplifier according to the present invention, it is possible to realize an optical amplifier module which can generate an amplified light in which a gain is equalized over a wide range of wavelengths.

Also, in a gain equalizing optical filter for optical amplifier according to the present invention, because the connection loss is small, it is therefore possible to realize an optical amplifier module having a small insertion loss even if it is used as an optical amplifier module.

Furthermore, because a gain equalizing optical filter for optical amplifier according to the present invention is manufactured by using an optical fiber having a small bending loss, it is possible to realize an optical amplifier module which has a small bending loss when used as an optical amplifier module and which can be organized in a narrow space.

BRIEF DESCRIPTION OF THE DRAWINGS

FIGS. 23A and 23B are views showing changes of normalized bandwidth and normalized loss area to photosensitivity of the outer core under condition of relative refractive index difference Δ=0.5% and normalized frequency V=1.9.

FIGS. 24A and 24B are views showing changes of normalized bandwidth and normalized loss area to photosensitivity of the outer core under condition of relative refractive index difference Δ=0.4% and normalized frequency V=1.7.

FIG. 30A is a view for a case for long wavelength range. FIG. 30B is a view for a case for short wavelength range.

FIG. 31A is a view for a case for long wavelength range. FIG. 31B is a view for a case for short wavelength range.

FIG. 32A is a view for a case for long wavelength range. FIG. 32B is a view for a case for short wavelength range.

FIG. 33A is a view for a case for long wavelength range. FIG. 33B is a view for a case for short wavelength range.

FIG. 34A is a view for a case for long wavelength range. FIG. 34B is a view for a case for short wavelength range.

FIG. 35A is a view for a case for long wavelength range. FIG. 35B is a view for a case for short wavelength range.

FIG. 36A is a view for a case for long wavelength range. FIG. 36B is a view for a case for short wavelength range.

FIGS. 37A to 37C are views showing refractive index distribution in a manufacturing example of an optical fiber according to the present invention.

DETAILED DESCRIPTION OF THE INVENTION

The present invention is explained below in detail.

An optical fiber according to the present invention comprises a core and a cladding which is disposed around the core, wherein the core contains at least two or more layers having different refractive indexes. The innermost layer is a lower photosensitivity layer of which photosensitivity to a change of refractive index by a light irradiation is lower than a photosensitivity of other layer, the cladding contains at least two or more layers having different refractive indexes, the layer which contacts the core is a higher photosensitivity layer of which photosensitivity to a change of refractive index by a light irradiation is higher than a photosensitivity of other layers.

Figure 1A:
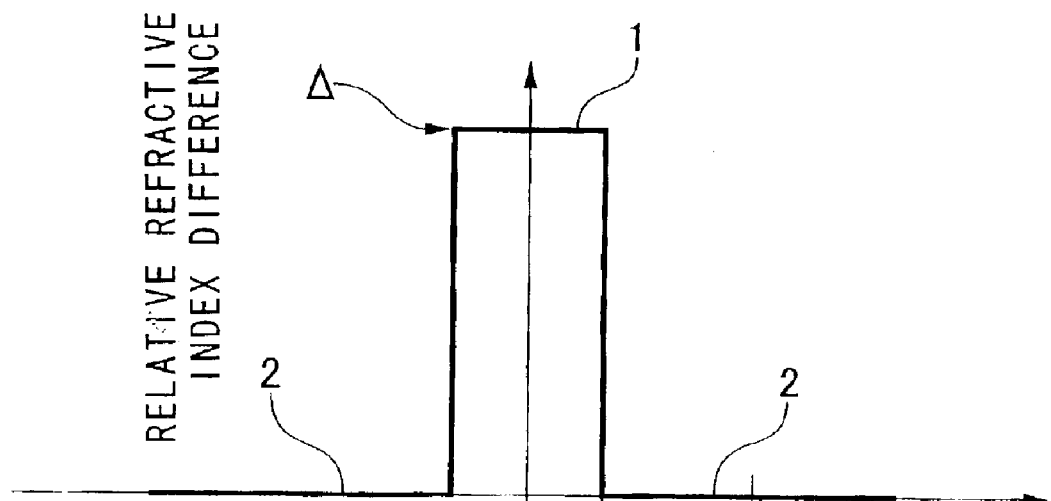
FIGS. 1A and 1B are views showing relative refractive index differences and normalized photosensitivity for each layer of the core and the cladding of an optical fiber according to the present invention.
Figure 1B:
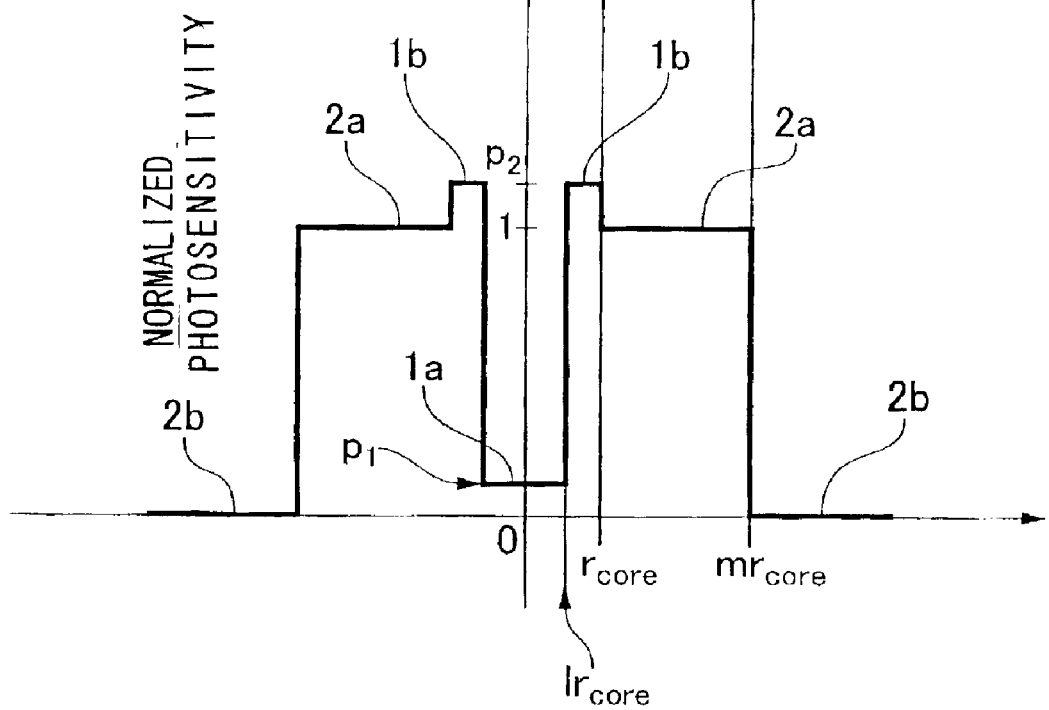
Figure 2A:
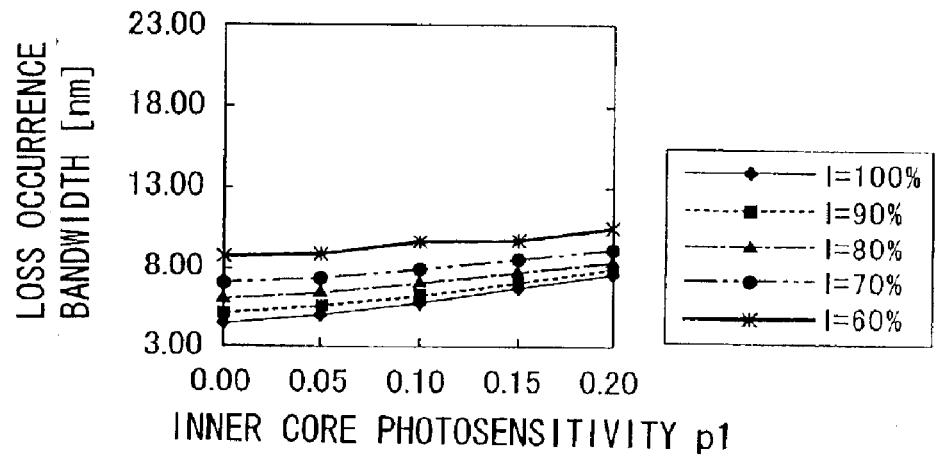
FIGS. 2A to 2C are views of changes of the loss occurrence bandwidth to photosensitivity under conditions in which the relative refractive index difference Δ is 0.3%.
Figure 2B:
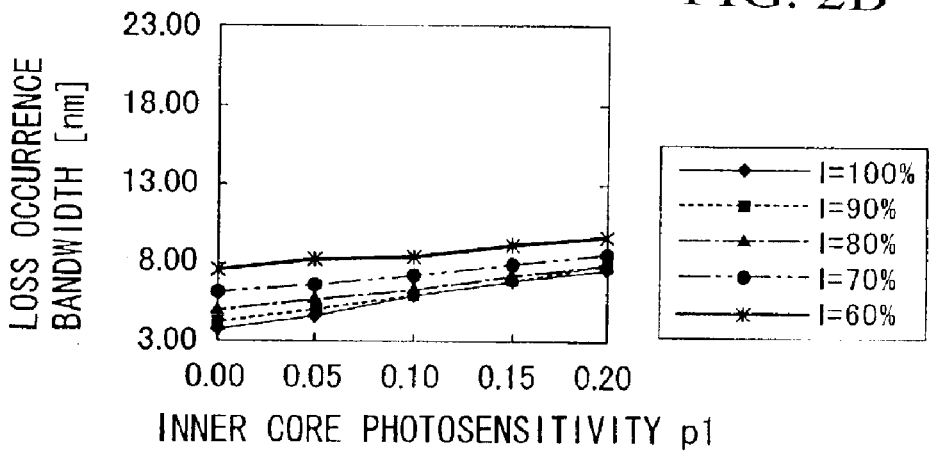
Figure 2C:
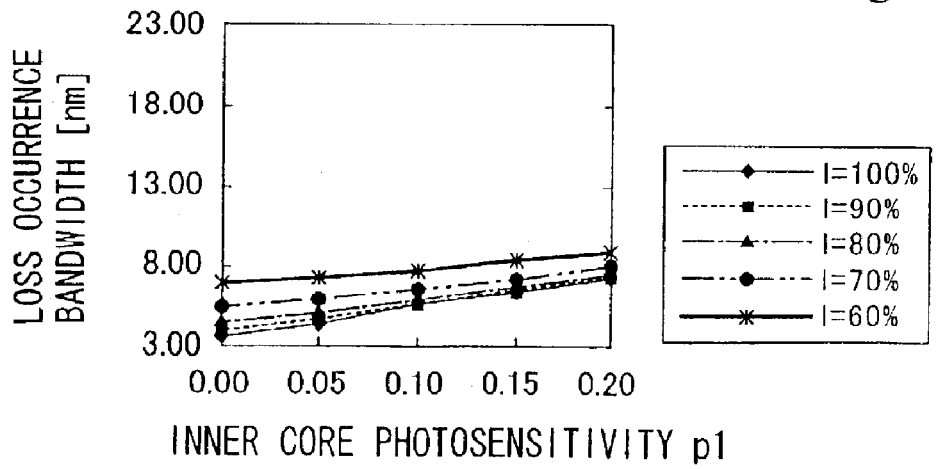
Figure 3A:
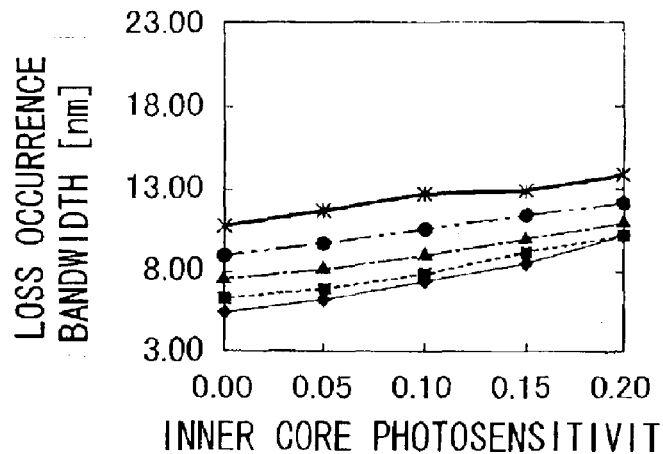
FIGS. 3A to 3C are views of changes of the loss occurrence bandwidth to photosensitivity under conditions in which the relative refractive index difference Δ is 0.4%.
Figure 3B:
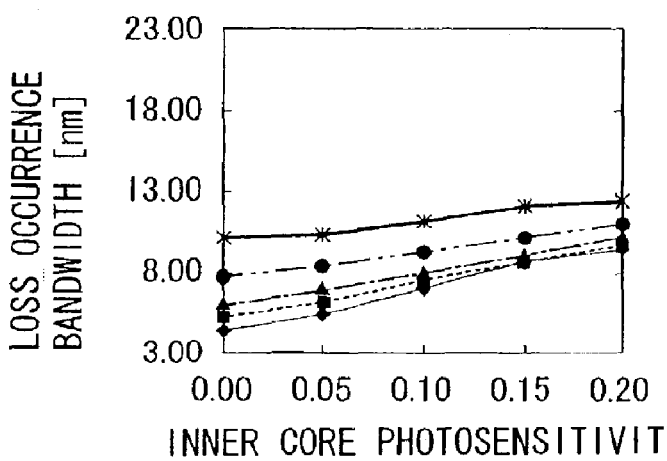
Figure 3C:
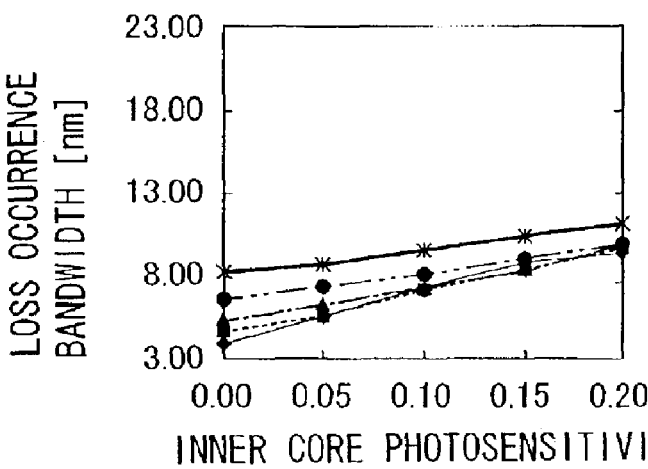
Figure 4A:
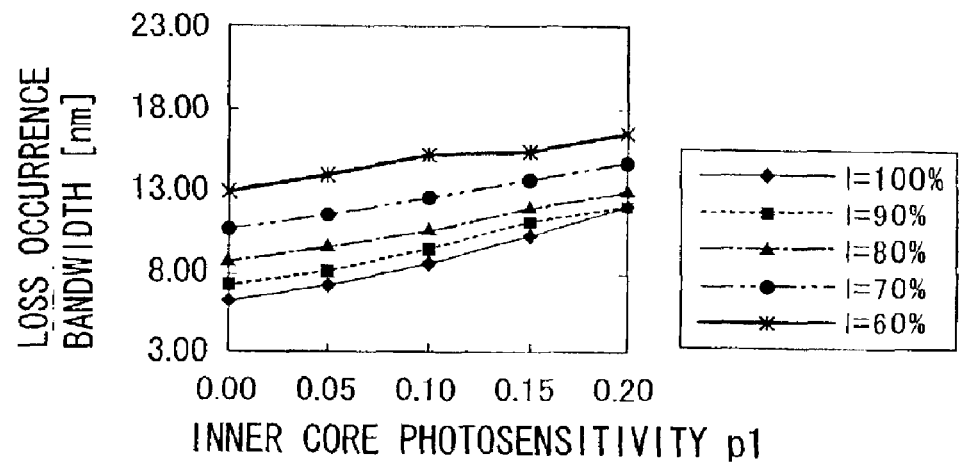
FIGS. 4A to 4C are views of changes of the loss occurrence bandwidth to photosensitivity under conditions in which the relative refractive index difference Δ is 0.5%.
Figure 4B:
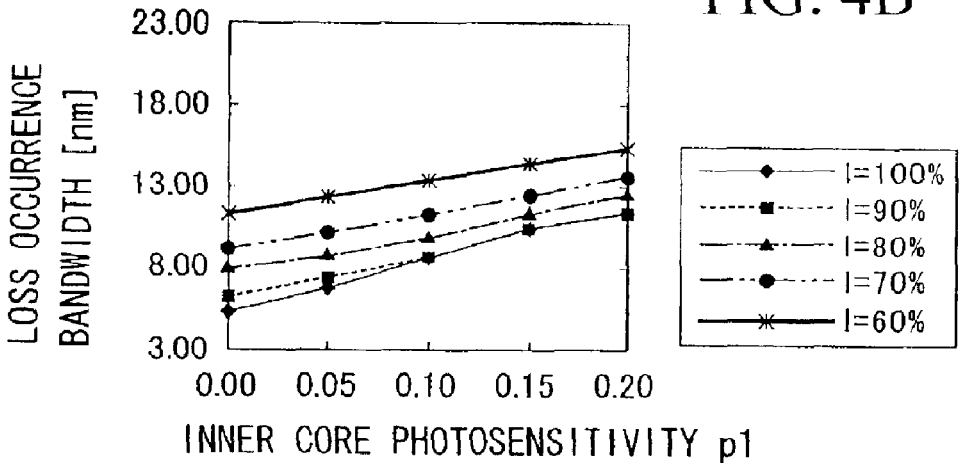
Figure 4C:
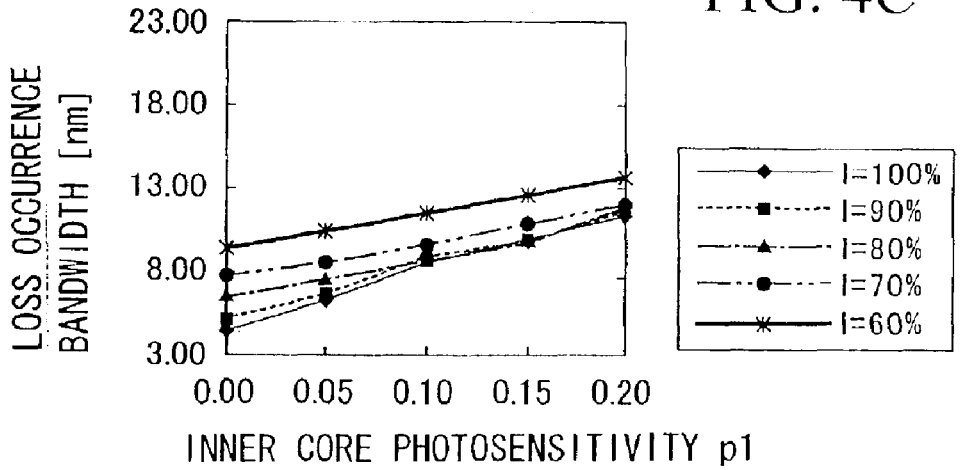
Figure 5A:
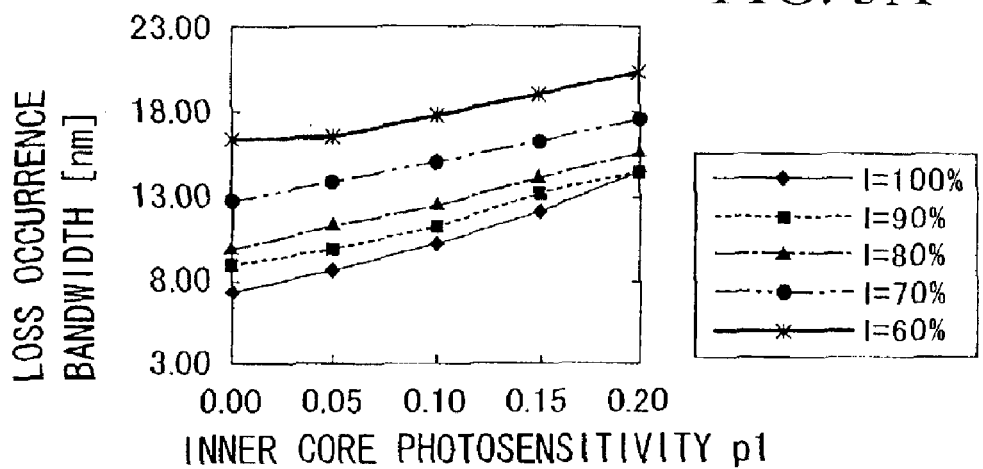
FIGS. 5A to 5C are views of changes of the loss occurrence bandwidth to photosensitivity under conditions in which the relative refractive index difference Δ is 0.6%.
Figure 5B:
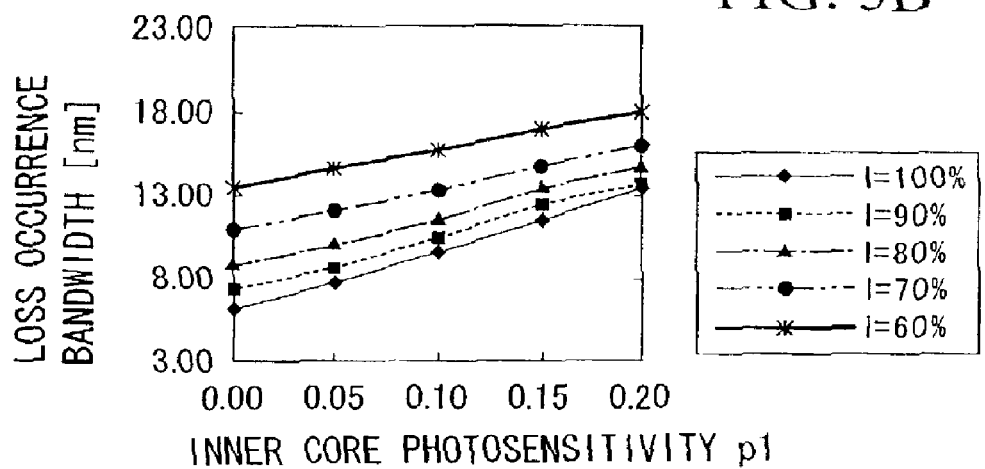
Figure 5C:
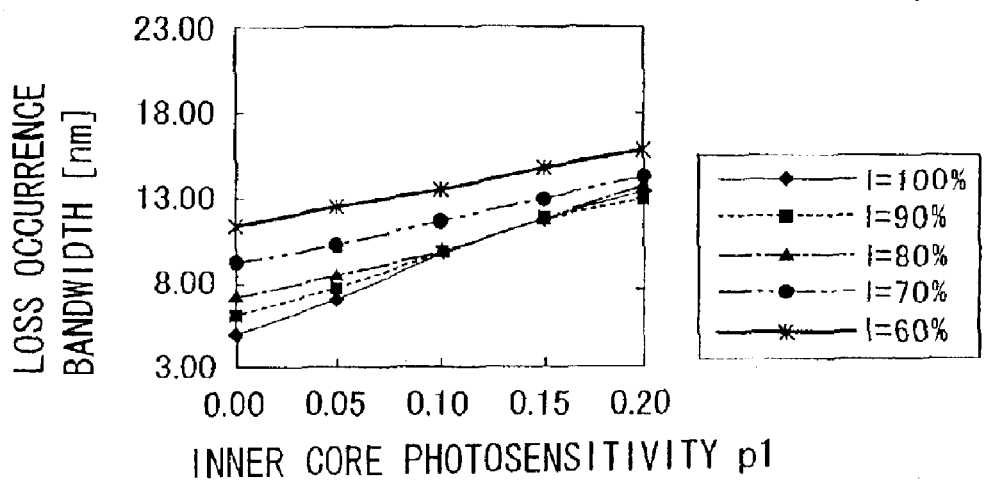
Figure 6A:
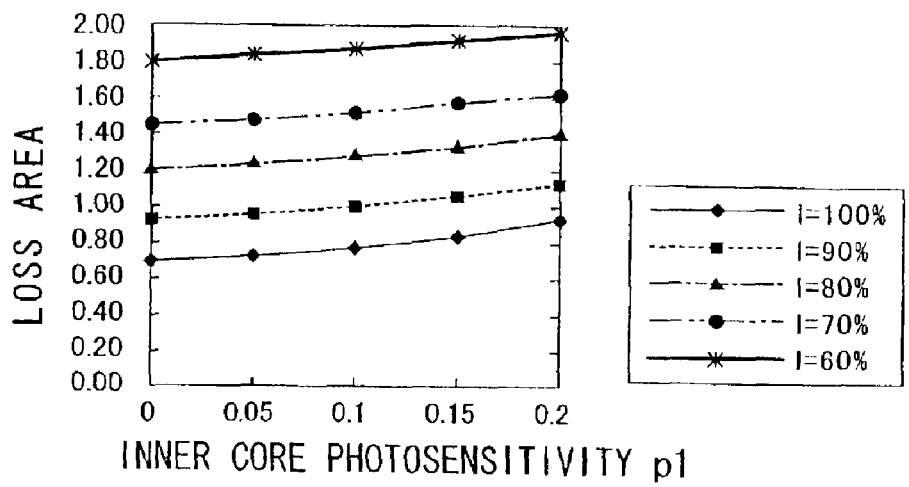
FIGS. 6A to 6C are views of changes of the loss area to photosensitivity under conditions in which the relative refractive index difference Δ is 0.3%.
Figure 6B:
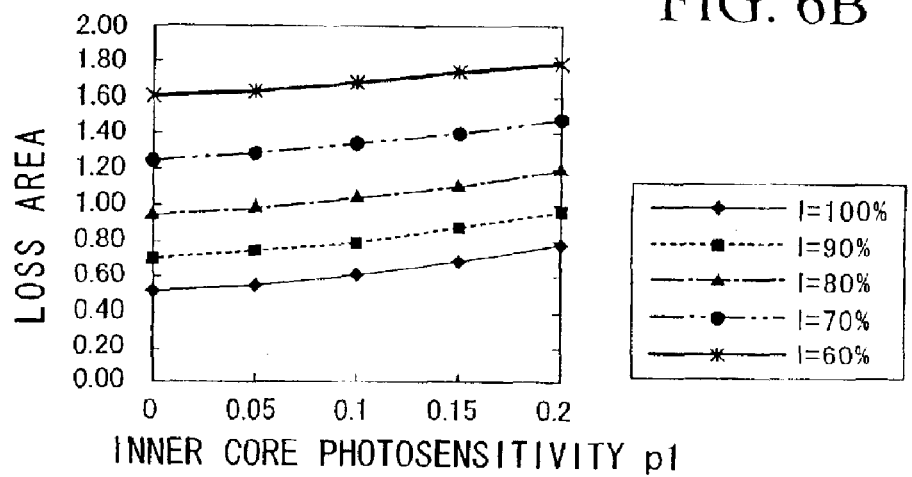
Figure 6C:
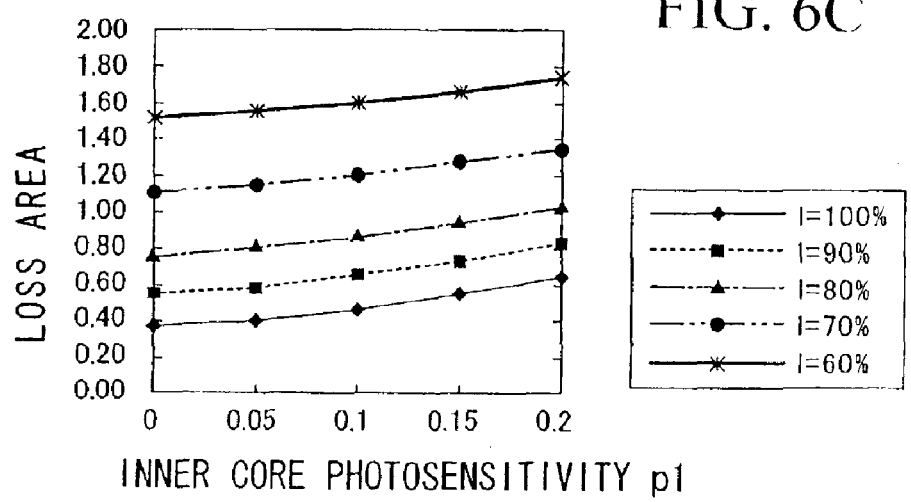
Figure 7A:
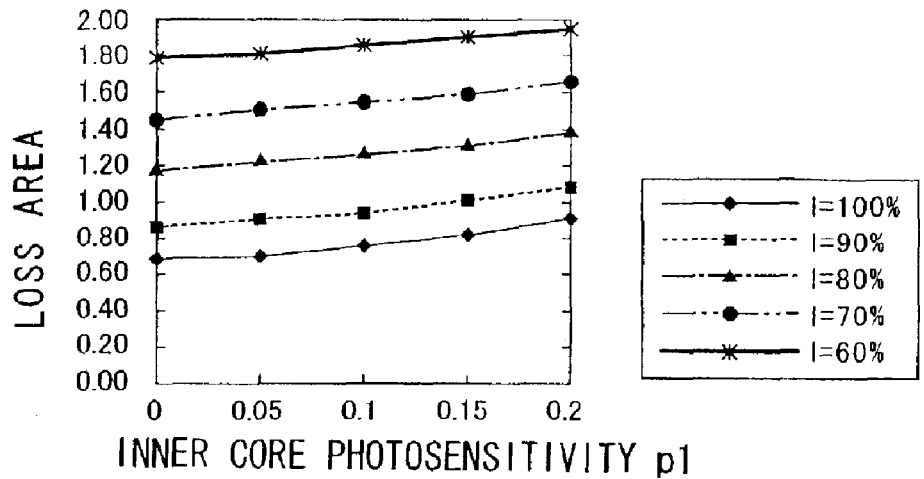
FIGS. 7A to 7C are views of changes of the loss area to photosensitivity under conditions in which the relative refractive index difference Δ is 0.4%.
Figure 7B:
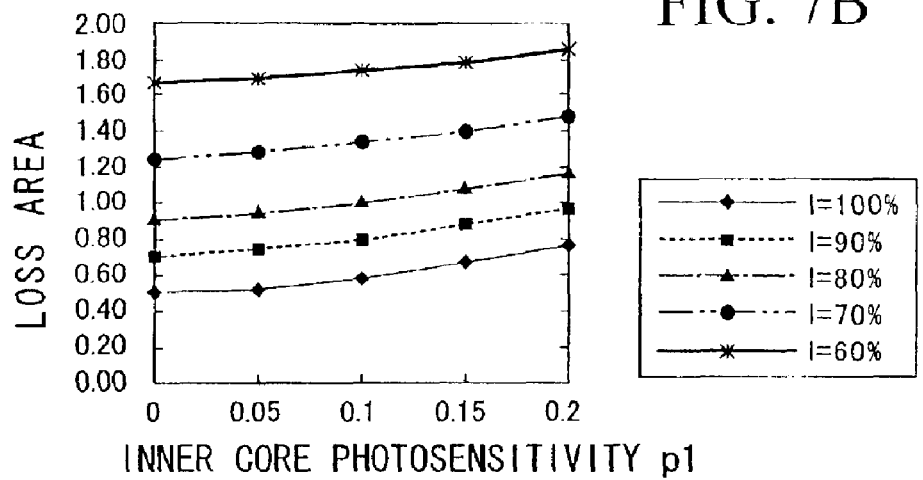
Figure 7C:
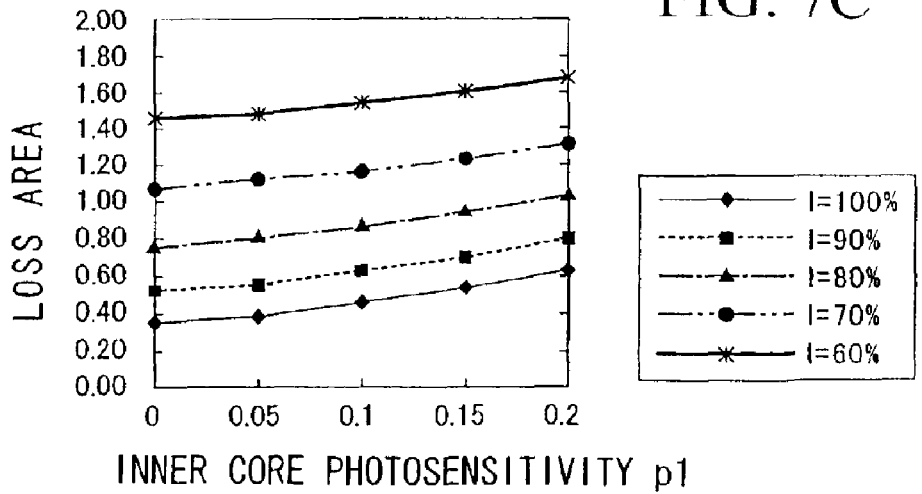
Figure 8A:
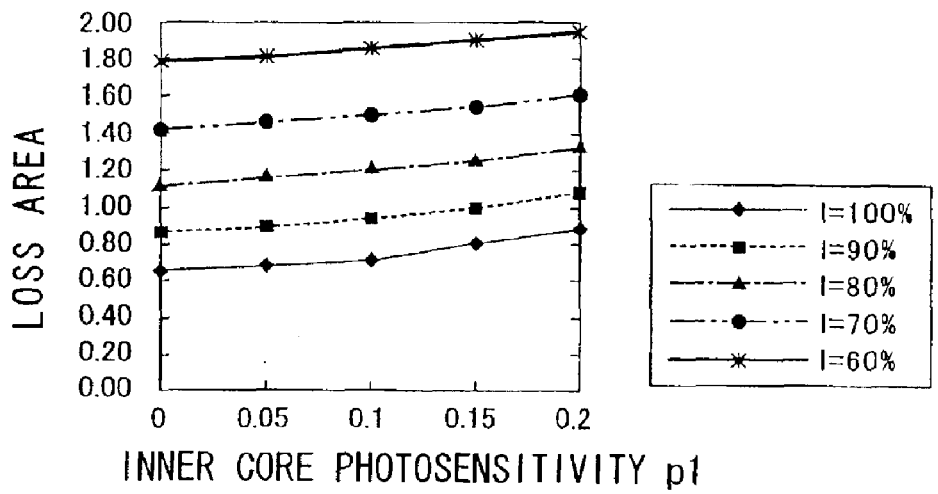
FIGS. 8A to 8C are views of changes of the loss area to photosensitivity under conditions in which the relative refractive index difference Δ is 0.5%.
Figure 8B:
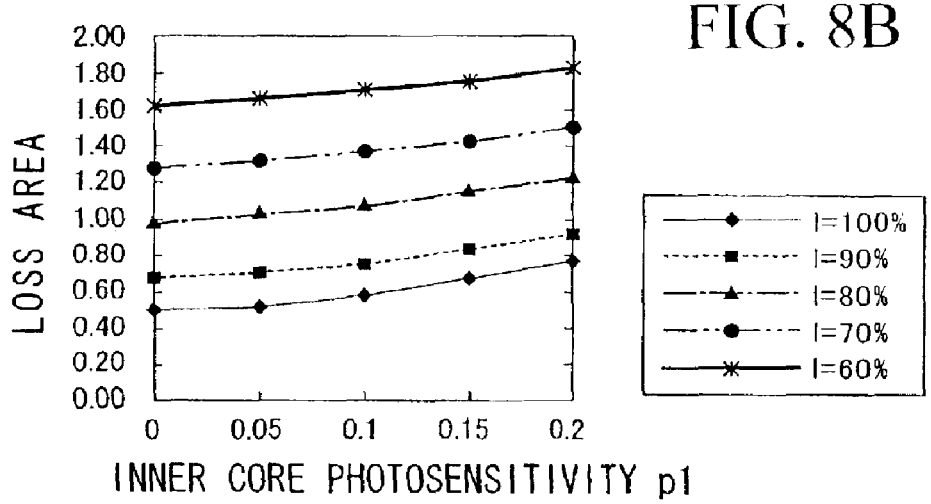
Figure 8C:
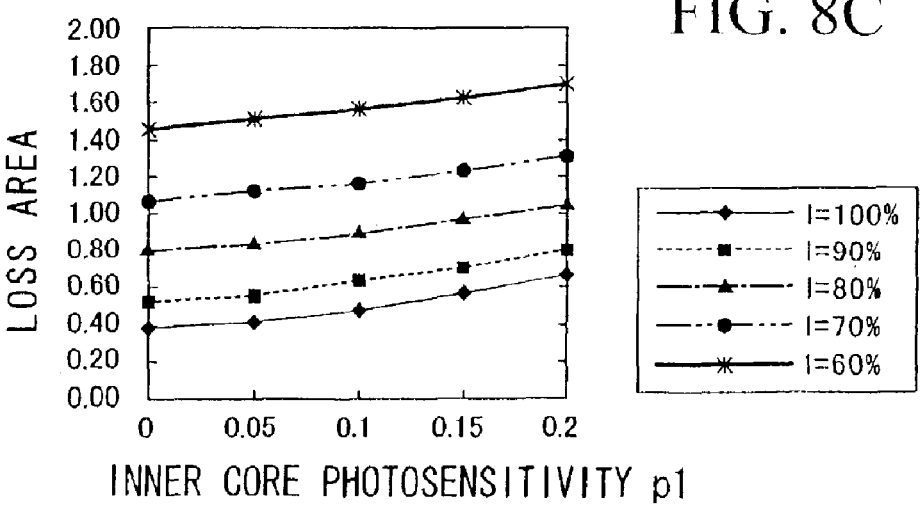
Figure 9A:
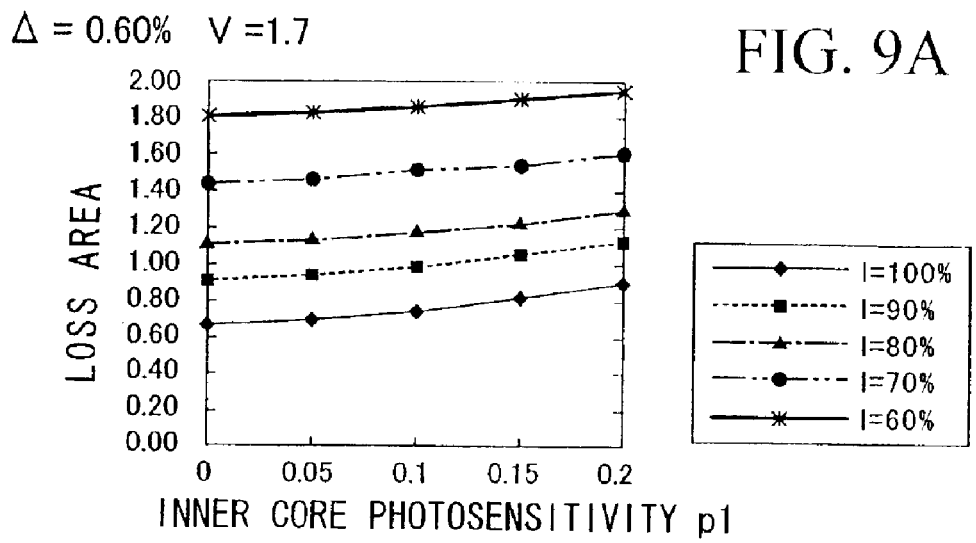
FIGS. 9A to 9C are views of changes of the loss area to photosensitivity under conditions in which the relative refractive index difference Δ is 0.6%.
Figure 9B:
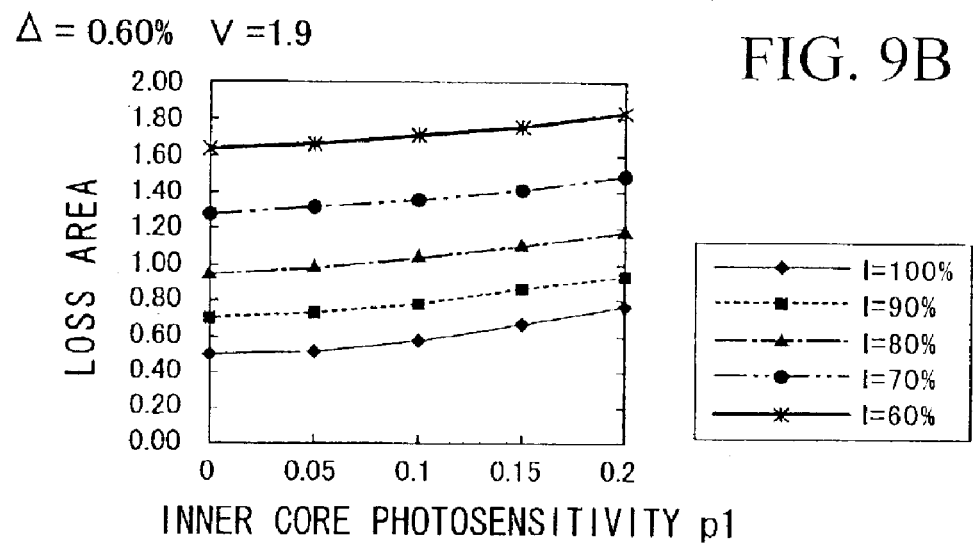
Figure 9C:
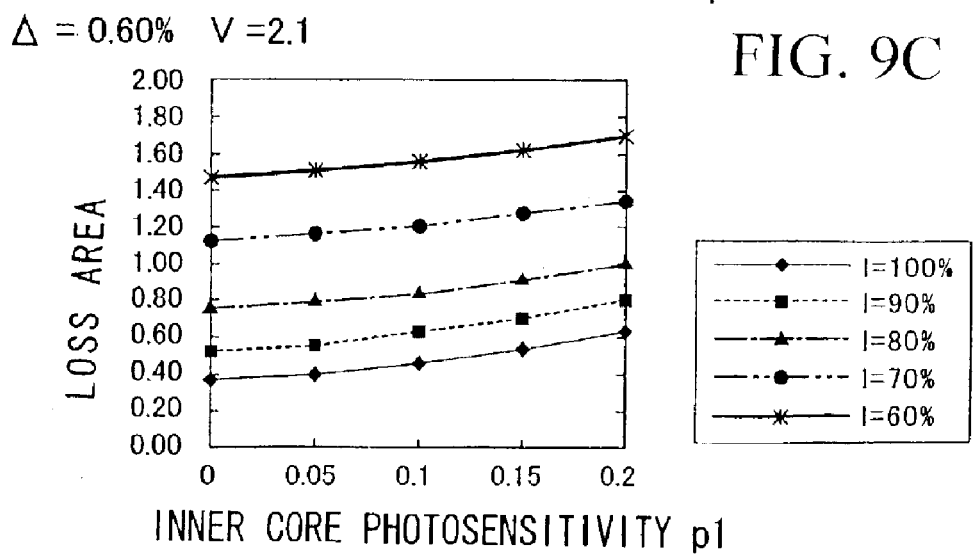

FIGS. 1A and 1B show an example of the distribution of the refractive index and the photosensitivity of the optical fiber according to the present invention.

In FIG. 1A, reference numeral 1 indicates a core. Reference numeral 2 indicates a cladding. The refractive index of the core 1 is formed higher than the refractive index of the cladding 2. The relative refractive index difference to the cladding 2 with reference to the core 1 is Δ.

In the core 1, the photosensitivity of an inner core 1a which is a center part of the core 1 is formed lower and the photosensitivity of an outer core 1b which is disposed closer to the cladding 2 is formed higher. Therefore, here, the inner core 1a is a lower photosensitivity layer. In the cladding 2, the photosensitivity of an inner cladding 2a which is disposed closer to the core 1 is formed higher. The photosensitivity of an outer cladding 2b which is disposed outside of the cladding 2a is formed lower. Therefore, here, the inner core 1a is a lower photosensitivity layer. Therefore, here, the inner cladding 2a is the higher photosensitivity layer.

Under conditions that the photosensitivity of the inner cladding 2a is 1 as a reference, photosensitivity of the inner core 1a is $p_1$, and photosensitivity of the outer core 1b is $p_2$. Also, an outer radius of the core 1 is $r_{core}$, an outer radius of the inner core 1a is $lr_{core}$, and an outer radius of the inner cladding 2a is $mr_{core}$.

Optical characteristics of the slant optical fiber grating which uses the optical fiber under conditions that the diameter and the photosensitivity of each layer of the core 1 and the cladding 2 are varied is explained by comparing to a conventional case.

At first, simulating calculation for relative refractive index difference Δ and normalized frequency V was performed by using parameters shown in FIG. 1 such as a diameter ratio 1 of the inner core 1a to the core 1 and the photosensitivity ratio $p_1$ of the inner core 1a under condition of the photosensitivity ratio p2=1 for the inner cladding 2a to the outer core 1b and the diameter ratio m=3 for the photosensitive cladding such as inner cladding 2a to the core 1. The condition for the grating is the same as that shown in FIGS. 1A and 1B.

Figure 49:
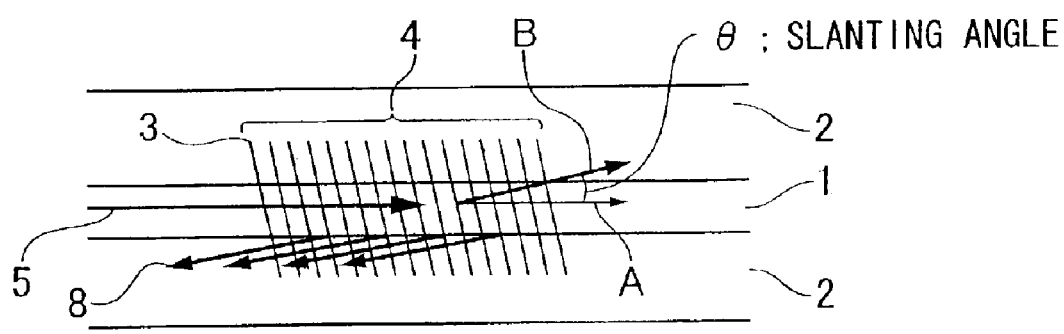
FIG. 49 is a view showing a structure of slant optical fiber grating.
Figure 50:
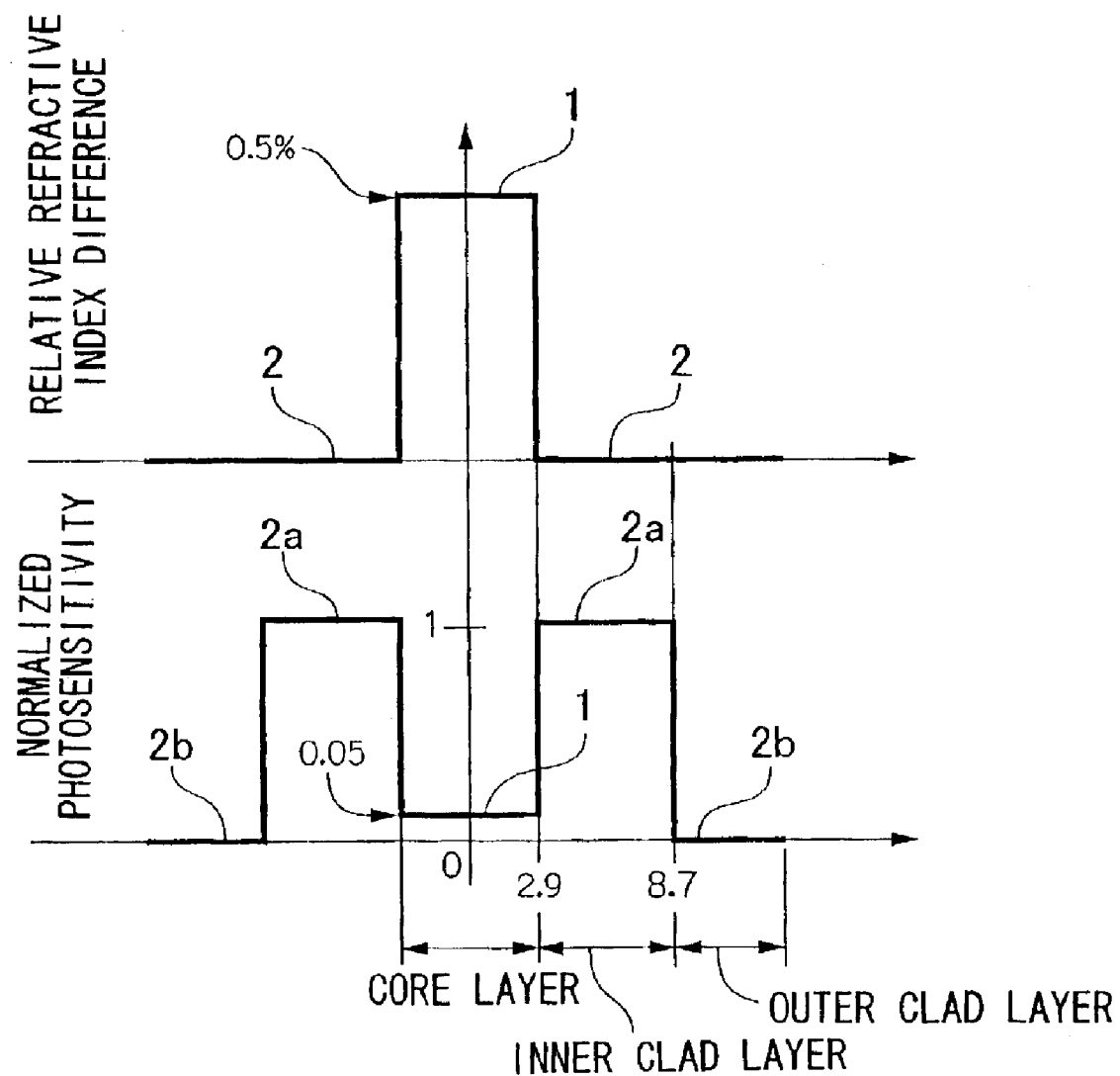
FIG. 50 is a view showing relative refractive index difference and normalized photosensitivity of an optical fiber which was used for manufacturing a conventional slant optical fiber grating.
Figure 51:
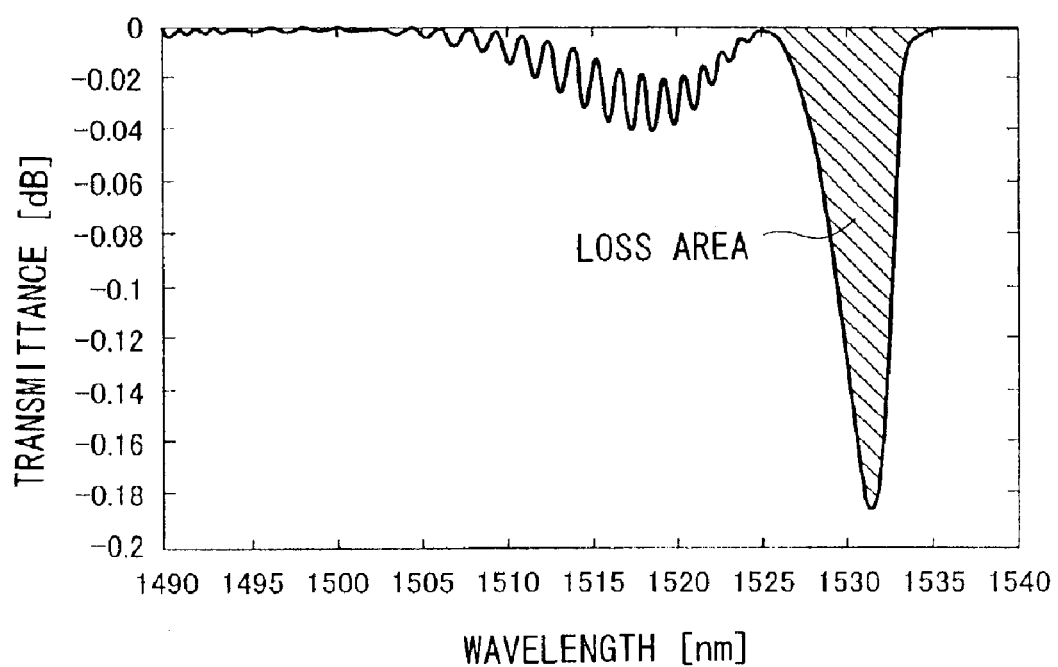
FIG. 51 is a view showing an example of simulation result for loss spectrum of a conventional slant optical fiber grating.

According to results which were obtained by the above-explained simulation, the optical characteristics of the slant optical fiber grating having a structure shown in FIG. 49 such as loss occurrence bandwidth and loss area are shown in FIGS. 2A to 9C. Here, the loss occurrence bandwidth is defined as a width at which dB ratio is 0.05 to the peak loss. The loss area in a main band in which the loss occurs is defined as an area in which the loss becomes minimum, i.e., the transparency becomes maximum in the short wavelength.

In FIGS. 2A to 9C, a line which is indicated by I=100% indicates optical characteristics of the conventional optical fiber in which the outer core 1b having higher photosensitivity is not provided. The loss area is a relative value in the dB scale. In the case of an optical fiber which exhibits a rejection loss in FIG. 52, its loss area is nearly equivalent to 0.7. Under this condition, the relative refractive index difference Δ is 0.4%, the core sensitivity is 0.2, and the normalized frequency V is 2.0.

According to the above-explained result, it is understood that the optical fiber in which the loss area is 9 as a relative value, i.e., 3.9 dB nm as an actual value or larger having the conventional structure cannot be produced unless greater amount of Ge is added.

On the other hand, similar to a case of the optical fiber according to the present invention, it is understood that by providing the outer core 1b having higher photosensitivity on the outside of the core 1, it is possible to improve greatly the loss area without enlarging the bandwidth with compared to a case in which the photosensitivity of the inner core 1a is increased.

Figure 10:
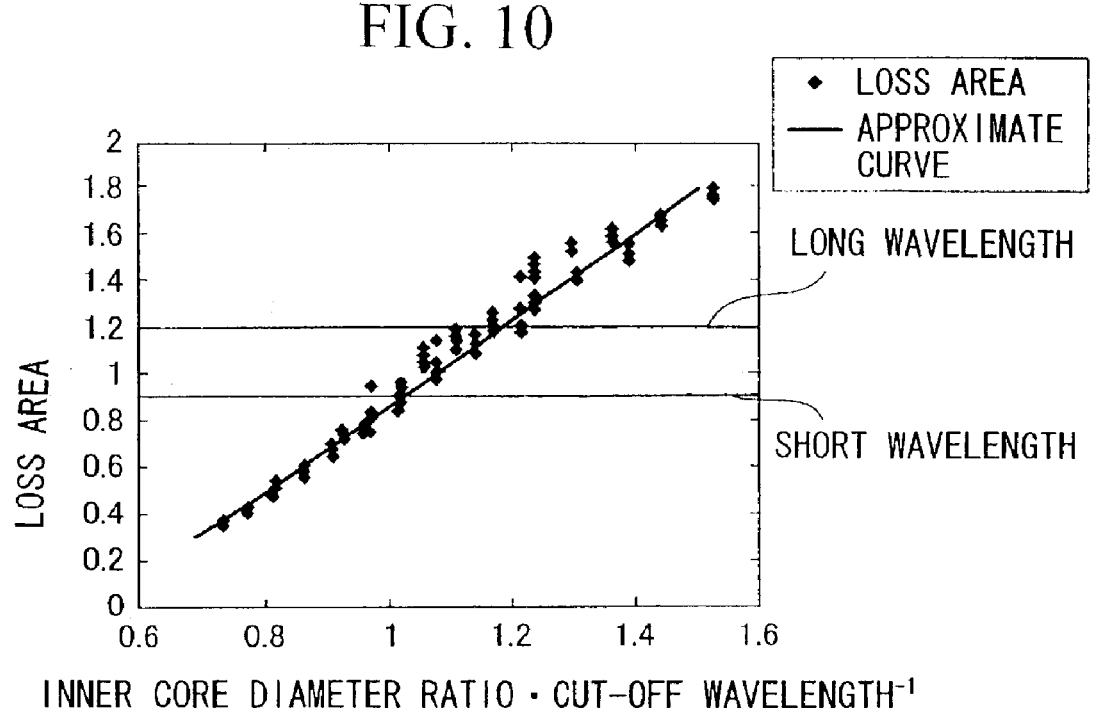
FIG. 10 is a view showing of changes of loss area to a reciprocal of a product of a ratio of an inner core diameter to the core diameter and a cut-off wavelength.

Based on the result of the above-explained simulation, first, here, a tendency of the loss area according to parameters of the optical fiber is explained. Here, the loss area under conditions that the photosensitivity of the inner core 1a is 0 (zero) is plotted in a form of a function for obtaining a reciprocal of a product of the diameter ratio l of the inner core 1a to the core 1 and a theoretical cut-off wavelength $\lambda_c$ as shown in FIG. 10. Here, the theoretical cut-off wavelength $\lambda_c$ is represented by a formula F1.

$$\lambda_c = \frac{V\lambda}{2.405} \quad \text{F1}$$

Here, λ indicates an operation wavelength. Here 1.55 μm is used. According to FIG. 10, the loss area shows almost in linear relation. An approximate formula is represented by a formula F2 as follows.

$$Sloss = 1.9/(1 \cdot \lambda_c) - 1.03 \quad \text{F2}$$

Therefore, the condition for obtaining the loss area of which loss area is 0.9 or larger can be represented by a formula F3 as follows.

diameter ratio $l$ of the inner core to the core-theoretical cut-off wavelength $\lambda_c$[μm]<0.98   F3

By doing this, it is understood that under condition that the cut-off wavelength is 1.1 μm, the radius of the inner core 1a is 85% or lower than the core radius.

Next, a tendency of the loss occurrence bandwidth according to the parameters of the optical fiber is explained.

Figure 11:
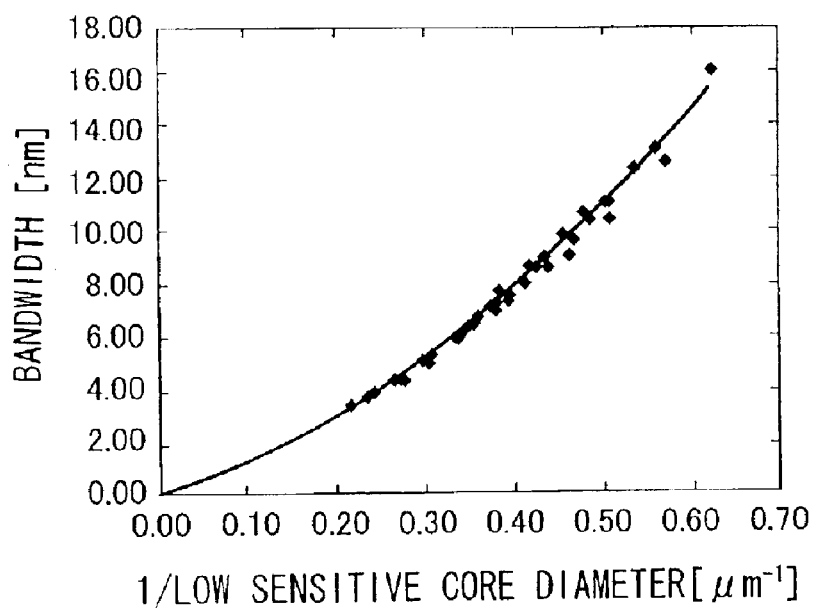
FIG. 11 is a view showing changes of the loss bandwidth to a reciprocal diameter under conditions in which photosensitivity of the inner core as a low photosensitive core is 0 (zero).
Figure 12:
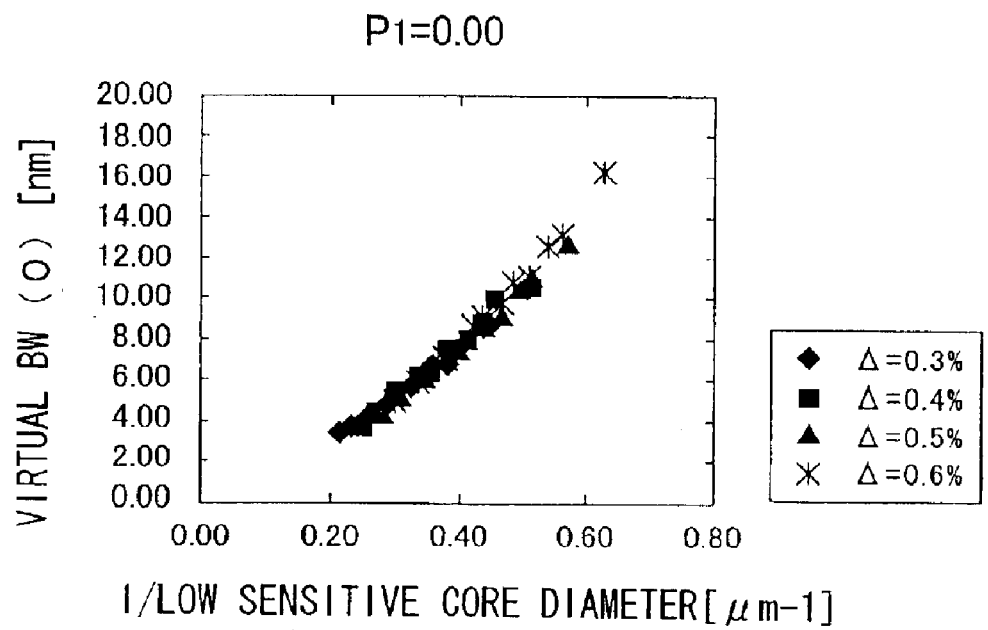
FIG. 12 is a view showing of changes of a virtual loss bandwidth to a reciprocal of the inner core diameter under conditions of inner core photosensitivity $p_1$=0.00.
Figure 13:
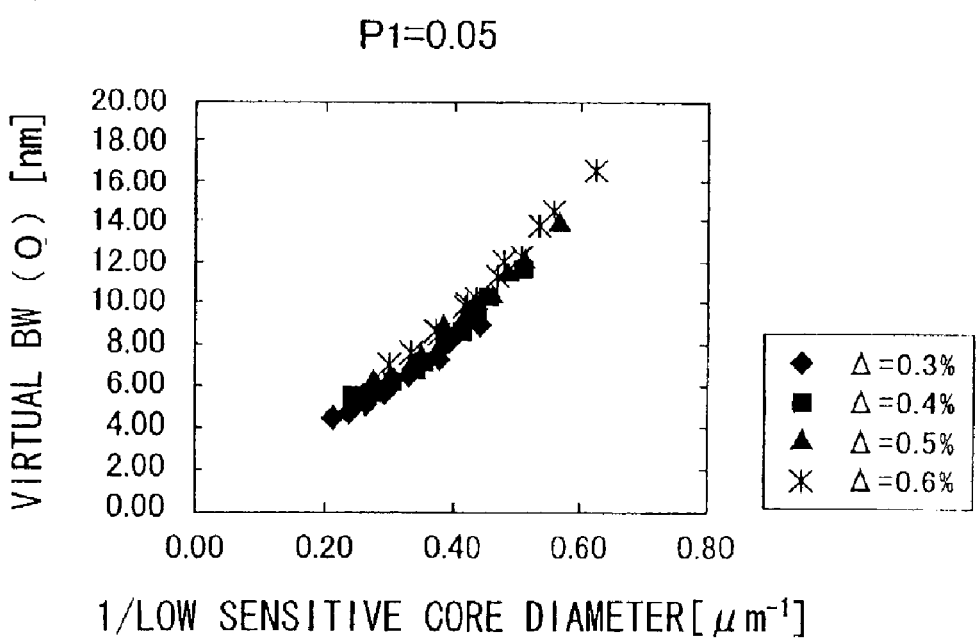
FIG. 13 is a view showing changes of a virtual loss bandwidth to a reciprocal of the inner core diameter under conditions of inner core photosensitivity $p_1$=0.05.
Figure 14:
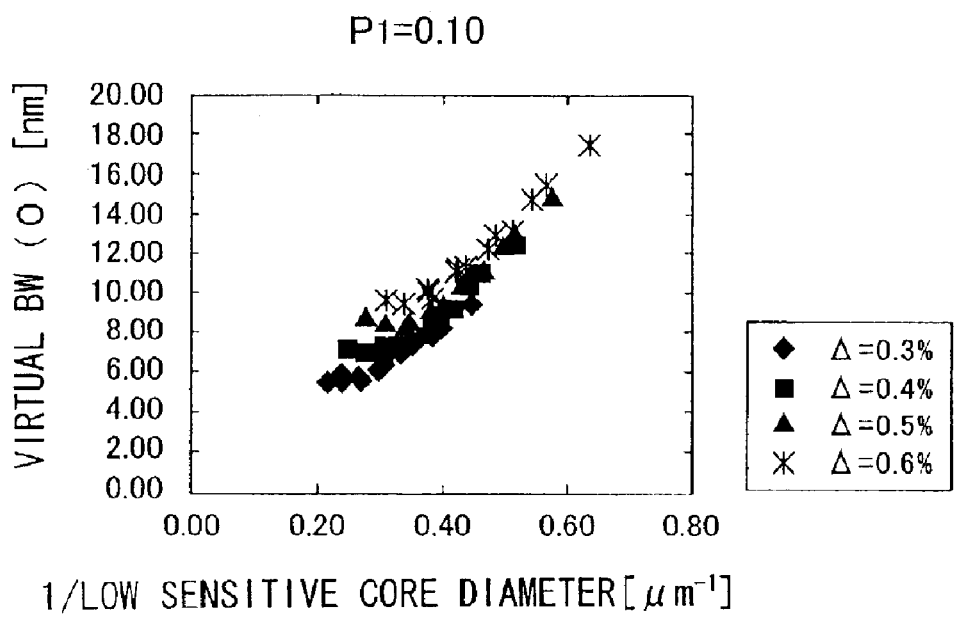
FIG. 14 is a view showing changes of a virtual loss bandwidth to a reciprocal of the inner core diameter under conditions of inner core photosensitivity $p_1$=0.10.
Figure 15:
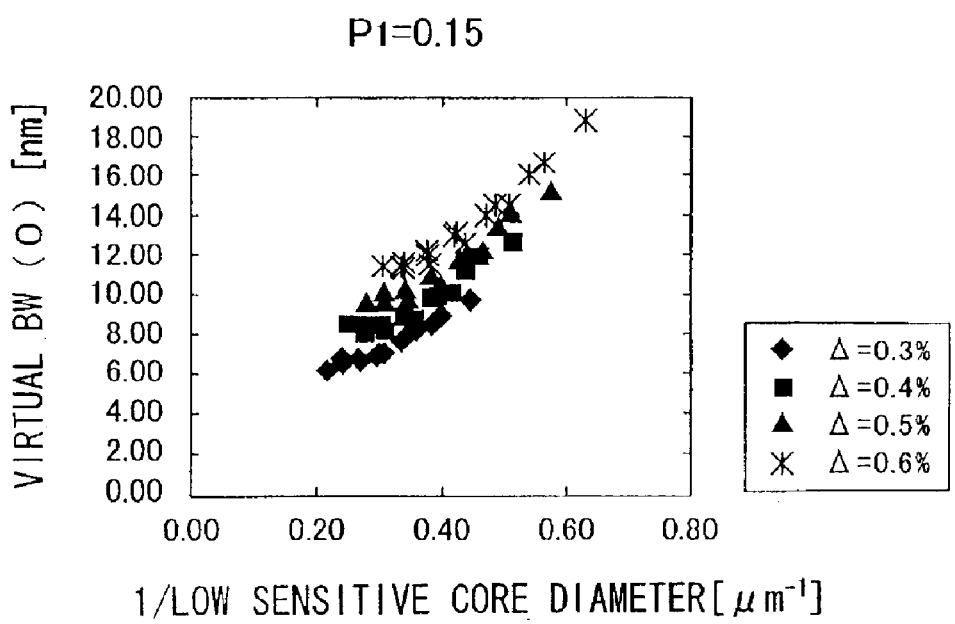
FIG. 15 is a view showing changes of a virtual loss bandwidth to a reciprocal of the inner core diameter under conditions of inner core photosensitivity $p_1$=0.15.
Figure 16:
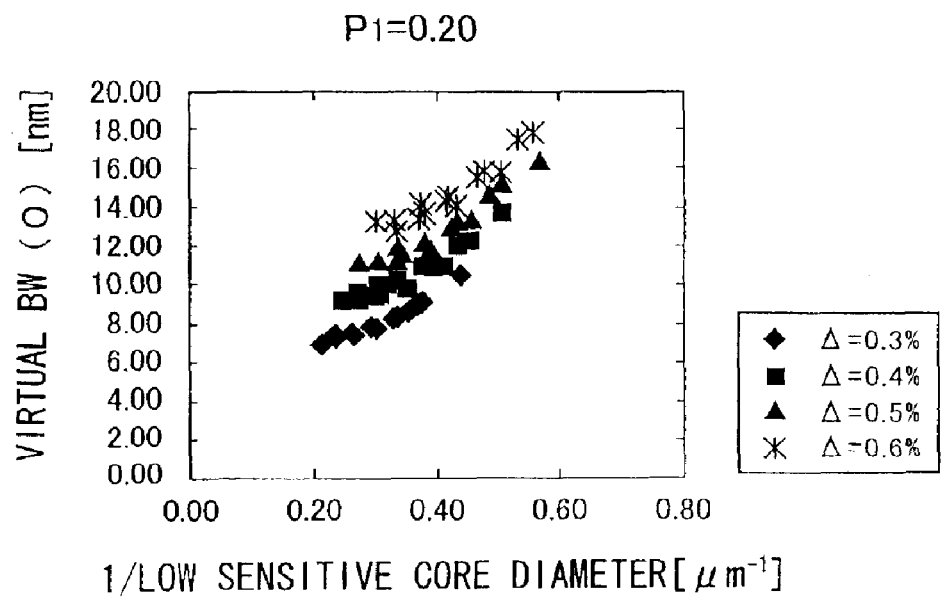
FIG. 16 is a view showing changes of a virtual loss bandwidth to a reciprocal of the inner core diameter under conditions of inner core photosensitivity $p_1$=0.20.

Under conditions that the photosensitivity of the inner core 1a is 0 (zero), a function for representing a bandwidth in the simulation and the radius of the inner core which is a lower photosensitive core such as a production of the radius ratio l of the inner core 1a and the core radius are plotted as shown in FIG. 11. Here, the core radius can be represented by a formula F4 as follows.

$$r_{core} = \frac{V\lambda}{2\pi \cdot n_{clad}\sqrt{2\Delta}} \quad \text{F4}$$

In F4, $n_{clad}$ indicates a refractive index of the cladding.

According to FIG. 11, it is understood that the loss occurrence bandwidth has a certain tendency to the radius of the inner core as a lower photosensitivity core. The loss occurrence bandwidth BW can be represented approoximately by a formula F5 as follows.

$$BW = \{a_1 \cdot (1/l \cdot r_{core})^2 + a_2 \cdot (1/l \cdot r_{core})\} \quad \text{F5}$$

Next, a case in which the photosensitivity of the inner core 1a is not 0 (zero) is analyzed. In this case, an increasing ratio of a coupling coefficient to the reflection mode can be represented as $p_1 \cdot P_{inside}/P_{outside}$ under conditions of a power ratio of the inner core 1a in a fundamental mode is $P_{inside}$, and a power ratio which is outside of the inner core 1a in the fundamental mode is $P_{outside}$. Here, the $P_{inside}$ and $P_{outside}$ can be represented approximately by formulae F6 and F7.

$$P_{inside} = 1 - \exp\left[-2\left(\frac{l \cdot 2r_{core}}{MFD}\right)^2\right] \quad \text{F6}$$

$$P_{outside} = 1 - P_{inside} \quad \text{F7}$$

Here, it is assumed that a reflection surpressing angle increases in proportion to the increase of the coupling coefficient to the reflection mode; thus, the loss occurrence bandwidth increases proportionally. In this case, a formula F8 can be satisfied.

$$BW_{(P1)} \cdot (1 - p_1 \cdot P_{inside}/P_{outside}) = BW(0) \quad \text{F8}$$

Here, a function for obtaining $1/l \cdot r_{core}$ under conditions that the BW(0) is the virtual loss bandwidth is plotted. The result is shown in FIGS. 12 to 16. In these cases, it is understood that the plotted line becomes further a line indicating a condition as $P_1=0$ and the virtual loss bandwidths BW are not disposed in one line perfectly when the relative refractive index difference $\Delta$ is large or when $P_1$ is large. Here, in order to adjust it, constant terms which depend on $\Delta$ and p1 are added to the left side of the F8. Here, a formula F9 is expressed as follows.

$$BW_{(p_1)} \cdot (1 - p_1 \cdot P_{inside}/P_{outside}) - p_1 \cdot (b_1 \cdot \Delta + b_2) = BW(0) \quad \text{F9}$$

Figure 17:
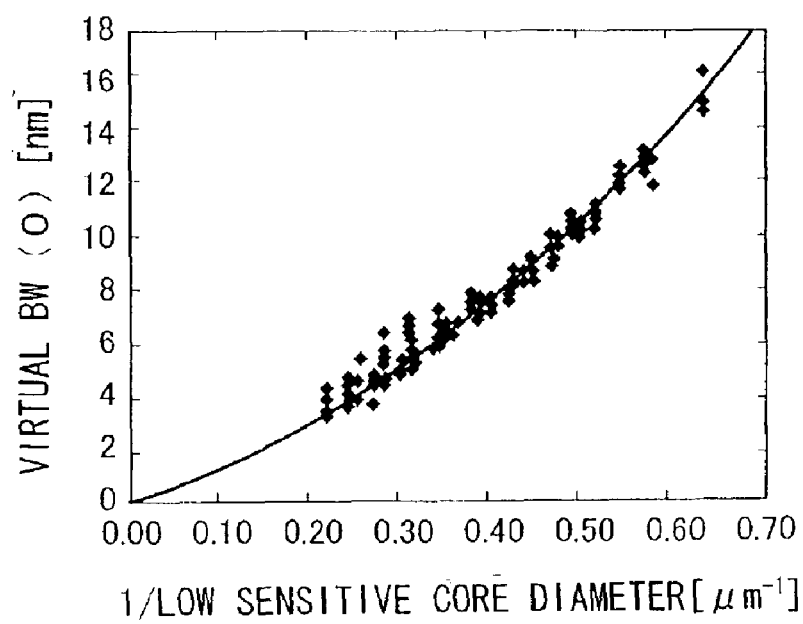
FIG. 17 is a view showing changes of virtual loss bandwidth to a reciprocal of the inner core diameter.
Figure 18A:
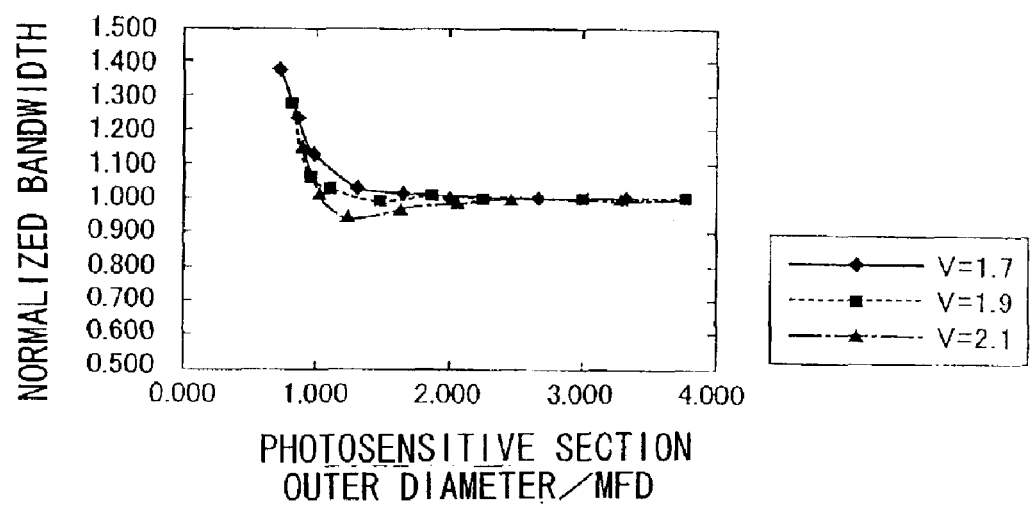
FIGS. 18A and 18B are view showing changes of normalized bandwidth and normalized loss to a quotient obtained by dividing an outer diameter of a cladding photosensitive section by MFD under condition of relative refractive index difference Δ=0.5% and the inner core diameter ratio=80%.
Figure 18B:
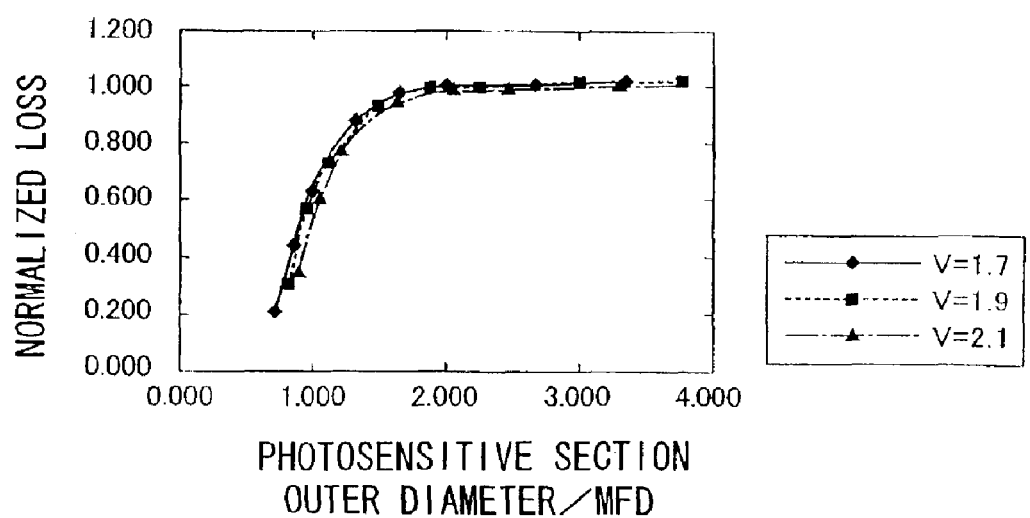
Figure 19A:
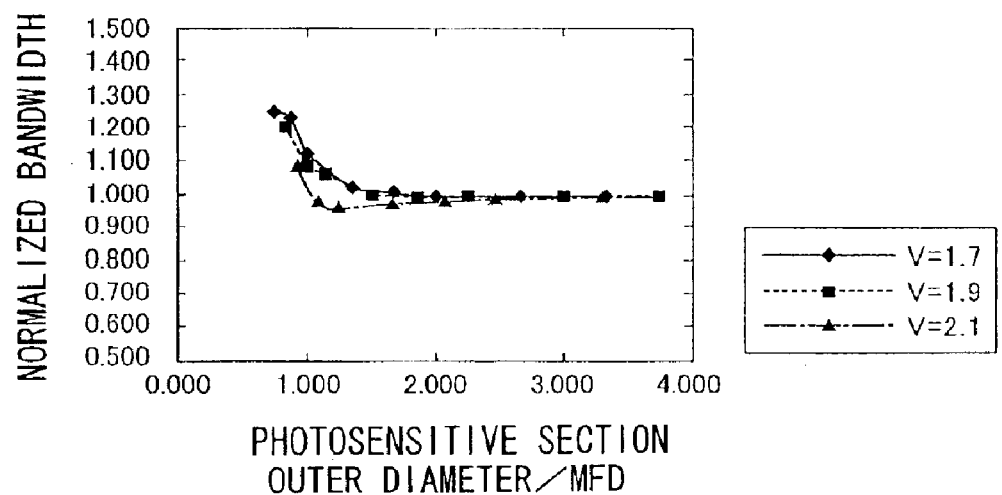
FIGS. 19A and 19B are views showing changes of normalized bandwidth and normalized loss to a quotient obtained by dividing an outer diameter of a cladding photosensitive section by MFD under condition of relative refractive index difference Δ=0.5% and the inner core diameter ratio=70%.
Figure 19B:
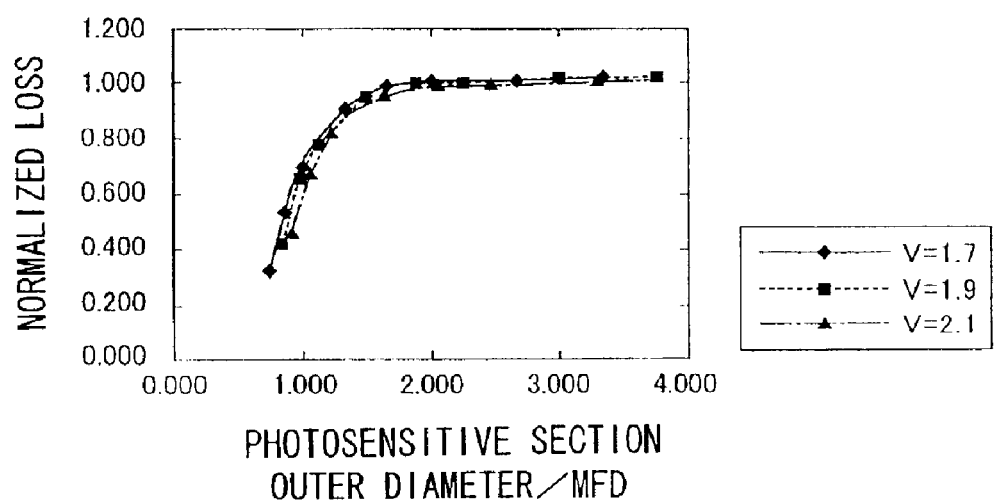
Figure 20A:
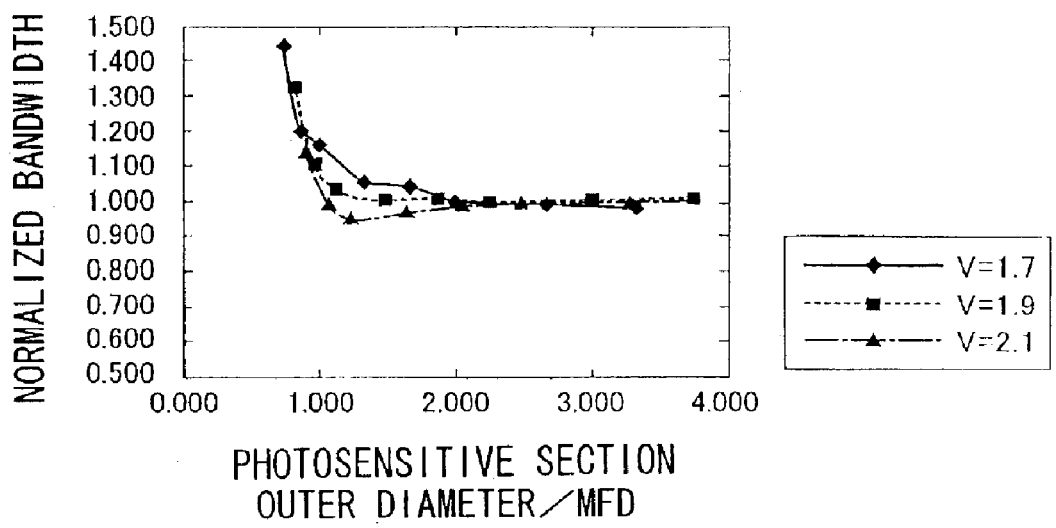
FIGS. 20A and 20B are views showing changes of normalized bandwidth and normalized loss to a quotient obtained by dividing an outer diameter of a cladding photosensitive section by MFD under condition of relative refractive index difference Δ=0.4% and the inner core diameter ratio=80%.
Figure 20B:
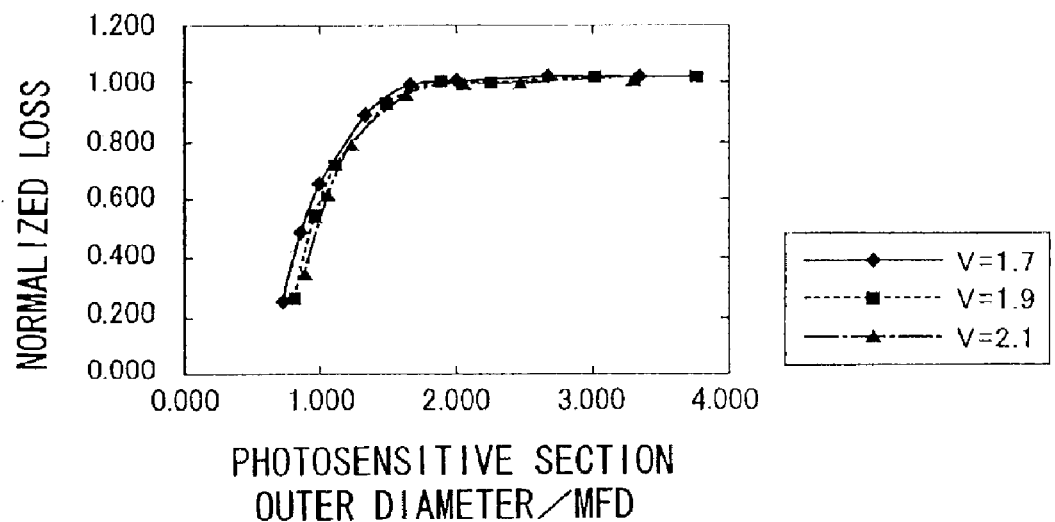
Figure 21A:
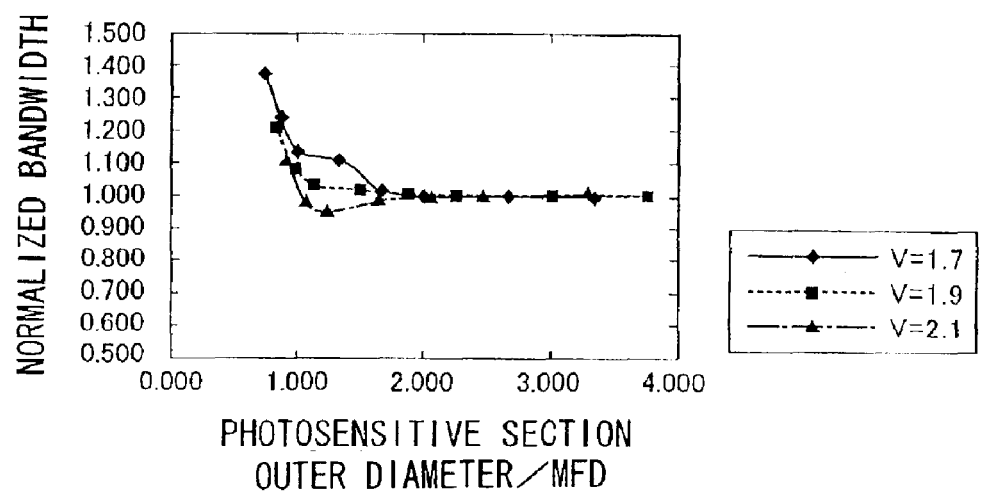
FIGS. 21A and 21B are views showing changes of normalized bandwidth and normalized loss to a quotient obtained by dividing an outer diameter of a cladding photosensitive section by MFD under condition of relative refractive index difference Δ=0.4% and the inner core diameter ratio=70%.
Figure 21B:
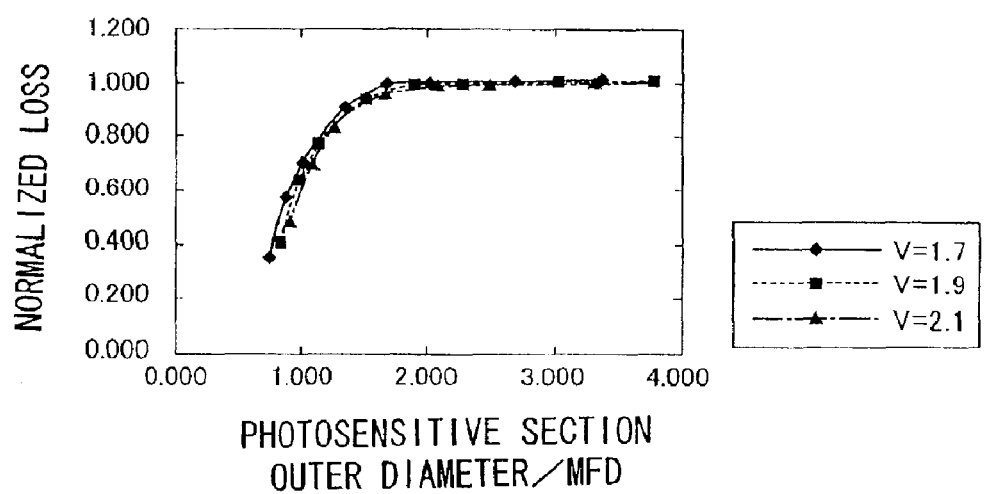
Figure 22A:
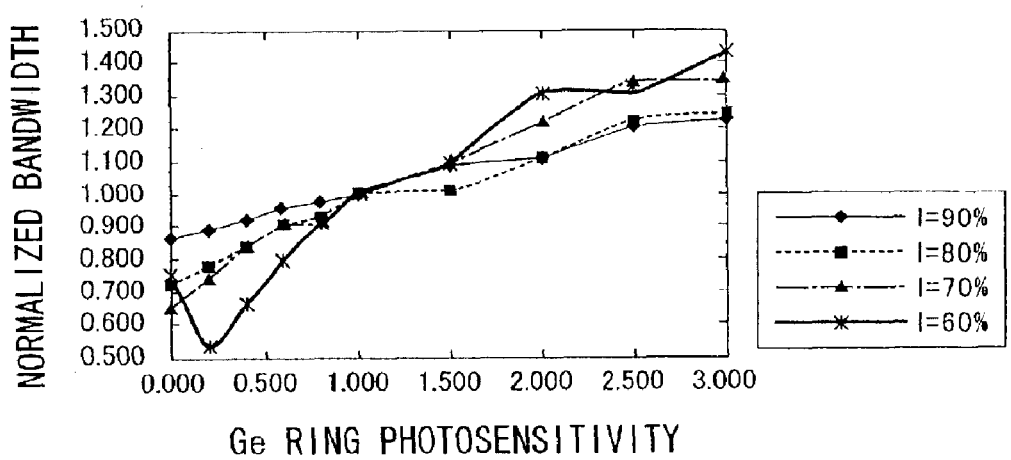
FIGS. 22A and 22B are views showing changed of normalized bandwidth and normalized loss area to photosensitivity of the outer core under condition of relative refractive index difference Δ=0.5% and normalized frequency V=1.7.
Figure 22B:
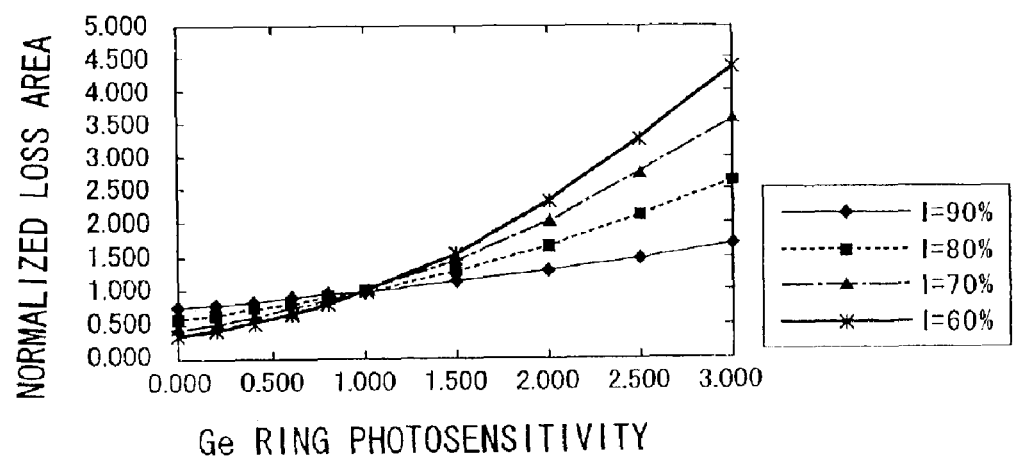
Figure 25A:
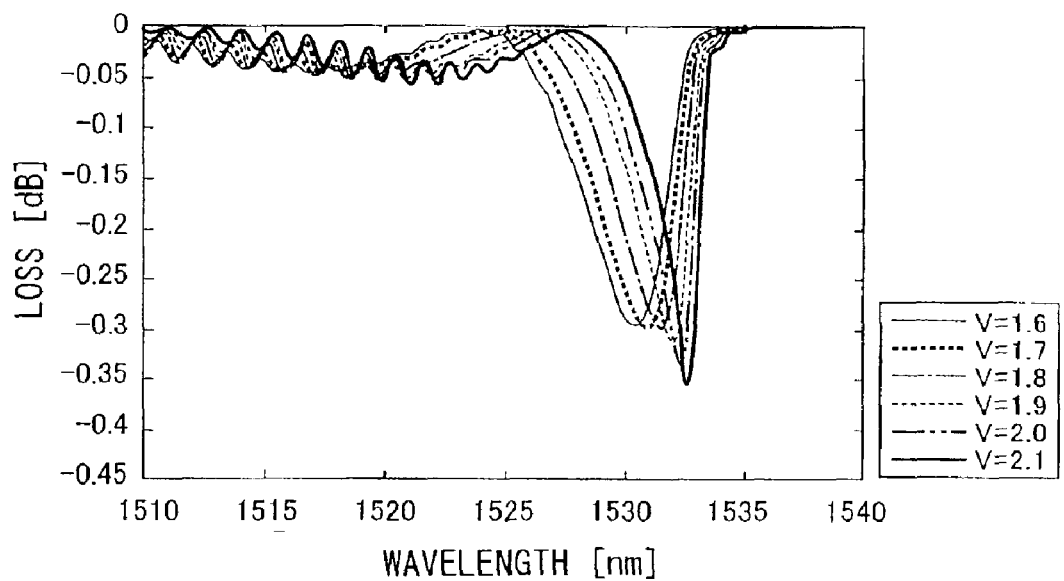
FIGS. 25A and 25B are views showing shapes of loss spectrum under condition of inner core diameter ratio l to the core diameter: l=80% and 70% when relative refractive index difference Δ is 0.4%.
Figure 25B:
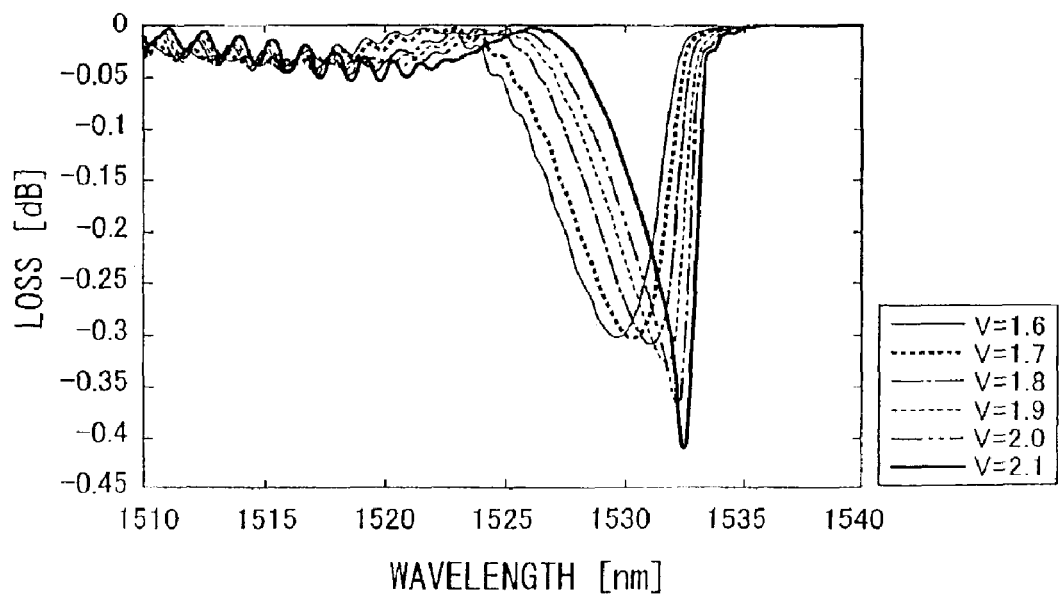
Figure 26A:
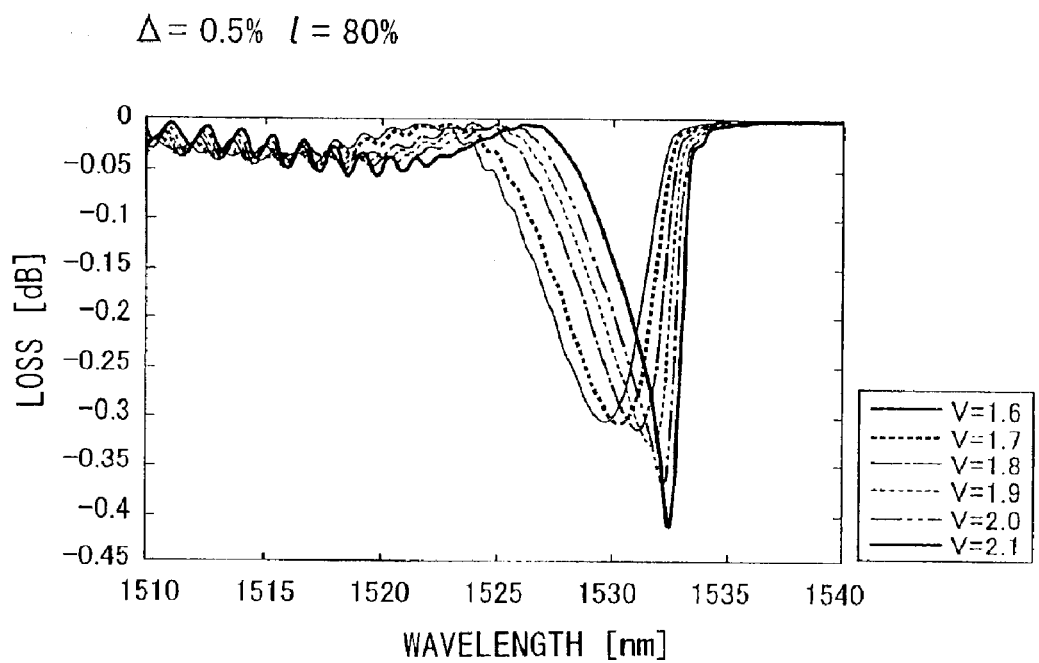
FIGS. 26A and 26B are views showing shapes of loss spectrum under condition of inner core diameter ratio l to the core diameter: l=80% and 70% when relative refractive index difference Δ is 0.5%.
Figure 26B:
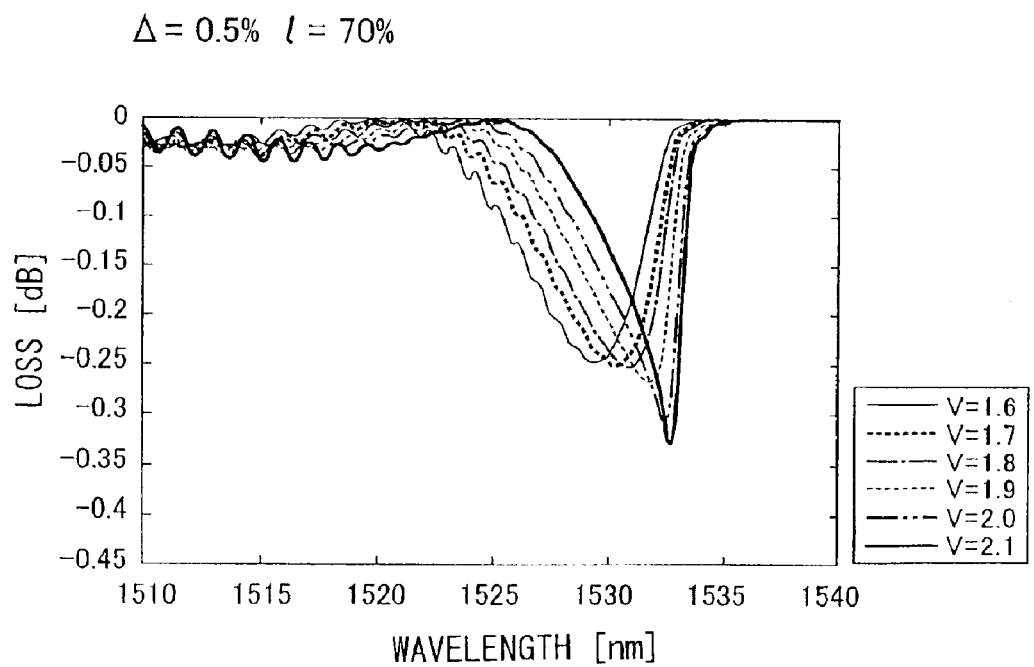

In this case, it was found that the virtual loss bandwidth BW is disposed in one line as shown in FIG. 17 under condition of $b_1=60.8$ and $b_2=-19.8$.

Accordingly, it was found that the loss occurrence bandwidth which is represented by the F9 can be approximately replaced by a formula F10 as follows.

$$BW = \{a_1 \cdot (1/l \cdot r_{core})^2 + a_2 \cdot (1/l \cdot r_{core}) + p_1 \cdot (b_1 \cdot \Delta + b_2)\}/(1 - p_1 \cdot P_{inside}/P_{outside}) \quad \text{F10}$$

In formula F10, the conditions were that $a_1=24.35$, $a_2=9.650$, and $b_2=-10.8$. Next, analysis of dependencies to the photosensitive cladding for various characteristics of the slant optical fiber grating were performed and its result is explained.

For parameters for an optical fiber, the relative refractive index difference $\Delta$ of the core 1 to the inner cladding 2a as a photosensitive cladding is set $\Delta=0.4\%$ or 0.5%. Radius ratio l of a core lower photosensitive section such as the inner core 1a is set l=80% or 70%. The normalized frequency V is set V=1.7, 1.9, and 2.1. For each case, simulation were performed by varying the outer radius of a photosensitive cladding such as the inner cladding 2a. The results for the simulations are shown in FIGS. 18A to 21B in forms such as the loss occurrence bandwidth and the loss area.

The calculation was performed under conditions that the photosensitivity of the inner cladding 1a as a lower photosensitivity core is 0 (zero). A horizontal axis indicates outer diameter of the inner cladding 2a as a higher photosensitivity cladding which were normalized by the MFD under each condition. Also, each characteristics value such as a normalized bandwidth and a normalized loss are normalized with reference to a case in which the diameter of the inner cladding 2a as a photosensitive cladding is three times as large as the diameter of the core 1, i.e., m=3.

According to FIGS. 18A to 21B, it is understood that the dependencies on the photosensitive claddings for each characteristics value are determined with regardless to factors such as $\Delta$, l, and V but according to MFD. That is, it is understood that the optical characteristics such as the loss occurrence bandwidth of the inner cladding 2a as a photosensitive cladding becomes worsened rapidly under conditions in which the diameter of the inner cladding 2a is equivalent to MFD or less. Also, it is understood that the optical characteristics such as the loss area of the inner cladding 2a as a photosensitive cladding becomes worsened rapidly under conditions in which the diameter of the inner cladding 2a is equivalent to twice as large as MFD or less. Also, it is understood that the optical characteristics of the inner cladding 2a does not change when the outer diameter of the inner cladding 2a is larger than these values. According to the above-obtained result, it is preferable that the diameter of the inner cladding 2a as a photosensitive cladding is twice as large as MFD.

Next, analysis of photosensitivity dependencies of characteristics of the slant optical fiber grating to the outer core 1b was performed. The result is explained as follows.

As similar to the results shown in FIGS. 18A to 21B, several conditions were chosen as parameters for an optical fiber. Simulations were performed in which photosensitivity $p_2$ of the outer core 1b was changed so as to obtain two characteristics such as loss occurrence bandwidth and the loss area. The result is shown in FIGS. 22A to 24B.

Here, the calculation was performed under conditions that the photosensitivity of the inner cladding 1a as a lower photosensitivity core is 0 (zero). Also, each characteristics value such as a normalized bandwidth and a normalized loss are normalized with reference to such as the photosensitivity of the outer core $p_2=1$. In FIGS. 22A to 24B, photosensitivity $p_2$ of the outer core 1b is indicated by a horizontal axis. Here, it is understood that it is advantageous when the loss occurrence bandwidth is narrow if $p_2$ is low. Also, it is advantageous when the loss area is large if $p_2$ is high. Taking an object such as enlarging the loss area into account, it is preferable that a condition such as $p_2>0.8$ be satisfied.

The maximum P2 can be enlarged within a tolerance of the loss occurrence bandwidth. However, the photosensitivity varies according to the material to be added and its quantity. Fundamentalally, the photosensitivity is determined by adding quantity of Ge, and there is a limit for Ge to be added. However, decreasing the quantity of Ge to be added to the cladding 2 for increasing the difference of photosensitivity means that the loss decreases from a view point of the fundamental structure; thus, it is not desirable. Therefore, preferable photosensitivity of the core 1 is actually believed to be 2 or less. For a guideline for designing an optical fiber under conditions of $p_2 \neq 1$, it is necessary to take an increase of the bandwidth into account according to a formula F11 as follows.

$$\Delta BW = 0.2(p_2-1) \cdot BW \quad \text{F11}$$

Until here, analysis was made by focusing on factors of the optical fiber such as the loss occurrence bandwidth and the loss area. Next, a limiting factor for an optical fiber which is determined by a loss spectrum shape is explained. Simulations were performed by changing the normalized frequency (cut-off wavelength) under condition of the optical fiber parameters such as relative refractive index difference $\Delta=0.4\%$ or 0.5%, diameter ratio l of the inner core 1a as a lower photosensitive core: l=80% or 90%, photosensitivity $p_1$ of the inner core 1a as a lower photosensitive core: $p_1=0$ (zero), and photosensitivity $p_2$ of the outer core 1b: $p_2=1$. The loss spectrum which were obtained in the simulations are shown in FIGS. 25A to 26B.

According to FIGS. 25A to 26B, although there are differences in the loss bandwidth and the loss, it is understood that the shape of the loss spectrum is determined only by the normalized frequency. That is, it is understood that the shorter the normalized frequency is, the more the shape of the loss spectrum becomes symmetrical at a loss peak as a center. However, as the normalized frequency becomes longer, the loss peak is shifted close to the longer wavelength area. Also, it is understood that the shape of the loss spectrum becomes more asymmetrical. That means that the cladding mode in which the coupling becomes maximum is shifted to lower mode.

A particular object of the present invention is to equalize the gain profile of an EDFA. In the present invention, a transmission characteristics is formed by changing the magnitude of the refractive index change in a longitudinal direction of the optical fiber such that a required shape is obtained in accordance with a shape of the loss spectrum as explained later. Therefore, if a shape of the loss spectrum is irregular, it is difficult to make it identical to the desirable form.

Figure 52:
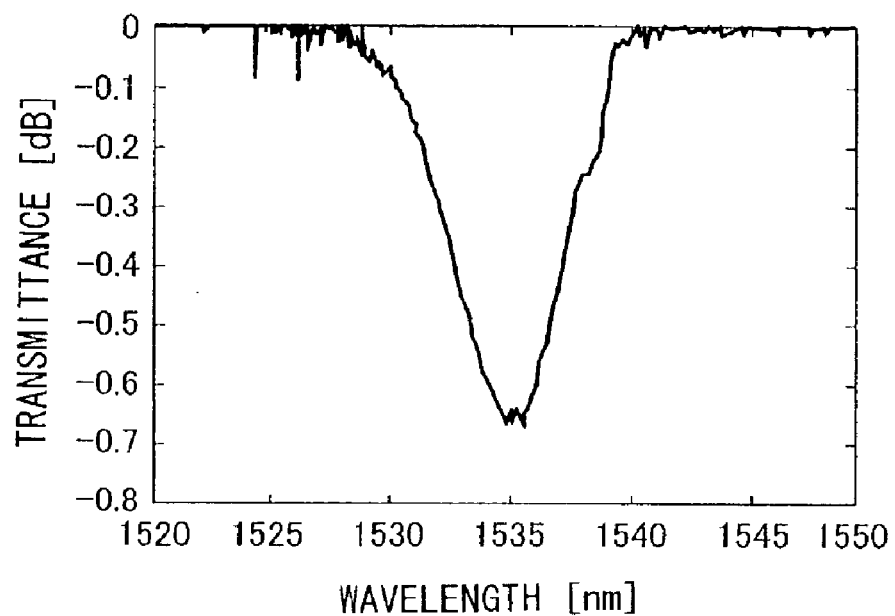
FIG. 52 is a view showing an example of measurement result for loss spectrum of a conventional slant optical fiber grating.
Figure 53:
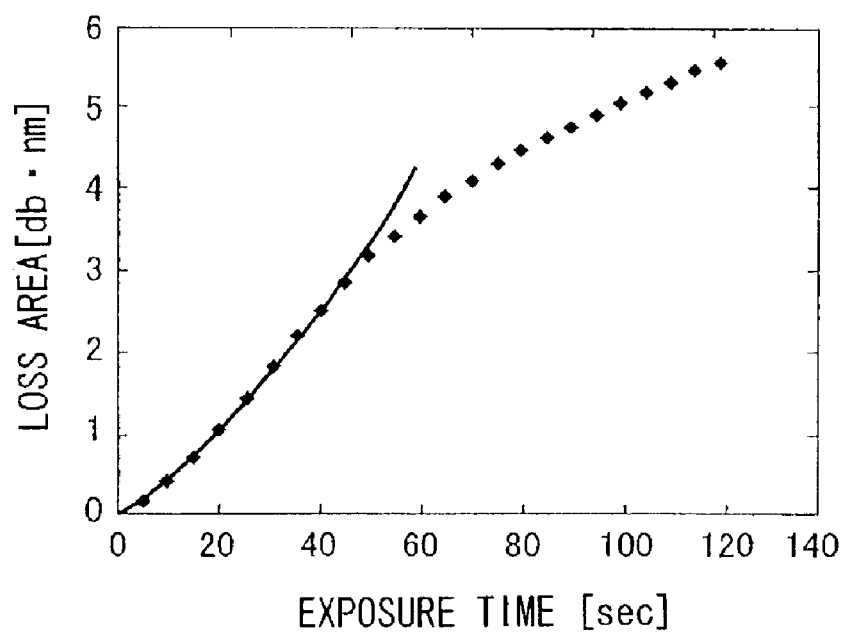
FIG. 53 is a view showing a relationship between exposure time and loss area for a conventional slant optical fiber grating.

Also, the lower cladding mode such as LP11 and LP13 are close to a guided mode; thus it easily resonates with a guided mode. Therefore, if the coupling with these modes is large, there is a problem in that a large ripple which is called a ghost mode peak occurs easily. For example, it is understood that ripples exist in longer wavelength areas in the loss occurrence area as shown in FIG. 52 as an example for a conventional case. Therefore, according to the two reasons which are above explained, it is preferable that the normalized frequency is 1.9 or shorter, i.e., the theoretical cut-off frequency is 1.22 μm or shorter.

The structure of the optical fiber which is determined by a characteristics of the slant optical fiber grating was explained above. Here, an optical fiber grating is not only an optical filter but also a light transmission line. Therefore, it is necessary to take transmission characteristics into account. When the optical fiber grating is used for an optical component, the length of the optical component is short; thus, the rejection loss is not a problem. From a view point of organizing it, it is preferable that the bending loss of the fiber be small to some extent. More specifically, there is no problem as long as the bending loss is 0.1 dB/m or less when a pig-tail is wound in 40 mm of diameter to be ordganized. Such a bending loss can be calculated by using formulae (3.4) to (3.6) which are disclosed on page 105 in "Single-mode fiber optics/L. B. Jeunhomme, Marcel Dekker, Inc." such as following formulae F12 to F14.

$$\alpha_c = A_c R^{-1/2} \exp(-UR) [dB/m] \quad \text{F12}$$

$$A_c \cong 30(\Delta n)^{1/4} \lambda^{-1/2} \left(\frac{\lambda_c}{\lambda}\right)^{3/2} \quad \text{F13}$$

$$U \cong 0.705 \frac{(\Delta n)^{3/2}}{\lambda} \left(2.748 - 0.996 \frac{\lambda}{\lambda_c}\right)^3 \quad \text{F14}$$

Here, R indicates a bending radius. Δn indicates a refractive index difference between the core and the cladding. According to F12, the bending loss which is represented by αc≦0.1 under condition of R=20 mm can be approximately represented by a following formula F15.

$$\lambda_c > 2.48 - 4.53\Delta + 3.43\Delta^2 \quad \text{F15}$$

Therefore, in order to decrease the bending loss, it is preferable to manufacture an optical fiber such that the formula F15 is satisfied.

For another parameter of the optical fiber to be considered, connection loss can be named. When an optical fiber is assembled in an optical amplifier module, connection is made by a fusion splicing method. In general, the connection loss occurs due to a mode field mismatching; therefore, when an optical fiber to be connected is matched with the MFD, it is possible to decrease the connection loss. However, if MFD is decreased too much, the loss occurrence area is broadened. Therefore, it is the most preferable that the MFD be increased as long as the connection loss can be accepted. When connection is made with a dispersion shifted fiber (DSF), MFD should preferably be 8.0 to 9.0 μm (the relative refractive index difference Δ should be 0.50 to 0.55% in this case). Also, when connection is made with a single mode optical fiber for 1.3 μm transmission, MFD should preferably be 8.0 to 10.0 μm (the relative refractive index difference Δ should be 0.40 to 0.55% in this case).

Therefore, it is possible to manufacture a band rejection optical filter by disposing a plurality of slant optical fiber grating using an optical fiber in which the MFD is 8.0 to 10.0 μm and a relative refractive index difference Δ is 0.40 to 0.55% in series and by connecting a single mode optical fiber for 1.3 μm transmission on both ends of the slant optical fiber grating.

Also, it is possible to manufacture a band rejection optical filter by disposing a plurality of slant optical fiber grating using an optical fiber in which the MFD is 8.0 to 9.0 μm and a relative refractive index difference Δ is 0.50 to 0.55% in series and by connecting a dispersion shifted optical fiber on both ends of the slant optical fiber grating.

The present invention is different from the conventional case in that the distribution of the refractive index of an optical fiber is not changed according to required characteristics such as the loss occurrence bandwidth and the loss area. Instead of that, in the present invention, diameter of the inner core 1a as a lower photosensitive core is changed; thus, it is possible to change the loss occurrence bandwidth and the loss area without changing the MFD. Therefore, it is more preferable to form an optical filter by connecting the slant optical fiber gratings using the optical fiber in multi-stage from a view point of connection loss. Next, a gain equalizing filter (hereinafter called GEQF) which uses the above-explained optical fiber is explained as follows.

A slant optical fiber grating having a structure shown in FIG. 49 is manufactured by using the above-explained optical fiber. In this case, a higher refractive index section 3 is formed such that the slanting angle is within ±0.3 degrees around the reflection suppressing angle which is proper to the grating structure.

Figure 27:
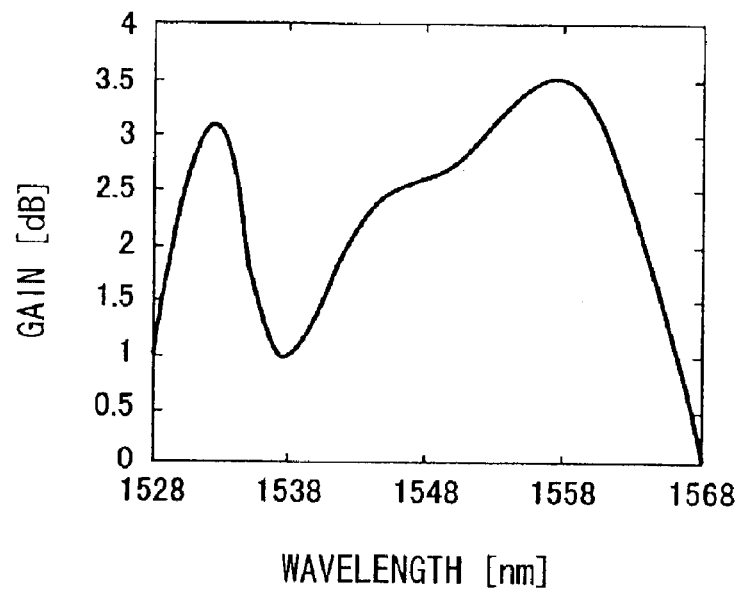
FIG. 27 is a view showing an example for a gain spectrum of EDF.

In FIG. 27, typical gain spectrum of the EDF is shown. In the GEQF, opposite characteristics shown in FIG. 27, i.e., the gain is regarded as the loss, must be realized. Here, a method for equalizing the characteristics of the SFBG to the required spectrum is explained briefly. Here, the period of the grating is in a form of a chirped grating in which the period changes gradually in a longitudinal direction. That is, the wavelength at each point in the grating corresponds to the grating perijod, and the loss characteristics at each point forms proper loss characteristics (fundamental spectrum) having a center at the wavelength determined by the structure of the optical fiber as shown in the above-explained simulation. An example is shown in FIG. 28.

Figure 28:
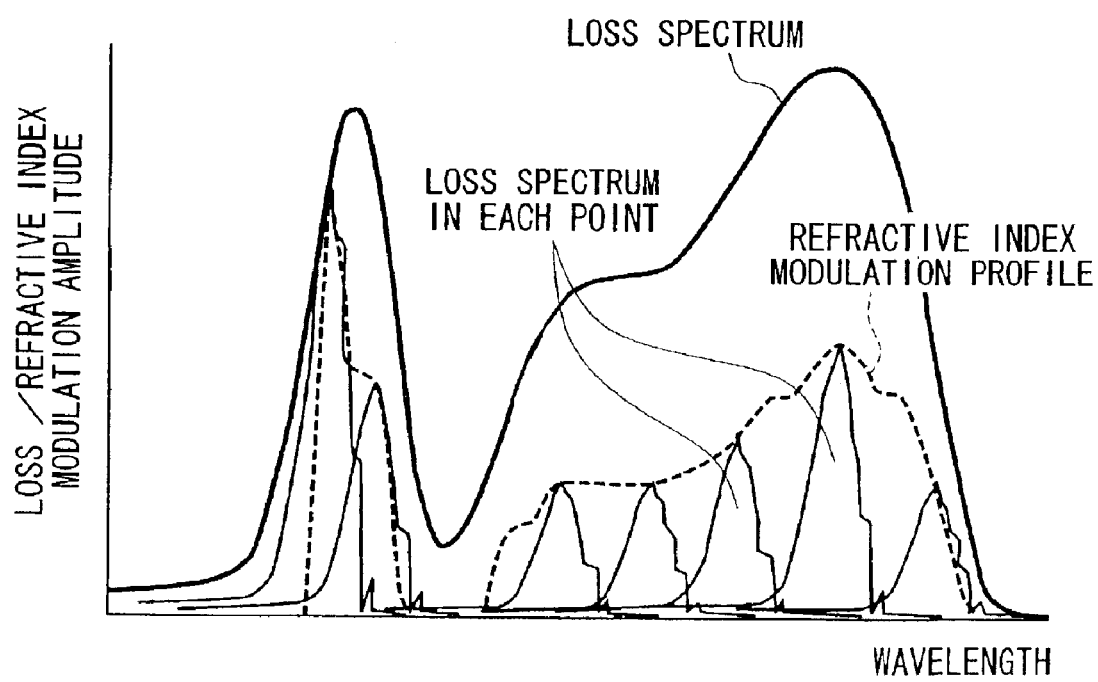
FIG. 28 is a view showing an example for a concept of fitting for optical characteristics of a slant optical fiber grating to desirable loss spectrum.

Furthermore, as shown by a dotted-line in FIG. 28, grating magnitude at each point is controlled. This magnitude profile is called an exposure profile. In this time, characteristics of overall grating becomes convolution of the fundamental spectrum and the exposure profile as shown by a thick line shown in FIG. 28. Therefore, in actual design for the gain equalizing filter, it is necessary to determine the exposure profile such that a result of the convolution becomes the required spectrum. Such a calculation is performed by a calculating apparatus such as a computer.

As may be understood from FIG. 27, gain bandwidth of the EDF can be divided into two categories in general. That is, they are a range of 1520 to 1540 nm (hereinafter called "short wavelength range") having a peak nearly at 1530 nm and a range of 1540 to 1570 nm (hereinafter called "long wavelength range") having a peak nearly at 1555 nm. For characteristics for each range, a shape of the short wavelength range is like a symmetrical single peak and its bandwidth is narrow. A shape of the long wavelength range is less steep than the short wavelength range, but its shape is more complicated. In the long wavelength range, a necessary area for transmission loss is larger than that of the short wavelength range.

Therefore, for the EDF, it is necessary that the loss occurrence bandwidth be narrow in the short wavelength range. In the long wavelength range, it is necessary that the loss area be large while the loss occurrence bandwidth may be larger than that in the short wavelength range. By the above-explained reason, more preferable characteristics can be obtained by forming such characteristics by manufacturing the short wavelength range and the long wavelength range separately and connecting them later than by forming an overall characteristics by a single optical fiber grating.

Figure 29:
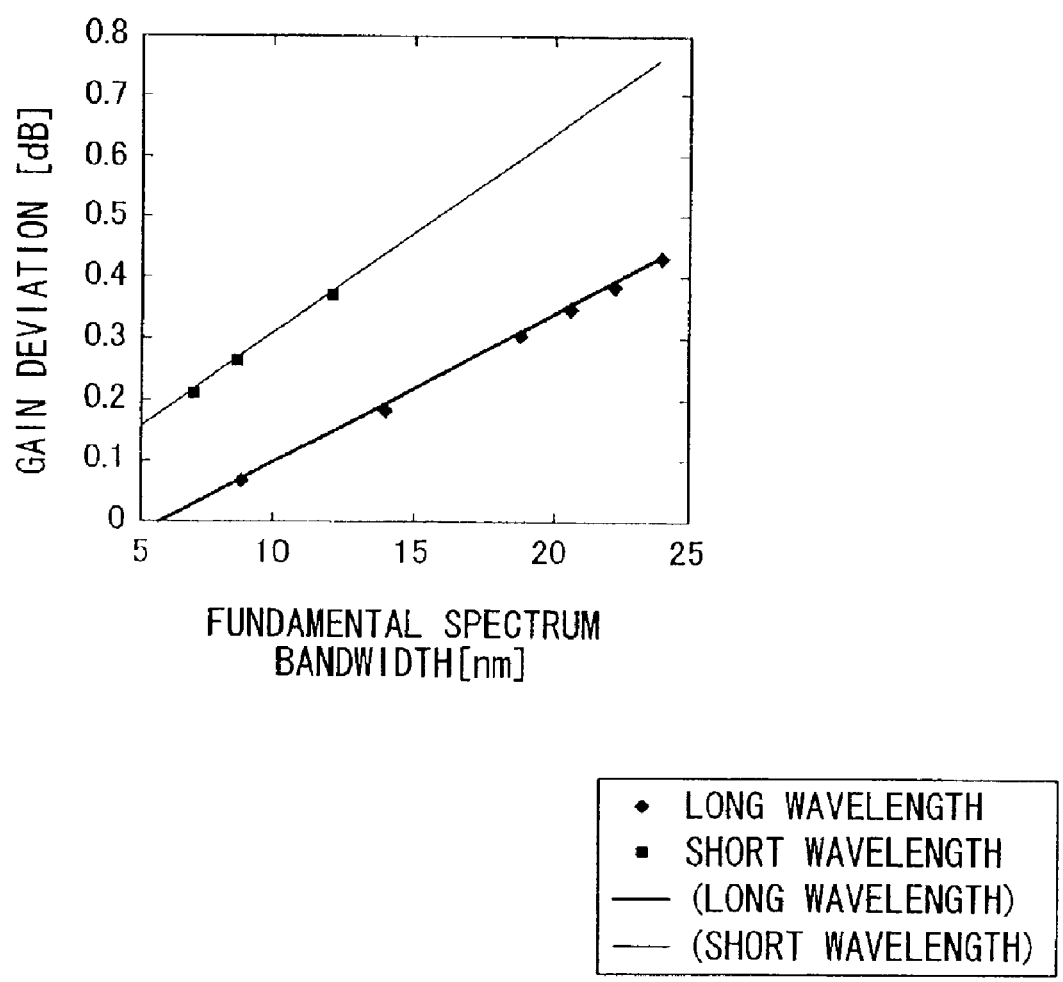
FIG. 29 is a view showing a relationship between the gain deviation and the loss bandwidth of the fundamental spectrum in long wavelength range and short wavelength range.
Figure 30A:
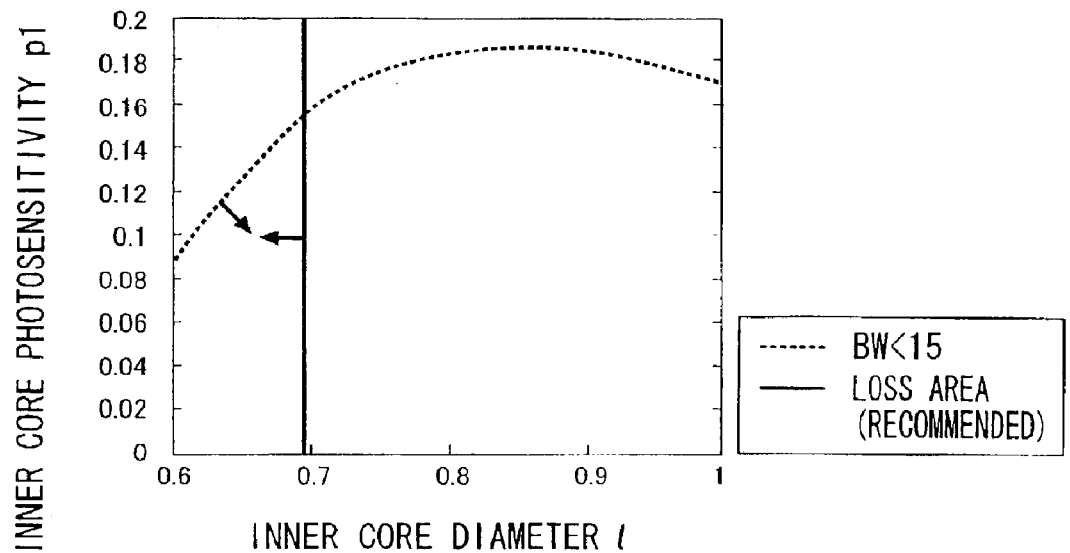
FIGS. 30A and 30B are views showing a scope of optical characteristics for designing a gain equalizing optical filter for optical amplifier under conditions of relative refractive index difference Δ=0.55% and cut-off wavelength $\lambda_c$=1.22 μm.
Figure 30B:
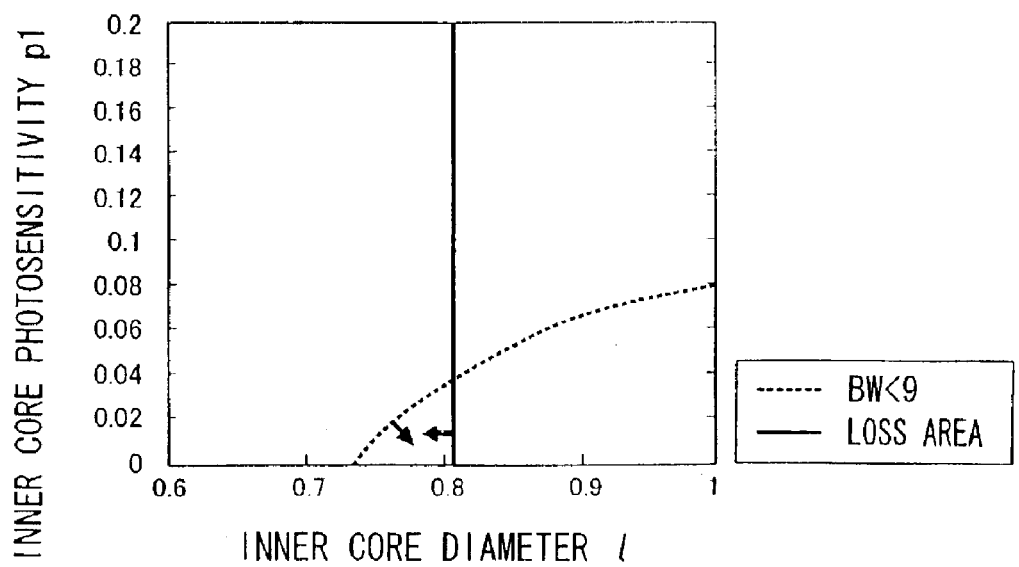
Figure 31A:
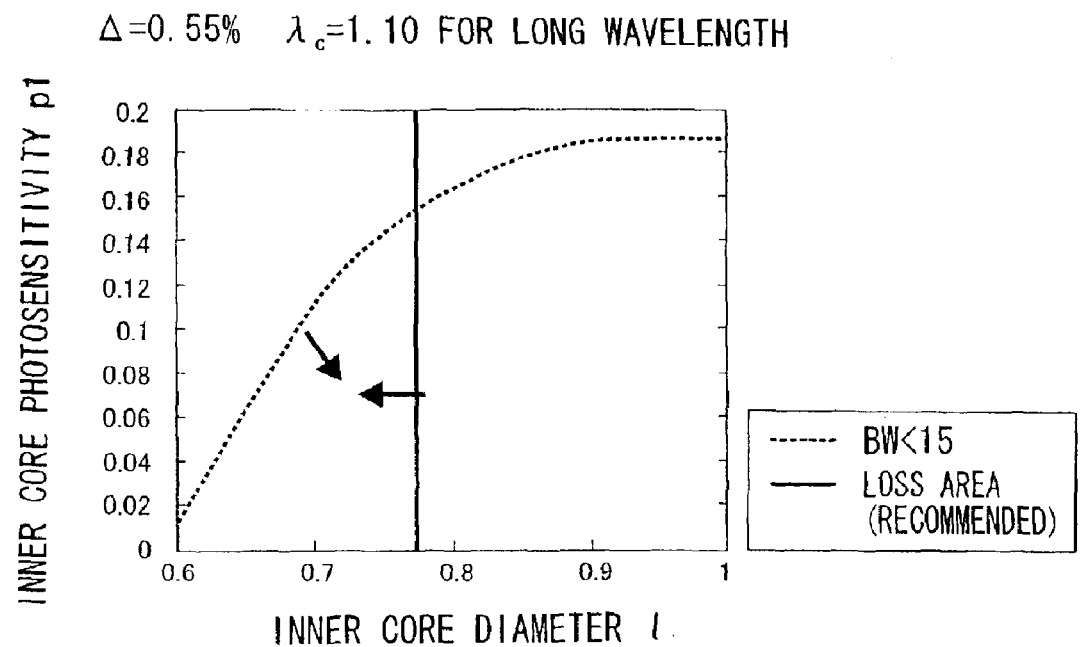
FIGS. 31A and 31B are views showing a scope of optical characteristics for designing a gain equalizing optical filter for optical amplifier under conditions of relative refractive index difference Δ=0.55% and cut-off wavelength $\lambda_c$=1.10 μm.
Figure 31B:
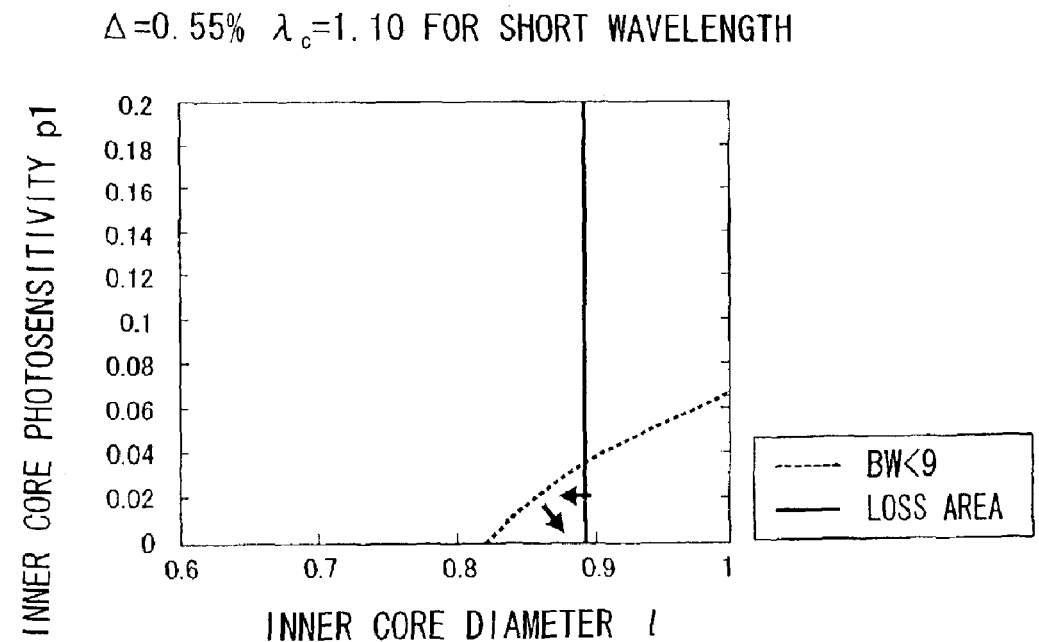
Figure 32A:
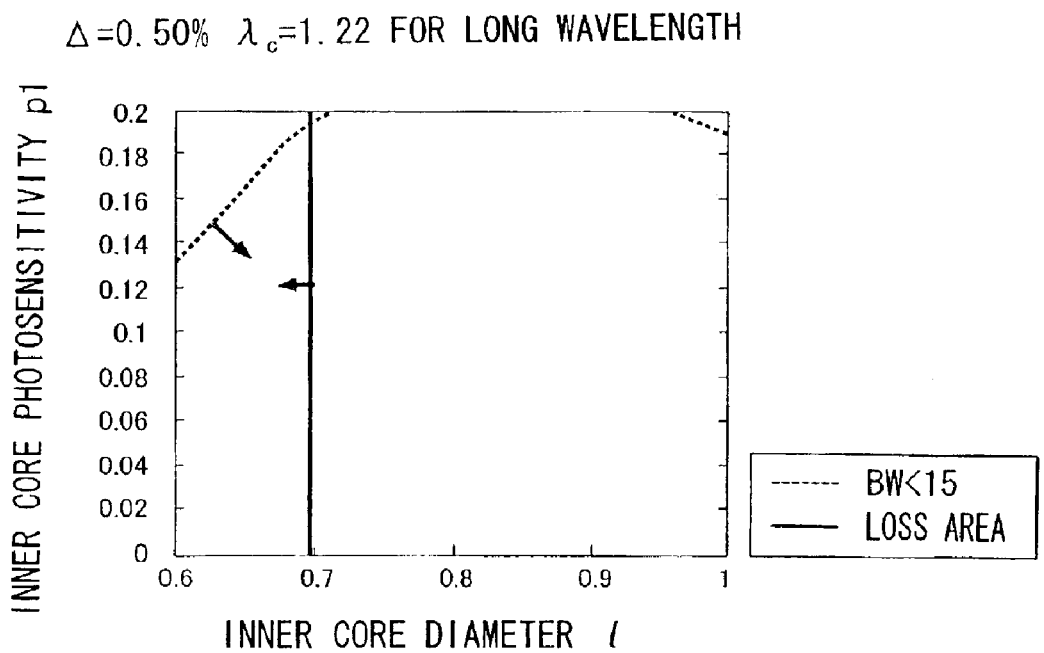
FIGS. 32A and 32B are views showing a scope of optical characteristics for designing a gain equalizing optical filter for optical amplifier under conditions of relative refractive index difference Δ=0.50% and cut-off wave length $\lambda_c$=1.22 μm.
Figure 32B:
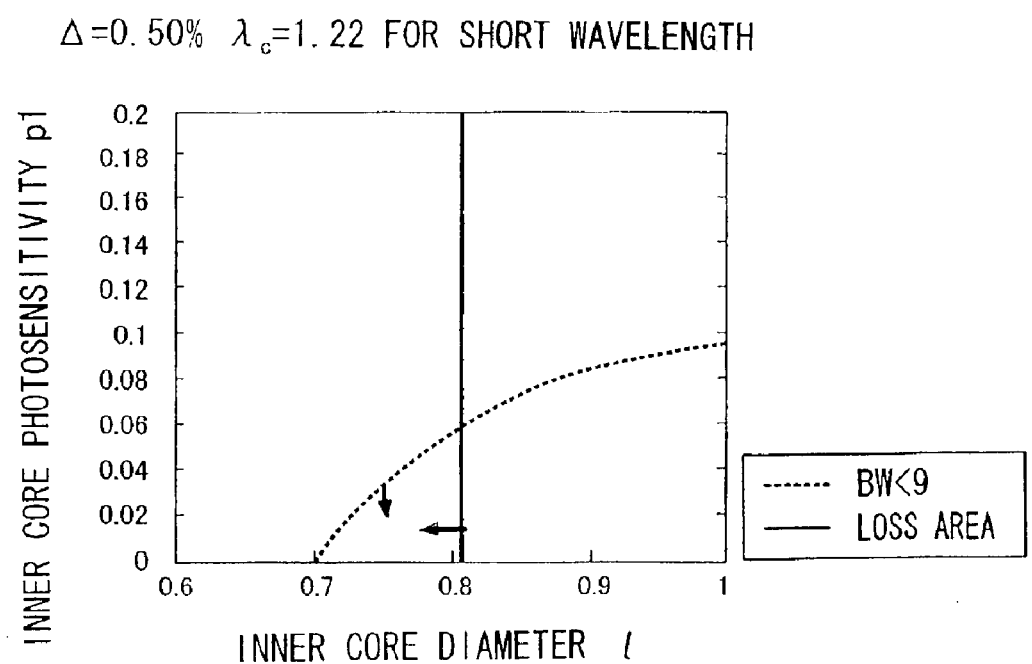
Figure 33A:
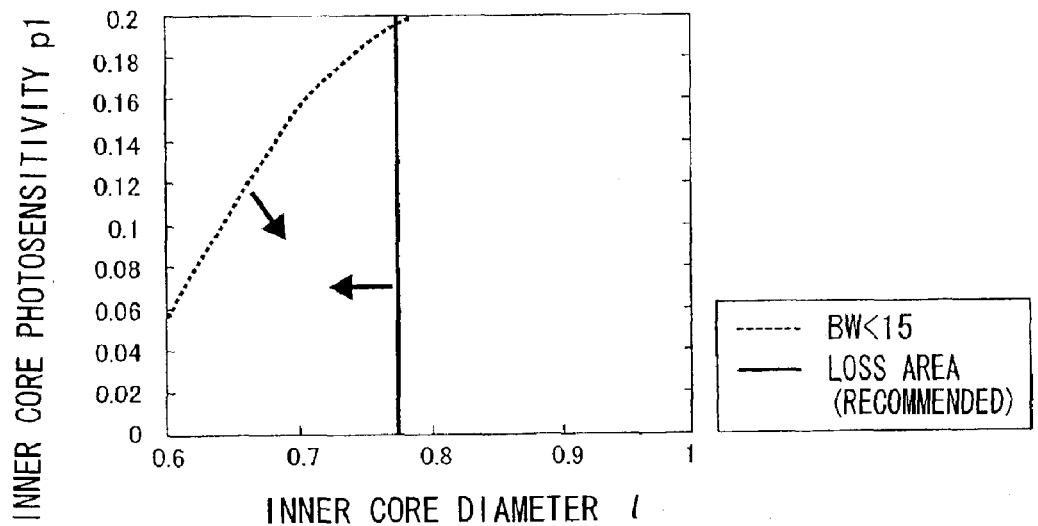
FIGS. 33A and 33B are views showing a scope of optical characteristics for designing a gain equalizing optical filter for optical amplifier under condition of relative refractive index difference Δ=0.50% and cut-off wavelength $\lambda_c$=1.10 μm.
Figure 33B:
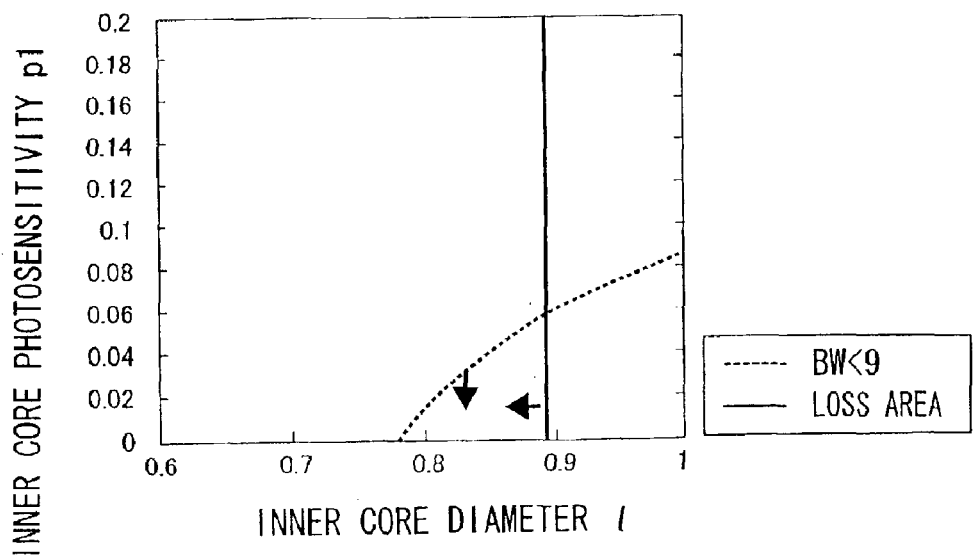
Figure 34A:
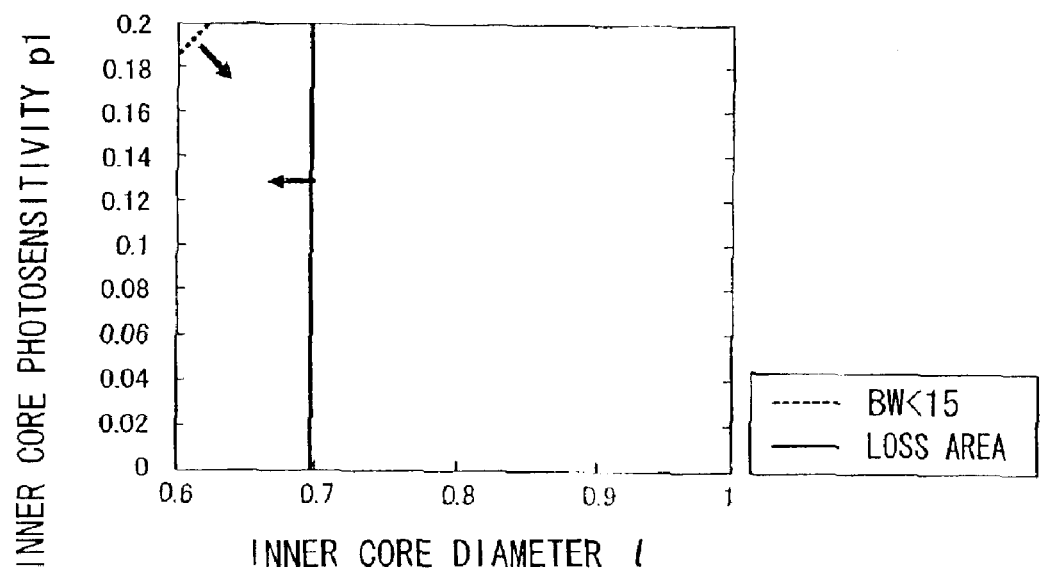
FIGS. 34A and 34B are views showing a scope of optical characteristics for designing a gain equalizing optical filter for optical amplifier under conditions of relative refractive index difference Δ=0.45% and cut-off wavelength $\lambda_c$=1.22 μm.
Figure 34B:
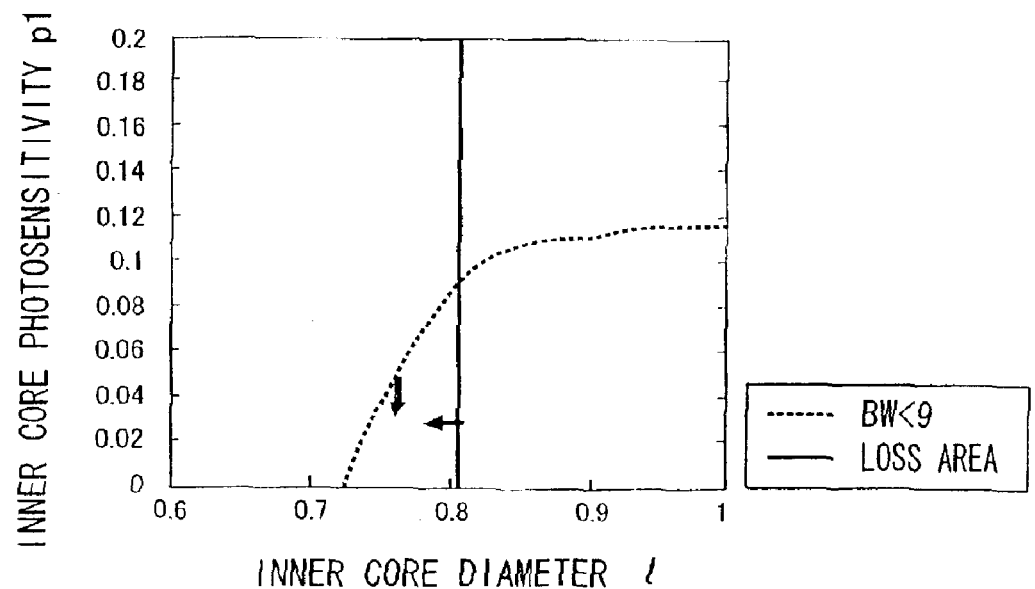
Figure 35A:
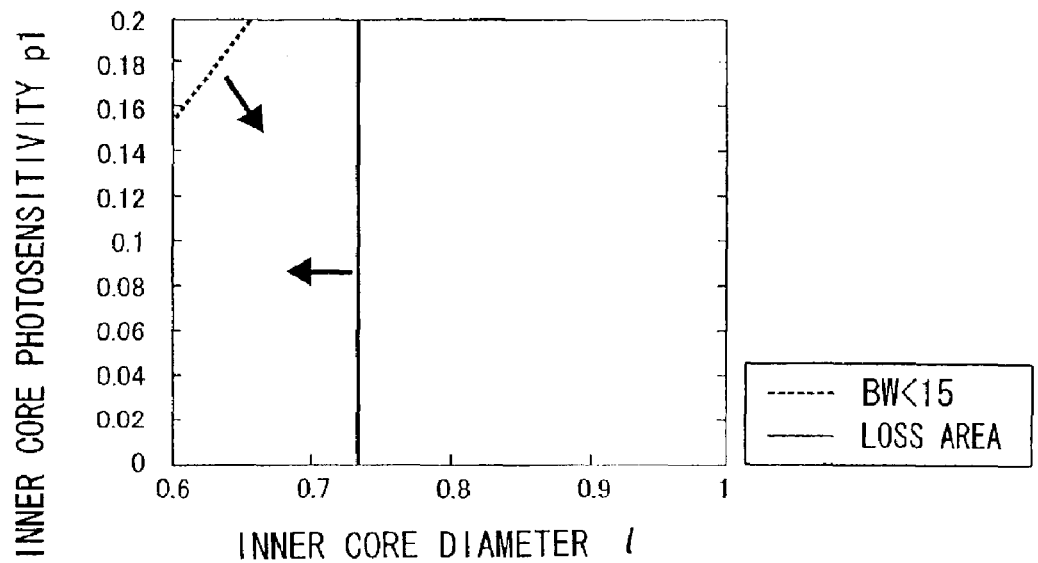
FIGS. 35A and 35B are views showing a scope of optical characteristics for designing a gain equalizing optical filter for optical amplifier under condition of relative refractive index difference Δ=0.45% and cut-off wavelength $\lambda_c$=1.16 μm.
Figure 35B:
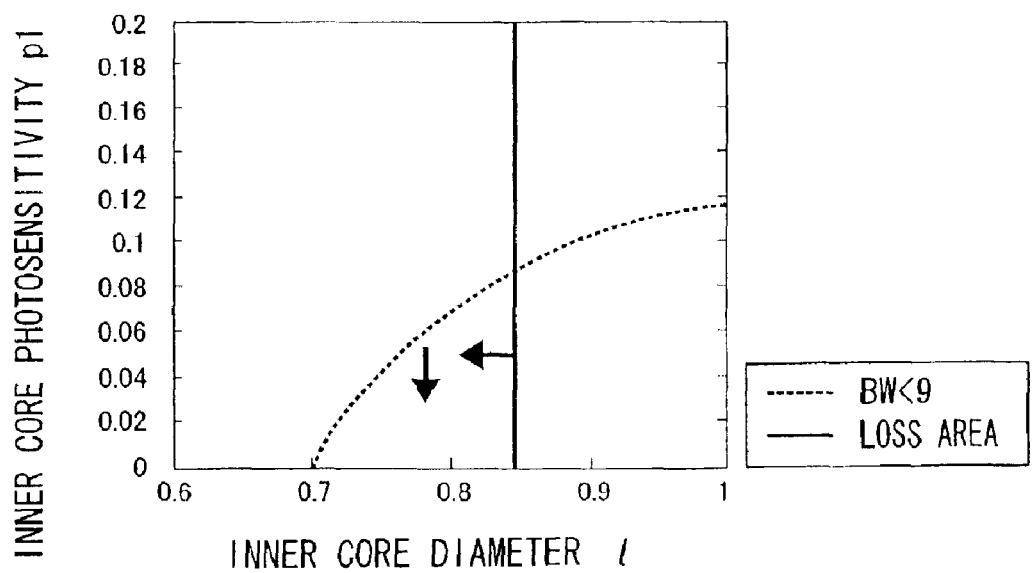
Figure 36A:
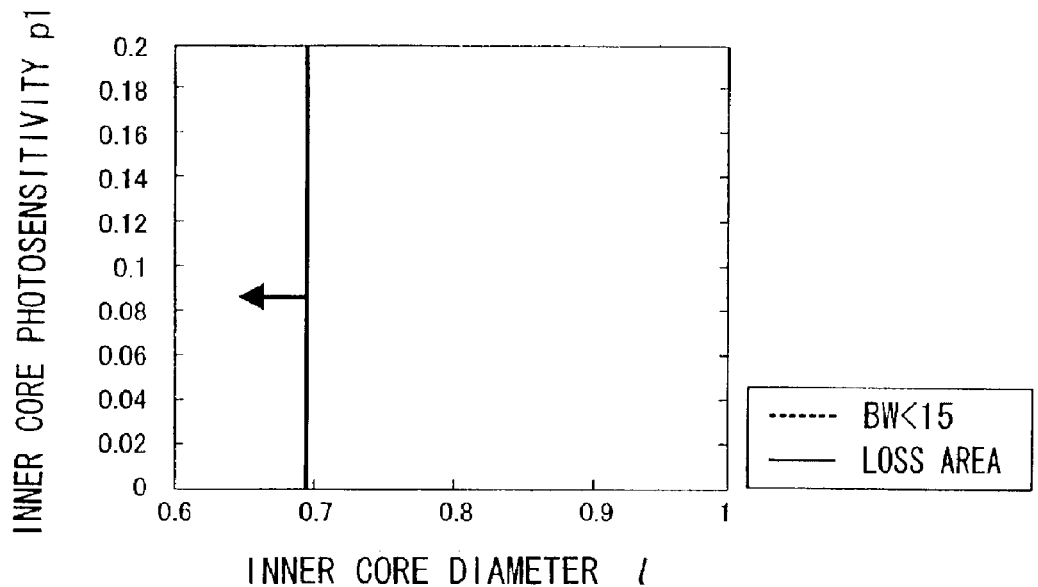
FIGS. 36A and 36B are views showing a scope of optical characteristics for designing a gain equalizing optical filter for optical amplifier under condition of relative refractive index difference Δ=0.40% and cut-off wavelength $\lambda_c$=1.22 μm.
Figure 36B:
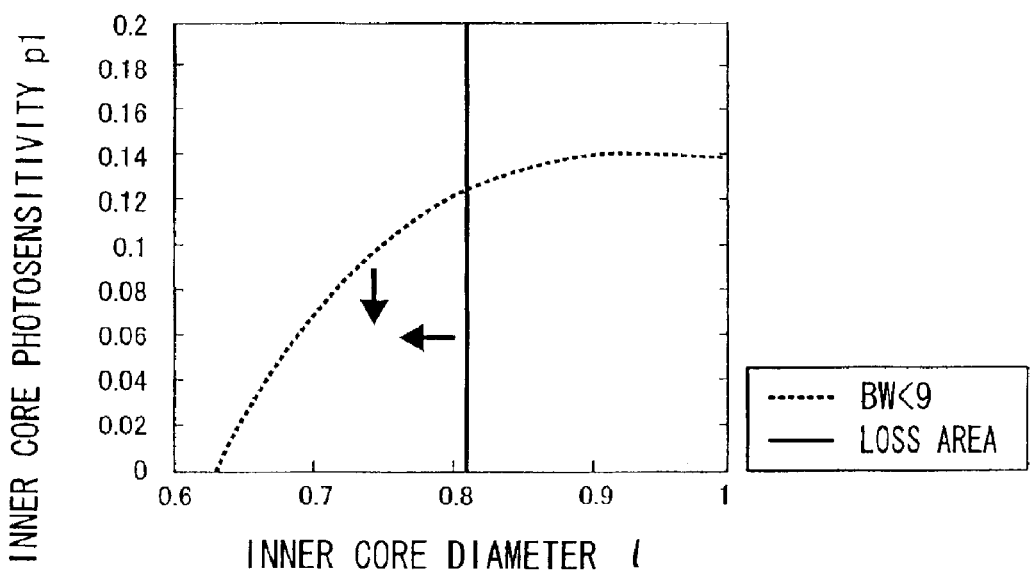
Figure 38:
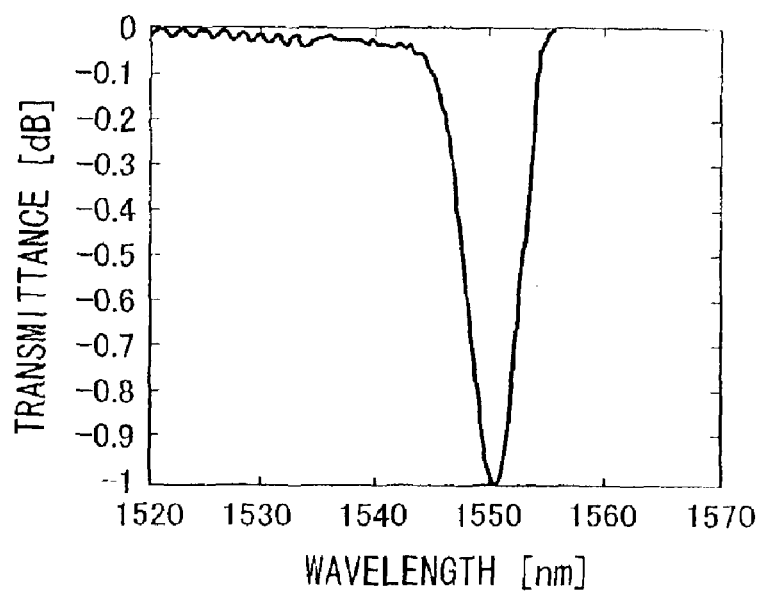
FIG. 38 is a view showing an example for loss spectrum of an optical fiber which was manufactured.
Figure 39:
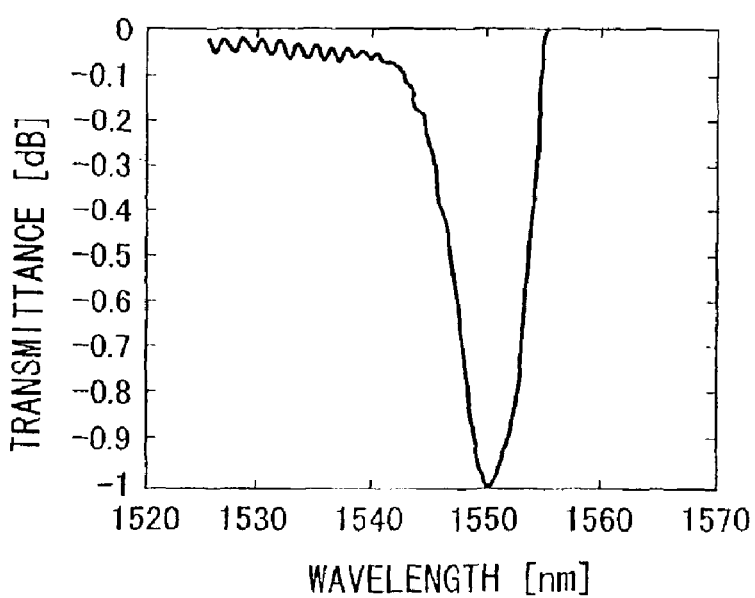
FIG. 39 is a view showing another example for loss spectrum of an optical fiber which was manufactured.
Figure 40:
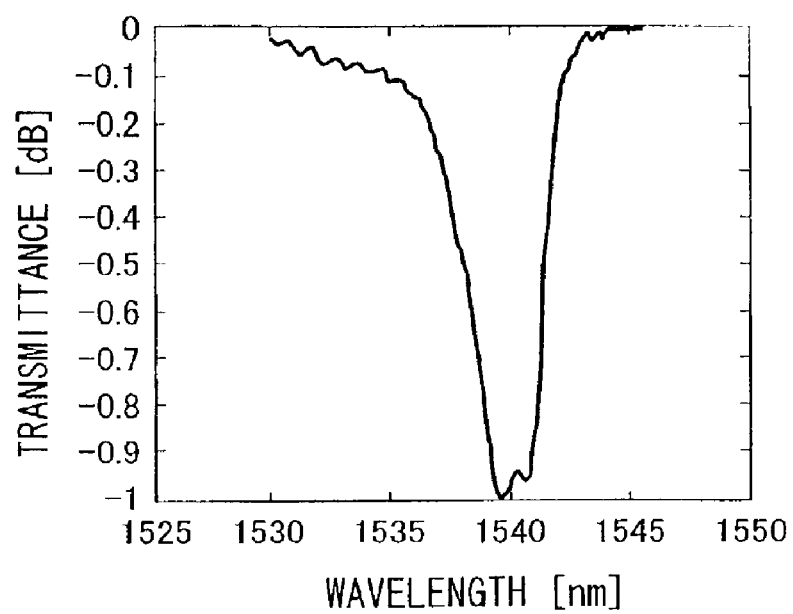
FIG. 40 is a view showing another example for loss spectrum of an optical fiber which was manufactured.
Figure 41:
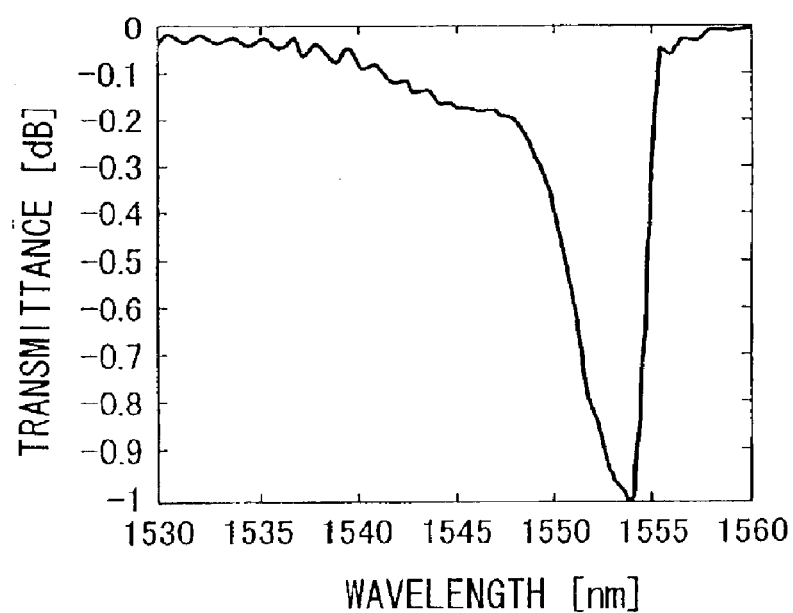
FIG. 41 is a view showing another example for loss spectrum of an optical fiber which was manufactured.
Figure 42:
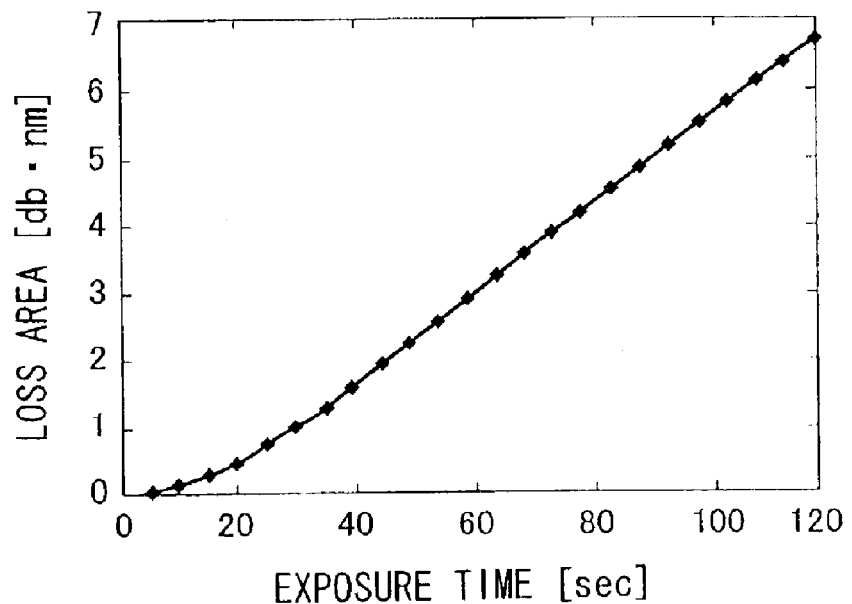
FIG. 42 is a view showing a relationship between exposure time and loss area when an optical fiber which was manufactured is exposed.
Figure 43:
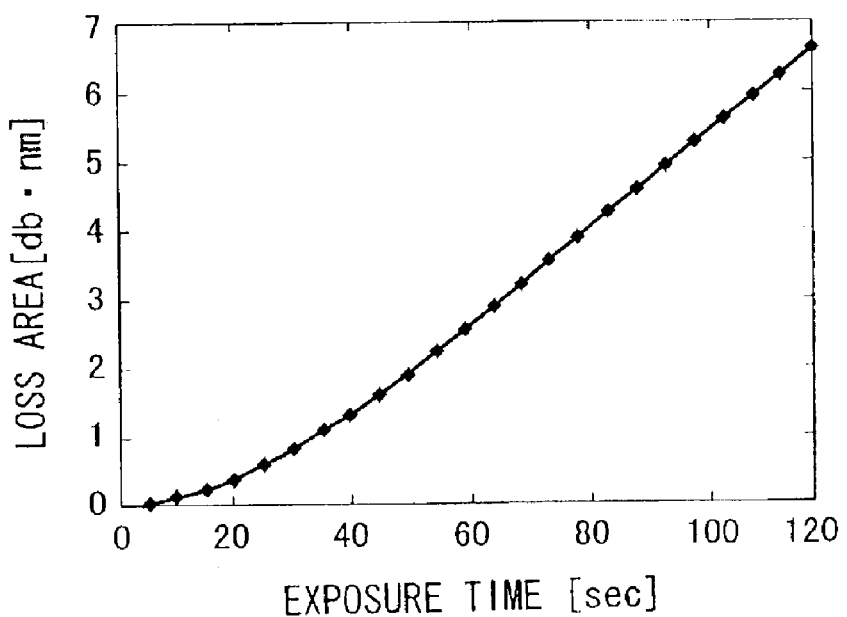
FIG. 43 is a view showing a relationship between exposure time and loss area when an optical fiber which was manufactured is exposed.
Figure 44:
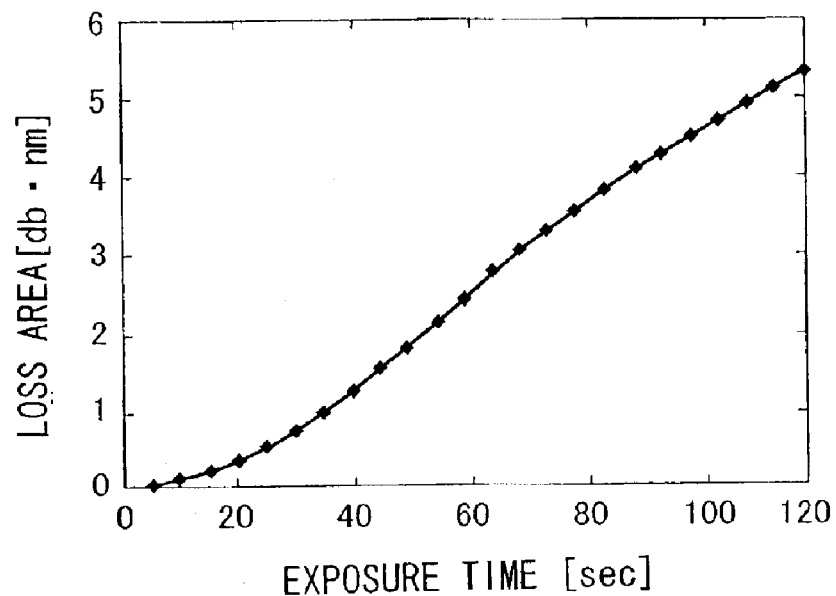
FIG. 44 is a view showing a relationship between exposure time and loss area when an optical fiber which was manufactured is exposed.
Figure 45:
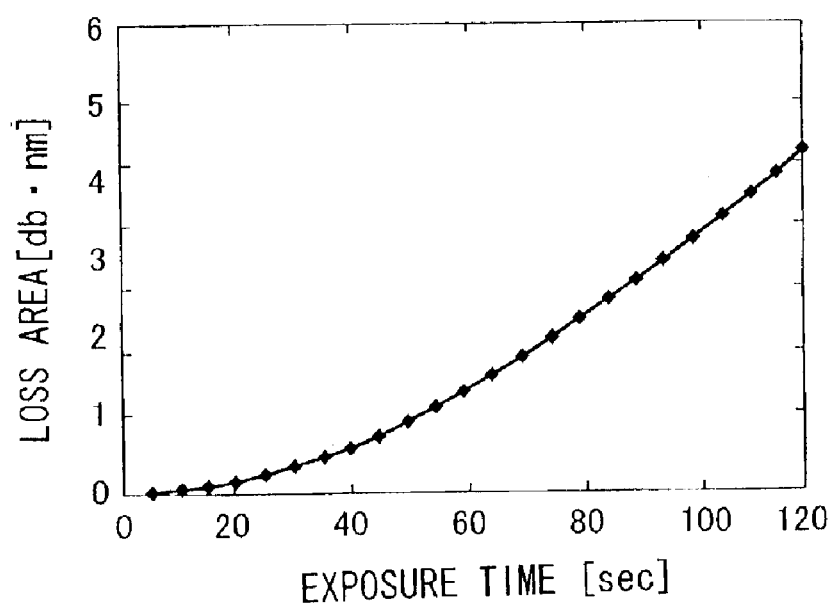
FIG. 45 is a view showing a relationship between exposure time and loss area when an optical fiber which was manufactured is exposed.

In order to form a gain equalizing filter by the above-explained method, relationship of the bandwidth of the fundamental spectrum, the loss occurrence bandwidth, and a loss difference from the required value (hereinafter called gain deviation) was obtained by performing simulations by changing the bandwidth of the fundamental spectrum of a Gaussian function so as to form the loss spectrum shown in FIG. 27. The result of the simulation is shown in FIG. 29. Here, in order to facilitate the convolution, an 0.5 dB of offset loss is included in the required loss. Also, a border wavelength for the long wavelength range and the short wavelength range was 1538 nm.

According to FIG. 29, a relationship of the loss bandwidth and the gain deviation can be represented approximately in a linear relation. According to the result shown here, in order to realize 0.2 dB or lower gain deviation, it is understood that the fundamental spectrum bandwidth is necessary to be 14 nm or shorter in the long wavelength range and 7 nm or shorter in the short wavelength range. These values vary according to factors such as the required spectrum shape, the required deviation, and the acceptable excessive loss. For an approximate guideline, it is preferable that the fundamental spectrum bandwidth is 15 nm or shorter in the long wavelength range and 9 nm or shorter in the short wavelength range.

Also, the loss area in the long wavelength range was 1.2 or larger (saturated loss area is 5 dB nm or more) according to the simulation. The loss bandwidth in the short wavelength range is short such as ⅔ of the loss bandwidth of the long wavelength range. Here, the necessary loss area is 0.8. However, because the characteristics is steep, thus, the exposure profile is also steep. Therefore, it is preferable that the loss area be 0.9 or larger (saturated loss area is 4 dB nm or more). Therefore, according to the approximate formula F2, loss area can be obtained by following formulae F16 and F17.

$$\text{Long wavelength limitation: } l \cdot \lambda_c \leq 0.85 \quad \text{F16}$$

$$\text{Short wavelength limitation: } l \cdot \lambda_c \leq 0.98 \quad \text{F17}$$

Under such limitations, the range of optical characteristics for the optical fiber is designed. Here, in the core 1, four cases under conditions such as relative refractive index difference $\Delta=0.55\%$, $0.50\%$, $0.45\%$, and $0.40\%$ are analyzed. Here, it is conditioned that $p_2=1$ and $M=3$. First, under condition of $\Delta=0.55\%$, the cut-off wavelength must be 1.02 $\mu$m or longer due to a limitation of the bending loss and must be 1.22 $\mu$m or shorter due to a limitation of the fundamental spectrum shape. Here, the cut-off wavelength is obtained under conditions that $\lambda_c=1.10$ $\mu$m (V=1.7) and $\lambda_c=1.22$ $\mu$m (V=1.9).

Second, under conditions of $\Delta=0.50\%$, the cut-off wavelength must be 1.07 $\mu$m or longer due to a limitation of the bending loss and must be 1.22 $\mu$m or shorter due to a limitation of the fundamental spectrum shape. Here, the cut-off wavelength is obtained under conditions that $\lambda_c=1.10$ $\mu$m and $\lambda_c=1.22$ $\mu$m.

Third, under conditions of $\Delta=0.45\%$, the cut-off wavelength must be 1.14 $\mu$m or longer due to a limitation of the bending loss and must be 1.22 $\mu$m or shorter due to a limitation of the fundamental spectrum shape. Here, the cut-off wavelength is obtained under condition that $\lambda_c=1.16$ $\mu$m (V=1.8) and $\lambda_c=1.22$ $\mu$m.

At last, under conditions of $\Delta=0.40\%$, the cut-off wavelength must be nearly 1.22 $\mu$m due to a limitation of the bending loss and the fundamental spectrum shape. Here, the cut-off wavelength is obtained under conditions that 1.22 $\mu$m.

In FIGS. 30A to 36B, a range of ratio l of the inner core 1a and a range of photosensitivity $p_1$ of the inner core 1a which are used for the long wavelength range and the short wavelength range under conditions of various refractive index profiles are shown. An area inside of the lines which are indicated by arrows in the drawing indicates a range which satisfies limitations for the loss area and the loss bandwidth for an optical fiber which is used for a gain equalizing slant optical fiber grating.

Next, a relationship between an optical fiber structure and the relative refractive index difference for the inner cladding 1a to the outer cladding 2b is explained as follows. When the refractive index of the inner cladding 1a becomes larger than the refractive index of the outer cladding 2b, a mode which is confined in the inner cladding 1a so as to be transmitted occurs. Because of the interference by the mode and the guided mode, the transmission characteristics is worsened. Therefore, it is preferable that the refractive index of the inner cladding 1a be lower than that of the outer cladding 2b.

In contrast, as disclosed in "Coupling characteristics of photo-induced Bragg grations in depressed-and-matched claddingding fiber (S. J. Hewlett et al. Opt. Quantum Electron, Vol. 28, pp 1641–1654, 1996)", when the refractive index of the inner cladding 1a becomes extremely smaller than that of the outer cladding 2b, a coupled mode occurs; thus, unnecessary peak occurs. Therefore, the refractive index of the inner cladding 1a should preferably be determined such that a formula F18 is satisfied according to the relative refractive index difference to the outer cladding 2b.

$$-0.1\% < \Delta_{inclad} < 0\% \quad \text{F18}$$

Next, an example of a manufacturing method for an optical fiber according to the present invention is explained.

An optical fiber having the above-explained characteristics was manufactured by the following method. In FIGS. 37A to 37C, three optical fibers which were actually manufactured are shown. In FIGS. 37A to 37C, reference numeral 1a indicates an inner core and reference numeral 1b indicates an outer core. Also, reference numeral 2a indicates an inner cladding and reference numeral 2b indicates an outer cladding.

In silica optical fiber, it is known that photosensitivity is in proportion to quantity of high refractive index material such as Ge to be added. Therefore, here, desirable refractive index and desirable photosensitivity profile are realized by controlling the quantity of Ge to be added according to distribution of photosensitivity and by controlling distribution of the refractive index by using other dopants. For high refractive index dopants having no photosensitivity, Al or P are known. P deteriorates hydrogen-resistant characteristics; therefore it is not possible to add a lot of P because it deteriorates hydrogen hydrogen-characteristics. Also, for low refractive index member, F and B are known.

In optical fiber structures A and B, Al was used as a main dopant in order to make the inner core 1a a low photosensitive core. Also, because Ge is added in order to make the inner cladding 2a a higher photosensitive cladding, F is added to the optical fiber structure A, and B is added to the optical fiber structure B.

In an optical fiber structure C, photosensitivity of the inner core 1a is low. Also, a much larger quantity of F is added to the inner cladding 2a and the outer cladding 2b than in the case of the optical fiber structure A so as to make refractive indexes low. A constant amount of light having 248 nm of wavelength from a KrF excimer laser light source is irradiated to each optical fiber from the side. The refractive index profile before the irradiation and after the irradiation is measured by Refracted Near Field Pattern (hereinafter called RNFP) method so as to obtain increase of the refractive index.

In TABLE 2, relative value of the refractive index changing amount of each optical fiber under conditions the refractive index increase of the inner cladding 1a in the optical fiber structure A is set at 1 (one) is shown.

TABLE 2

| FIBER STRUCTURE | TYPE-A | | TYPE-B | | TYPE-C | |
|---|---|---|---|---|---|---|
| MEASURED PART | OUTER CORE | INNER CLADDING | OUTER CORE | INNER CLADDING | OUTER CORE | INNER CLADDING |
| INCREASE OF REFRACTIVE INDEX | 1.5 | 1 | 1.5 | 1.5 | 1 | 0.6 |

Here, in TABLE 2, the same amount of Ge is added to each type of fiber structure. In TABLE 2, photosensitivity is different according to the measured part. It is believed that this is because photosensitivity decreases in proportion to the added amount of F. In the cases of type A and type C, photosensitivity of the outer core 1b is higher than that of the inner cladding 2a. Therefore, the loss area shown in FIGS. 22A to 24B is 1.5 times as large as those shown in FIGS. 4A to 9C according to the comparison between the conventional optical fiber and the optical fiber in the present invention. Thus, it is understood that the present invention has superior effect.

According to results shown in TABLE 2, it seems that the type B is the superior among them. However, it is not possible to determine which one of the type A and type B is more advantageous from a view point of manufacturing easiness such as stable doping of Ge.

In the type C, it is necessary to add 1.5 times as much Ge as that of the type A so as to maintain the same photosensitivity as the type A and type B. Therefore, from a loss area point of view, the type C is less advantageous than the type A and type B. Necessary amounts of Ge to be added for a gain equalizer according to the present invention is 4 wt % or more for the type A. For the type B, Ge must be added 3 wt % or more. For the type C, Ge must be added at 5 wt % or more.

On the other hand, from a viewpoint of connection loss in splicing connection, the type C is advantageous. The splicing connection loss is determined by a difference of MFD between the connected optical fibers. In the optical fibers of the type A and type B, there is a tendency in that the splicing connection loss deviates in a worse manner than the theoretical value. In contrast, the optical fiber in the type C is made of almost pure $SiO_2$; therefore, there is no phenomena such as those observed in the type A and type B. Therefore, it is possible to perform splicing connection in a safe manner.

Therefore, optical fibers to be used is determined according to its usage. Optical characteristics of the manufactured optical fibers such as MFD, cut-off wavelength, and loss occurrence bandwidth are shown in TABLE 3.

TABLE 3

| FIBER NO. | No. 1 | No. 2 | No. 3 | No. 4 |
|---|---|---|---|---|
| USAGE | for long wavelength | for long wavelength | for short wavelength | for short wavelength |
| M.F.D [μm] | 9.06 | 8.13 | 9.21 | 8.6 |
| CUT-OFF WAVELENGTH [μm] | 1.13 | 1.11 | 1.2 | 1.05 |
| LOSS OCCURRENCE BANDWIDTH [nm] | 11 | 13 | 7 | 9 |

Also, loss spectrum shapes are shown in FIGS. 38 to 41. A relationship of the exposure time and the loss area is shown in FIGS. 42 to 45.

The cut-off wavelengths shown in the TABLE 3 are measured by 2 m method. Therefore, values which are equivalent to the theoretical cut-off wavelengths are slightly longer than the measured values. In FIGS. 38 to 45, it is understood that 15 nm or lower of the loss occurrence area and 5 dB or larger of the loss area in the optical fiber (No. 1, 2) for long wavelength are realized. Also, it is understood that that 9 nm or lower of the loss occurrence area and 4 dB or larger of the loss area in the optical fiber (No. 3, 4) for short wavelength are realized.

Also, optical fibers No. 2 and 4 are manufactured so as to have nearly 5% of relative refractive index difference Δ for connecting with the DSF. The long wavelength optical fiber No. 1 and short wavelength optical fiber 3 are manufactured so as to have nearly 4.5% of relative refractive index difference Δ for connecting with the SMF. Regarding the connection loss in each optical fiber, the connection loss is nearly 0.1 dB for No. 1 and No. 3. The connection loss is nearly 0.15 dB for No. 2 and No. 4. According to the above-explained results, it was confirmed that an optical fiber which can maintain the loss area and has narrow bandwidth can be manufactured.

By using these optical fibers, it is possible to manufacture a gain equalizing optical filter for an optical amplifier by connecting a plurality of slant optical fiber grating in which the mode field diameter is 8.0 μm to 10.0 μm and the relative refractive index difference Δ is 0.40% to 0.55% and by connecting single mode optical fiber for 1.3 μm transmission use to both ends of the slant optical fiber grating.

Also, it is possible to manufacture again equalizing optical filter for an optical amplifier by connecting a plurality of slant optical fiber grating in which the mode field diameter is 8.0 μm to 9.0 μm and the relative refractive index difference Δ is 0.50% to 0.55% and by connecting dispersion shifted optical fiber to both ends of the slant optical fiber grating.

Next, an optical amplifier module which uses the above-explained gain equalizing optical filter is explained.

Figure 46:
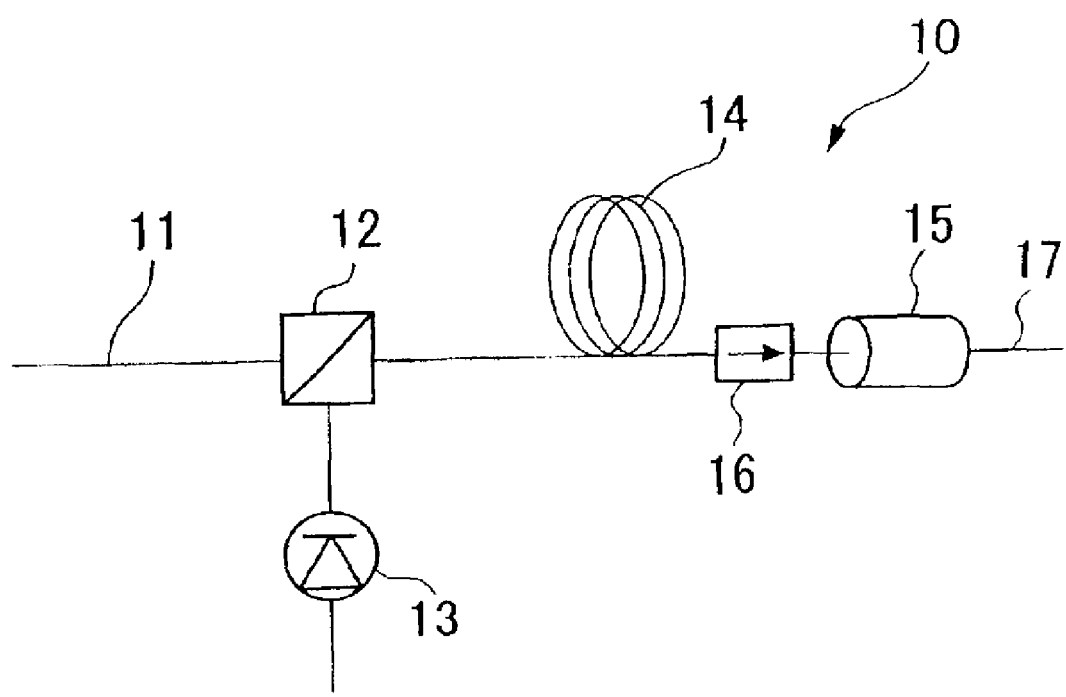
FIG. 46 is a view showing an example of structure of an optical amplifier according to the present invention.
Figure 47:
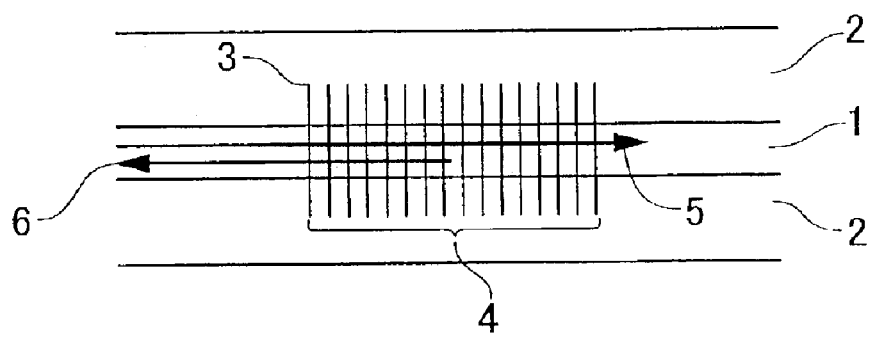
FIG. 47 is a view showing a structure of reflecting optical fiber grating.
Figure 48:
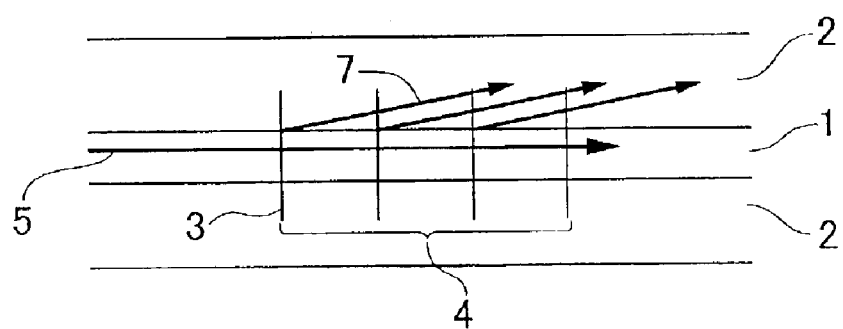
FIG. 48 is a view showing a structure of transmitting optical fiber grating.

In FIG. 46, an optical amplifier module having an EDF as a gain medium is shown as an example for an optical amplifier module structure.

In FIG. 46, reference numeral 11 indicates a light transmission line for transmitting a signal light. The light transmission line 11 is connected to an input port of the WDM coupler 12. To other input port of the WDM coupler 12, an excitation light source 13 is connected. To an output port of the WDM coupler 12, an end of EDF 14 such a gain medium is connected.

The other end of the EDF 14 is connected to an gain equalizing optical filter 15 for optical amplifier via an optical isolator 16. In this example, optical components are connected by a splicing connecting method.

In the optical amplifier module 10 in this example, the signal light which is sent via the light transmission line 11 is combined with an excitation light which is emitted by the exitation light source 13 by the WDM coupler 12. The combined light is launched into an end of the EDF 14 so as to be amplified. The gain of the amplified light is equalized by the gain equalizing optical filter 15 for optical amplifier. The amplified light is outputted to the light transmitting path 17.

Here, in FIG. 46, the excited light is incident to the EDF 14 in the same direction as the direction of the signal light in a manner of forward direction excitation. However, the excitation method is not limited to the case. The excitation light may be incident in an opposite direction to a direction of the signal light in manner of backward direction excitation. Alternatively, the excitation light may be incident in the same direction in the signal light and in the opposite direction of the signal light in manner of bilateral direction excitation.

According to an optical amplifier module in this example, by forming an optical amplifier module by using a gain equalizing optical filter for optical amplifier according to the present invention, it is possible to realize an optical amplifier module which can generate an amplified light of which gain is equalized in wide range of wavelength.

Also, in a gain equalizing optical filter for optical amplifier according to the present invention, because the connection loss is small, it is therefore possible to realize an optical amplifier module having a small insertion loss even if it is used as an optical amplifier module.

Furthermore, because a gain equalizing optical filter for optical amplifier according to the present invention is manufactured by using an optical fiber having a small bending loss, it is possible to realize an optical amplifier module which has a small bending loss when used as an optical amplifier module and which can be organized in a narrow space.

What is claimed is:

1. An optical fiber comprising:
   a core; and
   a cladding which is disposed around the core, wherein
   the core comprises at least two or more layers having different refractive indexes, the at least two or more layers comprising an innermost layer, wherein
   the innermost layer comprises a lower photosensitivity layer, the lower photosensitivity layer having a non-zero photosensitivity to a change of refractive index by a light radiation, wherein the photosensitivity of the lower photosensitivity layer is lower than a photosensitivity of one of the at least two or more layers, wherein
   the cladding comprises at least two or more cladding layers having different refractive indexes, the at least two or more cladding layers comprising an innermost cladding layer which contacts the core, wherein the innermost cladding layer comprises a higher photosensitivity layer, the higher photosensitivity layer having a photosensitivity to a change of refractive index by a light radiation that is higher than a photosensitivity of one of the at least two or more cladding layers.

2. An optical fiber according to claim 1, wherein an outer diameter of the higher photosensitivity layer of the cladding is at least twice as large as a diameter of a mode field.

3. An optical fiber according to claim 1, wherein a product of a ratio between a core diameter and a diameter of the lower photosensitivity layer of the core and a theoretical cut-off wavelength $\lambda_c$ is 0.98 or less.

4. An optical fiber according to claim 1, wherein a quotient obtained by dividing a maximum value of a photosensitivity of the core by a maximum value of a photosensitivity of the cladding is 0.8 or larger.

5. An optical fiber according to claim 1, wherein a theoretical cut-off wavelength $\lambda_c$ is 1.22 $\mu$m or shorter.

6. An optical fiber according to claim 1, wherein a relative refractive index difference $\Delta$ between the core and the innermost cladding layer for a theoretical cut-off wavelength $\lambda_c$ satisfy a relationship such that $\lambda_c > 2.48 - 4.53\Delta + 3.43\Delta^2$.

7. An optical fiber according to claim 1, wherein
   a loss generating bandwidth is 9 nm or shorter, and
   a product of a ratio between a core diameter and a diameter of the lower photosensitivity layer of the core and a theoretical cut-off wavelength $\lambda_c$ is 0.98 or less.

8. An optical fiber according to claim 1, wherein
   a loss generating bandwidth is 15 nm or shorter; and
   a product of a ratio between a core diameter and a diameter of the lower photosensitivity layer of the core and a theoretical cut-off wavelength $\lambda_c$ is 0.85 or less.

9. An optical fiber according to claim 1, wherein a relative refractive index difference $\Delta_{inclad}$ between the innermost cladding layer which contacts the core and an outermost cladding layer among the layers contained in the cladding and having different refractive indexes is in a range of $-0.1\% < \Delta_{inclad} < 0\%$.

10. An optical fiber according to claim 1, the optical fiber further comprising a silica glass, wherein:
    a main dopant to the lower photosensitivity layer of the core is Al;
    a main dopant to a higher photosensitivity layer of the core is Ge;
    a main dopant to the higher photosensitivity layer of the cladding is Ge and B; and
    an amount of Ge which is added to the higher photosensitivity layer of the cladding is 3 wt % or more.

11. An optical fiber according to claim 1, the optical fiber further comprising a silica glass, wherein:
    a main dopant to the lower photosensitivity layer of the core is Al;
    a main dopant to a higher photosensitivity layer of the core is Ge;
    a main dopant to the higher photosensitivity layer of the cladding is Ge and F; and
    an amount of Ge which is added to the higher photosensitivity layer of the cladding is 4 wt % or more.

12. An optical fiber according to claim 1, the optical fiber further comprising a silica glass, wherein:
- an amount of Ge which is added to the lower photosensitivity layer of the core is 1 wt % or lower,
- main dopants which are added to a higher photosensitivity layer of the core comprise Ge and F;
- main dopants which are added to the higher photosensitivity layer of the cladding comprise Ge and F;
- an amount of Ge which is added to the higher photosensitivity layer of the cladding is 5 wt %; and
- a main dopant which is added to a lower photosensitivity layer of the cladding is F.

13. An optical fiber according to claim 1, further comprising an outermost core layer, wherein the outermost core layer comprises a photosensitivity to a change of refractive index by a light radiation that is higher than a photosensitivity of the innermost cladding layer.

14. An optical fiber according to claim 13, wherein the photosensitivity of the outermost core layer is higher than a photosensitivity of the at least two or more cladding layers, and further wherein the photosensitivity of the outermost core layer is higher than a photosensitivity of any other core layer.

15. A slant optical fiber grating comprising:
- an optical fiber; and
- a slant angle, the slant angle being in a range of ±0.3° in accordance with a reflection suppression angle, the optical fiber comprising:
  - a core; and
  - a cladding which is disposed around the core, wherein
    - the core comprises at least two or more layers having different refractive indexes, the at least two or more layers comprising an innermost layer, wherein
    - the innermost layer comprises a lower photosensitivity layer, the lower photosensitivity layer having a non-zero photosensitivity to a change of refractive index by a light radiation, wherein the photosensitivity of the lower photosensitivity layer is lower than a photosensitivity of one of the at least two or more layers, wherein
    - the cladding comprises at least two or more cladding layers having different refractive indexes, the at least two or more cladding layers comprising an innermost cladding layer which contacts the core, and wherein the innermost cladding layer comprises a higher photosensitivity layer, the higher photosensitivity layer having a photosensitivity to a change of refractive index by a light radiation that is higher than a photosensitivity of one of the at least two or more cladding layers.

16. A slant optical fiber grating according to claim 15, wherein an arbitrary loss spectrum can be obtained by changing a grating period and a magnitude of a refractive index change in a longitudinal direction of the optical fiber.

17. The slant optical fiber grating according to claim 15, adapted for use in a band rejection optical filter, the band rejection optical filter further comprising:
- a single mode optical fiber adapted for 1.3 $\mu$m transmission use, wherein
- the slant optical fiber grating comprises the optical fiber, the optical fiber further comprising 8.0 $\mu$m to 10.0 $\mu$m diameter of mode field and a relative refractive index difference $\Delta$ of 0.40% to 0.55%;
- the slant optical fiber grating comprising one of a single slant optical fiber grating and a plurality of slant optical fiber gratings connected in series; and wherein the single mode optical fiber for 1.3 $\mu$m transmission use is connected to both ends of the slant optical fiber grating.

18. The slant optical fiber grating according to claim 15, adapted for use in a band rejection optical filter, the band rejection optical filter further comprising:
- a dispersion shifted optical fiber, wherein
- the slant optical fiber grating comprises the optical fiber, the optical fiber further comprising a mode field diameter of 8.0 $\mu$m to 9.0 $\mu$m and a relative refractive index difference $\Delta$ of 0.50% to 0.55%;
- the slant optical fiber grating comprising one of a slant optical fiber grating and a plurality of slant optical fiber gratings connected in series; and wherein
- the dispersion shifted optical fiber is connected to both ends of the slant optical fiber grating.

19. A gain equalizing optical filter for an optical amplifier comprising:
- a plurality of slant optical fiber gratings connected in series,
- each of the plurality of slant optical fiber gratings comprising:
  - an optical fiber; and
  - a slant angle, the slant angle being in a range of ±0.3° in accordance with a reflection suppression angle, the optical fiber comprising:
    - a core; and
    - a cladding which is disposed around the core,
  - wherein
    - the core comprises at least two or more layers having different refractive indexes, the at least two or more layers comprising an innermost layer, wherein
    - the innermost layer comprises a lower photosensitivity layer, the lower photosensitivity layer having a photosensitivity to a change of refractive index by a light radiation that is lower than a photosensitivity of one of the at least two or more layers, wherein
    - the cladding comprises at least two or more cladding layers having different refractive indexes, the at least two or more cladding layers comprising an innermost cladding layer which contacts the core, and wherein the innermost cladding layer comprises a higher photosensitivity layer, the higher photosensitivity layer having a photosensitivity to a change of refractive index by a light radiation that is higher than a photosensitivity of one of the at least two or more cladding layers; and
- wherein the plurality of slant optical gratings comprises:
  - a slant optical fiber grating for equalizing a gain peak around 1530 nm band comprising the optical fiber, wherein a loss generating bandwidth is 9 nm or shorter, and wherein a product of a ratio between a core diameter and a diameter of the lower photosensitivity layer of the core and a theoretical cut-off wavelength $\lambda_c$ is 0.98 or less; and
  - a slant optical fiber grating for equalizing a gain peak around 1555 nm band comprising the optical fiber, wherein a loss generating bandwidth is 15 nm or shorter, and wherein a product of the ratio between a core diameter and a diameter of the lower photosensitivity layer of the core and a theoretical cut-off wavelength $\lambda_c$ is 0.85 or less.

20. A gain equalizing optical filter according to claim 19, comprising:

a single mode optical fiber adapted for 1.3 μm transmission use, wherein at least one of the plurality of slant optical fiber gratings comprises the optical fiber, wherein the optical fiber further comprises a mode field diameter of 8.0 μm to 10.0 μm and a relative refractive index difference Δ of 0.40% to 0.55%; and wherein the single mode optical fiber for 1.3 μm transmission use is connected to both ends of the plurality of slant optical fiber gratings connected in series.

21. A gain equalizing optical filter according to claim 19, comprising:

a dispersion shifted optical fiber, wherein at least one of the plurality of slant optical fiber gratings comprises the optical fiber, wherein the optical fiber further comprises a mode field diameter of 8.0 μm to 9.0 μm and a relative refractive index difference Δ of 0.50% to 0.55%; and wherein the dispersion shifted optical fiber is connected to both ends of the plurality of slant optical fiber gratings connected in series.

22. A gain equalizing optical filter according to claim 19, adapted for use in an optical amplifier module.

* * * * *

UNITED STATES PATENT AND TRADEMARK OFFICE
CERTIFICATE OF CORRECTION

PATENT NO. : 6,931,185 B2
DATED : August 16, 2005
INVENTOR(S) : Sudo et al.

It is certified that error appears in the above-identified patent and that said Letters Patent is hereby corrected as shown below:

Column 10,
Line 36, reads "Δ of 0.50% to 55%, one"; should read -- "Δ of 0.50% to 0.55%, one", --.

Signed and Sealed this

Fourteenth Day of March, 2006

JON W. DUDAS
*Director of the United States Patent and Trademark Office*